United States Patent
Cary et al.

(10) Patent No.: US 11,343,335 B2
(45) Date of Patent: May 24, 2022

(54) MESSAGE PROCESSING BY SUBSCRIBER APP PRIOR TO MESSAGE FORWARDING

(71) Applicant: Apple Inc.

(72) Inventors: James B. Cary, Menlo Park, CA (US); David A. Schimon, Cupertino, CA (US); Christopher P. Saari, Cupertino, CA (US); Karen L. Bechtel, Cupertino, CA (US); Antony J. Dzeryn, Mountain View, CA (US); Tyler D. Hawkins, San Jose, CA (US); Eliza C. Block, San Francisco, CA (US); Curtis Rothert, Morgan Hill, CA (US); Gustavo R. Chaurais, Cupertino, CA (US); Gregory B. Novick, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/475,471

(22) Filed: Sep. 2, 2014

(65) Prior Publication Data
US 2015/0350129 A1    Dec. 3, 2015

Related U.S. Application Data

(60) Provisional application No. 62/004,346, filed on May 29, 2014.

(51) Int. Cl.
*H04L 67/52* (2022.01)
*H04W 4/90* (2018.01)
(Continued)

(52) U.S. Cl.
CPC ............ *H04L 67/18* (2013.01); *H04L 51/046* (2013.01); *H04L 51/14* (2013.01); *H04L 51/24* (2013.01); *H04L 67/2823* (2013.01); *H04W 4/90* (2018.02)

(58) Field of Classification Search
CPC ..... H04L 41/0631; H04L 41/06; H04L 51/14; H04L 51/24
See application file for complete search history.

(56) References Cited

U.S. PATENT DOCUMENTS

| 4,803,487 A | 2/1989 | Willard et al. |
| 5,345,552 A | 9/1994 | Brown |
(Continued)

FOREIGN PATENT DOCUMENTS

| AU | 2016102028 B4 | 7/2017 |
| CN | 1429364 A | 7/2003 |
(Continued)

OTHER PUBLICATIONS

U.S. Appl. No. 14/475,471, Titled—Message Processing by Subscriber App Prior to Message Forwarding filed on Sep. 2, 2014.
(Continued)

*Primary Examiner* — Tonia L Dollinger
*Assistant Examiner* — Jonathan A Sparks
(74) *Attorney, Agent, or Firm* — Dentons US LLP

(57) ABSTRACT

Certain embodiments of the present invention can detect and evaluate new messages at a coordinating device to determine whether to forward the message to a wearable device. In this manner, a server can reduce a number of devices that it is to communicate a message to, while still allowing the message to be availed to multiple devices. Further, certain embodiments relate to coordinating alerts (e.g., audio or haptic alerts) to reduce redundant alerts of a single message amongst spatially clustered devices.

50 Claims, 22 Drawing Sheets

(51) Int. Cl.
  *H04L 67/565* (2022.01)
  *H04L 51/046* (2022.01)
  *H04L 51/224* (2022.01)
  *H04L 51/00* (2022.01)

(56) References Cited

U.S. PATENT DOCUMENTS

| | | |
|---|---|---|
| 5,475,653 A | 12/1995 | Yamada et al. |
| 5,655,094 A | 8/1997 | Cline et al. |
| 5,745,116 A | 4/1998 | Pisutha-Arnond |
| 5,943,055 A | 8/1999 | Sylvan |
| 6,052,709 A | 4/2000 | Paul |
| 6,181,837 B1 | 1/2001 | Cahill et al. |
| 6,253,075 B1 | 6/2001 | Beghtol et al. |
| 6,385,644 B1 | 5/2002 | Devine et al. |
| 6,396,513 B1 | 5/2002 | Heitman et al. |
| 6,489,977 B2 | 12/2002 | Sone et al. |
| 6,498,835 B1 | 12/2002 | Skladman et al. |
| 6,515,988 B1 | 2/2003 | Eldridge et al. |
| 6,597,378 B1 | 7/2003 | Shiraishi et al. |
| 6,661,438 B1 | 12/2003 | Shiraishi et al. |
| 6,792,085 B1 | 9/2004 | Rigaldies et al. |
| 6,941,345 B1 | 9/2005 | Kapil et al. |
| 6,999,469 B1 | 2/2006 | Chu et al. |
| 7,017,119 B1 | 3/2006 | Johnston et al. |
| 7,081,905 B1 | 7/2006 | Raghunath |
| 7,130,664 B1 | 10/2006 | Williams |
| 7,953,393 B2 | 5/2011 | Chin et al. |
| 7,996,045 B1 | 8/2011 | Bauer et al. |
| 8,099,669 B2 | 1/2012 | Nixon et al. |
| 8,144,136 B2 | 3/2012 | Minakuchi |
| 8,150,930 B2 | 4/2012 | Satterfield et al. |
| 8,171,137 B1 | 5/2012 | Parks et al. |
| 8,285,258 B2 | 10/2012 | Schultz et al. |
| 8,407,305 B2 | 3/2013 | Lazaridis |
| 8,434,133 B2 | 4/2013 | Kulkarni |
| 8,478,816 B2 | 7/2013 | Parks et al. |
| 8,504,114 B1 | 8/2013 | Tseng |
| 8,612,294 B1 | 12/2013 | Treyz et al. |
| 8,613,070 B1 | 12/2013 | Deva et al. |
| 8,983,539 B1 | 3/2015 | Kim et al. |
| 9,219,620 B2 | 12/2015 | Nixon |
| 9,292,310 B2 | 3/2016 | Chaudhri et al. |
| 9,405,766 B2 | 8/2016 | Robbin et al. |
| 9,461,833 B1 | 10/2016 | Marra et al. |
| 9,507,608 B2 | 11/2016 | Block et al. |
| 9,575,591 B2 | 2/2017 | Yang et al. |
| 9,628,950 B1 | 4/2017 | Noeth et al. |
| 9,652,741 B2 | 5/2017 | Goldberg et al. |
| 9,808,206 B1 | 11/2017 | Zhao et al. |
| 9,846,685 B2 | 12/2017 | Li |
| 10,225,711 B2 | 3/2019 | Parks et al. |
| 10,254,911 B2 | 4/2019 | Yang |
| 10,417,037 B2 | 9/2019 | Gruber et al. |
| 2001/0030597 A1 | 10/2001 | Inoue et al. |
| 2002/0037715 A1 | 3/2002 | Mauney et al. |
| 2002/0198906 A1 | 12/2002 | Press |
| 2003/0055977 A1 | 3/2003 | Miller et al. |
| 2003/0079057 A1 | 4/2003 | Ruskin et al. |
| 2003/0098871 A1 | 5/2003 | Kawano |
| 2003/0120805 A1 | 6/2003 | Couts |
| 2003/0128237 A1 | 7/2003 | Sakai |
| 2003/0151982 A1 | 8/2003 | Brewer et al. |
| 2004/0041841 A1 | 3/2004 | LeMogne et al. |
| 2004/0100389 A1 | 5/2004 | Naito et al. |
| 2005/0018823 A1 | 1/2005 | Adamczyk et al. |
| 2005/0117601 A1 | 6/2005 | Anderson et al. |
| 2005/0268237 A1 | 12/2005 | Crane et al. |
| 2006/0026245 A1 | 2/2006 | Cunningham et al. |
| 2006/0092177 A1 | 5/2006 | Blasko et al. |
| 2006/0101350 A1 | 5/2006 | Scott et al. |
| 2006/0123427 A1 | 6/2006 | Harold et al. |
| 2006/0132456 A1 | 6/2006 | Anson |
| 2006/0187216 A1 | 8/2006 | Trent, Jr. et al. |
| 2006/0224985 A1 | 10/2006 | Baek et al. |
| 2006/0229014 A1* | 10/2006 | Harada ............... H04M 1/7253 455/41.2 |
| 2006/0294452 A1 | 12/2006 | Matsumoto |
| 2607/0036300 | 2/2007 | Brown et al. |
| 2007/0061786 A1 | 3/2007 | Zhou et al. |
| 2007/0165004 A1 | 7/2007 | Seelhammer et al. |
| 2007/0259654 A1 | 11/2007 | Oijer |
| 2007/0288932 A1 | 12/2007 | Horvitz et al. |
| 2008/0004113 A1 | 1/2008 | Avery et al. |
| 2008/0011827 A1 | 1/2008 | Little et al. |
| 2008/0012701 A1 | 1/2008 | Kass et al. |
| 2008/0016368 A1 | 1/2008 | Adams |
| 2008/0016537 A1 | 1/2008 | Little et al. |
| 2008/0043958 A1 | 2/2008 | May et al. |
| 2008/0077673 A1 | 3/2008 | Thomas et al. |
| 2008/0091166 A1 | 4/2008 | Fitzgerald et al. |
| 2008/0094371 A1 | 4/2008 | Forstall et al. |
| 2008/0119176 A1 | 5/2008 | Chen et al. |
| 2008/0153464 A1 | 6/2008 | Morris |
| 2008/0165136 A1 | 7/2008 | Christie et al. |
| 2008/0180408 A1 | 7/2008 | Forstall |
| 2008/0220752 A1 | 9/2008 | Forstall et al. |
| 2008/0301580 A1 | 12/2008 | Hjelmeland Alams et al. |
| 2008/0320391 A1 | 12/2008 | Lemay et al. |
| 2009/0005011 A1 | 1/2009 | Christie et al. |
| 2009/0037093 A1 | 2/2009 | Kurihara et al. |
| 2009/0055494 A1 | 2/2009 | Fukumoto et al. |
| 2009/0088207 A1 | 4/2009 | Sweeney et al. |
| 2009/0138815 A1 | 5/2009 | Mercer |
| 2009/0181726 A1 | 7/2009 | Vargas et al. |
| 2009/0207743 A1 | 8/2009 | Huq et al. |
| 2009/0222748 A1 | 9/2009 | Lejeune et al. |
| 2009/0228868 A1 | 9/2009 | Forstall et al. |
| 2009/0244015 A1 | 10/2009 | Sengupta et al. |
| 2009/0248247 A1 | 10/2009 | Furuichi et al. |
| 2009/0249247 A1 | 10/2009 | Tseng |
| 2009/0284476 A1 | 11/2009 | Bull et al. |
| 2009/0298444 A1 | 12/2009 | Shigeta |
| 2009/0307715 A1 | 12/2009 | Santamaria et al. |
| 2009/0325630 A1 | 12/2009 | Tiitola et al. |
| 2009/0327151 A1 | 12/2009 | Carlson et al. |
| 2010/0020035 A1 | 1/2010 | Ryu et al. |
| 2010/0058231 A1 | 3/2010 | Duarte et al. |
| 2010/0088692 A1 | 4/2010 | Rathi et al. |
| 2010/0103125 A1 | 4/2010 | Kim et al. |
| 2010/0123724 A1 | 5/2010 | Moore et al. |
| 2010/0144368 A1 | 6/2010 | Sullivan et al. |
| 2010/0146384 A1 | 6/2010 | Peev et al. |
| 2010/0146437 A1 | 6/2010 | Woodcock et al. |
| 2010/0149090 A1 | 6/2010 | Morris et al. |
| 2010/0159995 A1 | 6/2010 | Stallings et al. |
| 2010/0162169 A1 | 6/2010 | Skarp |
| 2010/0171759 A1 | 7/2010 | Nickolov |
| 2010/0191818 A1 | 7/2010 | Satterfield et al. |
| 2010/0199359 A1 | 8/2010 | Miki |
| 2010/0227600 A1 | 9/2010 | Vander Veen et al. |
| 2010/0228836 A1 | 9/2010 | Lehtovirta et al. |
| 2010/0257490 A1 | 10/2010 | Lyon et al. |
| 2010/0269040 A1 | 10/2010 | Lee |
| 2010/0281409 A1 | 11/2010 | Rainisto et al. |
| 2010/0287513 A1 | 11/2010 | Singh et al. |
| 2010/0292600 A1 | 11/2010 | Dibenedetto et al. |
| 2010/0299436 A1 | 11/2010 | Khalid et al. |
| 2010/0306705 A1 | 12/2010 | Nilsson |
| 2010/0332518 A1 | 12/2010 | Song et al. |
| 2011/0004845 A1 | 1/2011 | Ciabarra |
| 2011/0045813 A1 | 2/2011 | Choi |
| 2011/0047368 A1 | 2/2011 | Sundaramurthy et al. |
| 2011/0059769 A1 | 3/2011 | Brunolli |
| 2011/0081923 A1 | 4/2011 | Bednar et al. |
| 2011/0088003 A1 | 4/2011 | Swink et al. |
| 2011/0096011 A1 | 4/2011 | Suzuki |
| 2011/0103598 A1 | 5/2011 | Fukui et al. |
| 2011/0106921 A1 | 5/2011 | Brown et al. |
| 2011/0111728 A1 | 5/2011 | Ferguson et al. |
| 2011/0153628 A1 | 6/2011 | Basu et al. |
| 2611/6151418 | 6/2011 | Delespaul et al. |
| 2011/0167383 A1 | 7/2011 | Schuller et al. |
| 2011/0183650 A1 | 7/2011 | McKee |

(56) References Cited

U.S. PATENT DOCUMENTS

| | | |
|---|---|---|
| 2011/0225547 A1 | 9/2011 | Fong et al. |
| 2011/0239158 A1 | 9/2011 | Barraclough et al. |
| 2011/0254684 A1 | 10/2011 | Antoci et al. |
| 2011/0260964 A1 | 10/2011 | Mujkic |
| 2011/0265041 A1 | 10/2011 | Ganetakos et al. |
| 2011/0279852 A1 | 11/2011 | Oda et al. |
| 2012/0016678 A1 | 1/2012 | Gruber |
| 2012/0040719 A1 | 2/2012 | Lee et al. |
| 2012/0059813 A1 | 3/2012 | Sejnoha et al. |
| 2012/0071146 A1 | 3/2012 | Shrivastava et al. |
| 2012/0077463 A1 | 3/2012 | Robbins et al. |
| 2012/0084691 A1 | 4/2012 | Yun |
| 2012/0102437 A1 | 4/2012 | Worley et al. |
| 2012/0105358 A1 | 5/2012 | Momeyer et al. |
| 2012/0108215 A1 | 5/2012 | Kameli et al. |
| 2012/0117507 A1 | 5/2012 | Tseng et al. |
| 2012/0129496 A1 | 5/2012 | Park et al. |
| 2012/0135726 A1 | 5/2012 | Luna et al. |
| 2012/0149342 A1 | 6/2012 | Cohen |
| 2012/0150970 A1 | 6/2012 | Peterson et al. |
| 2012/0154431 A1 | 6/2012 | Fram |
| 2012/0158511 A1 | 6/2012 | Lucero et al. |
| 2012/0172088 A1 | 7/2012 | Kirch et al. |
| 2012/0192094 A1 | 7/2012 | Goertz et al. |
| 2012/0204191 A1 | 8/2012 | Shia et al. |
| 2012/0214458 A1 | 8/2012 | Levien et al. |
| 2012/0216127 A1 | 8/2012 | Meyr |
| 2012/0236037 A1 | 9/2012 | Lessing et al. |
| 2012/0290657 A1 | 11/2012 | Parks et al. |
| 2012/0304084 A1 | 11/2012 | Kim et al. |
| 2013/0002580 A1 | 1/2013 | Sudou |
| 2013/0007665 A1 | 1/2013 | Chaudhri et al. |
| 2013/0063364 A1 | 3/2013 | Moore |
| 2013/0063383 A1 | 3/2013 | Anderssonreimer |
| 2013/0065566 A1 | 3/2013 | Gisby et al. |
| 2013/0073286 A1 | 3/2013 | Bastea-Forte et al. |
| 2013/0076591 A1 | 3/2013 | Sirpal et al. |
| 2013/0080177 A1 | 3/2013 | Chen |
| 2013/0091298 A1 | 4/2013 | Ozzie et al. |
| 2013/0125016 A1 | 5/2013 | Pallakoff et al. |
| 2013/0138334 A1 | 5/2013 | Meredith et al. |
| 2013/0141325 A1 | 6/2013 | Bailey et al. |
| 2013/0141331 A1 | 6/2013 | Shiu et al. |
| 2013/0144653 A1 | 6/2013 | Poe et al. |
| 2013/0151961 A1 | 6/2013 | Sasaki |
| 2013/0159941 A1 | 6/2013 | Langlois et al. |
| 2013/0173699 A1 | 7/2013 | Parks et al. |
| 2013/0174044 A1 | 7/2013 | Hill |
| 2013/0219285 A1 | 8/2013 | Iwasaki et al. |
| 2013/0219303 A1 | 8/2013 | Eriksson et al. |
| 2013/0222236 A1 | 8/2013 | Gärdenfors et al. |
| 2013/0246275 A1 | 9/2013 | Joyce et al. |
| 2013/0268353 A1 | 10/2013 | Zeto et al. |
| 2013/0304758 A1 | 11/2013 | Gruber et al. |
| 2013/0307809 A1 | 11/2013 | Sudou |
| 2013/0311997 A1 | 11/2013 | Gruber et al. |
| 2013/0316744 A1 | 11/2013 | Newham et al. |
| 2013/0318158 A1 | 11/2013 | Teng et al. |
| 2013/0321314 A1 | 12/2013 | Oh et al. |
| 2013/0322634 A1 | 12/2013 | Bennett et al. |
| 2013/0325951 A1 | 12/2013 | Chakra et al. |
| 2013/0325967 A1 | 12/2013 | Parks et al. |
| 2013/0332162 A1 | 12/2013 | Keen |
| 2013/0332892 A1 | 12/2013 | Matsuki |
| 2013/0339436 A1 | 12/2013 | Gray |
| 2013/0346068 A1 | 12/2013 | Solem et al. |
| 2013/0346882 A1 | 12/2013 | Shiplacoff et al. |
| 2013/0347018 A1 | 12/2013 | Limp et al. |
| 2014/0006562 A1 | 1/2014 | Handa et al. |
| 2014/0006949 A1 | 1/2014 | Briand et al. |
| 2014/0032706 A1 | 1/2014 | Kuscher et al. |
| 2014/0058873 A1 | 2/2014 | Sorensen et al. |
| 2014/0082715 A1 | 3/2014 | Grajek et al. |
| 2014/0095965 A1 | 4/2014 | Li |
| 2014/0118272 A1* | 5/2014 | Gunn .................. G06F 3/0488 345/173 |
| 2014/0129007 A1 | 5/2014 | Utter, II |
| 2014/0136633 A1 | 5/2014 | Murillo, Jr. et al. |
| 2014/0136986 A1 | 5/2014 | Martin et al. |
| 2014/0141721 A1 | 5/2014 | Kim et al. |
| 2014/0149859 A1 | 5/2014 | Van Dyken et al. |
| 2014/0156801 A1 | 6/2014 | Fernandes et al. |
| 2014/0160033 A1 | 6/2014 | Brikman et al. |
| 2014/0164544 A1 | 6/2014 | Gagneraud |
| 2014/0171064 A1 | 6/2014 | Das |
| 2014/0173455 A1 | 6/2014 | Shimizu et al. |
| 2014/0189030 A1 | 7/2014 | Benchenaa |
| 2014/0189533 A1 | 7/2014 | Krack et al. |
| 2014/0189589 A1 | 7/2014 | Kim et al. |
| 2014/0210708 A1 | 7/2014 | Simmons et al. |
| 2014/0213295 A1 | 7/2014 | Conklin |
| 2014/0223358 A1 | 8/2014 | Park |
| 2014/0223490 A1 | 8/2014 | Pan et al. |
| 2014/0228063 A1 | 8/2014 | Harris et al. |
| 2014/0237389 A1 | 8/2014 | Ryall et al. |
| 2014/0240122 A1 | 8/2014 | Roberts et al. |
| 2014/0240216 A1 | 8/2014 | Bukurak et al. |
| 2014/0244715 A1* | 8/2014 | Hodges .............. H04L 67/2823 709/203 |
| 2014/0258935 A1 | 9/2014 | Nishida et al. |
| 2014/0273975 A1 | 9/2014 | Barat et al. |
| 2014/0279728 A1 | 9/2014 | Skole |
| 2014/0282068 A1 | 9/2014 | Levkovitz et al. |
| 2014/0310348 A1 | 10/2014 | Keskitalo et al. |
| 2014/0320387 A1 | 10/2014 | Eriksson et al. |
| 2014/0337450 A1 | 11/2014 | Roberts et al. |
| 2014/0337748 A1 | 11/2014 | Lee |
| 2014/0359481 A1 | 12/2014 | Graham et al. |
| 2014/0359637 A1 | 12/2014 | Yan |
| 2014/0359709 A1 | 12/2014 | Nassar et al. |
| 2014/0362702 A1 | 12/2014 | Luna |
| 2014/0368333 A1* | 12/2014 | Touloumtzis .......... H04L 67/24 340/505 |
| 2014/0380187 A1 | 12/2014 | Gardenfors et al. |
| 2015/0007049 A1 | 1/2015 | Langlois |
| 2015/0017956 A1 | 1/2015 | Jeong |
| 2015/0035762 A1 | 2/2015 | Lu |
| 2015/0061862 A1* | 3/2015 | Lee .................. H04M 1/7253 340/539.11 |
| 2015/0061972 A1 | 3/2015 | Kang et al. |
| 2015/0062862 A1 | 3/2015 | Baxter et al. |
| 2015/0065035 A1 | 3/2015 | Kim et al. |
| 2015/0067580 A1 | 3/2015 | Um et al. |
| 2015/0089536 A1 | 3/2015 | Byerley |
| 2015/0094031 A1 | 4/2015 | Liu |
| 2015/0094050 A1 | 4/2015 | Bowles et al. |
| 2015/0094093 A1 | 4/2015 | Pierce |
| 2015/0143419 A1 | 5/2015 | Bhagwat et al. |
| 2015/0181373 A1 | 6/2015 | Xie et al. |
| 2015/0183558 A1 | 7/2015 | Crooms |
| 2015/0199967 A1 | 7/2015 | Reddy et al. |
| 2015/0243246 A1 | 8/2015 | Mun et al. |
| 2015/0248389 A1 | 9/2015 | Kahn et al. |
| 2015/0271120 A1 | 9/2015 | Langholz |
| 2015/0286387 A1 | 10/2015 | Gu et al. |
| 2015/0286391 A1 | 10/2015 | Jacobs et al. |
| 2015/0287403 A1 | 10/2015 | Holzer Zaslansky et al. |
| 2015/0302856 A1 | 10/2015 | Kim et al. |
| 2015/0334533 A1 | 11/2015 | Luo et al. |
| 2015/0350129 A1 | 12/2015 | Cary et al. |
| 2015/0350140 A1 | 12/2015 | Garcia et al. |
| 2015/0350146 A1 | 12/2015 | Cary et al. |
| 2015/0379476 A1 | 12/2015 | Chaudhri |
| 2016/0043905 A1 | 2/2016 | Fiedler |
| 2016/0061613 A1 | 3/2016 | Jung et al. |
| 2016/0062540 A1 | 3/2016 | Yang et al. |
| 2016/0062570 A1 | 3/2016 | Dascola et al. |
| 2016/0098522 A1 | 4/2016 | Weinstein |
| 2016/0112557 A1 | 4/2016 | Nixon et al. |
| 2016/0124592 A1 | 5/2016 | Kidron et al. |
| 2016/0134737 A1 | 5/2016 | Pulletikurty |
| 2016/0154549 A1 | 6/2016 | Chaudhri |
| 2016/0156597 A1 | 6/2016 | Meng et al. |

(56) References Cited

U.S. PATENT DOCUMENTS

| | | | |
|---|---|---|---|
| 2016/0157225 A1 | 6/2016 | Joshi et al. |
| 2016/0173617 A1 | 6/2016 | Allinson |
| 2016/0210099 A1 | 7/2016 | Hampapuram et al. |
| 2016/0232638 A1 | 8/2016 | Chen |
| 2016/0259489 A1 | 9/2016 | Yang |
| 2016/0259656 A1 | 9/2016 | Sumner et al. |
| 2016/0260414 A1 | 9/2016 | Yang |
| 2016/0269176 A1 | 9/2016 | Pang |
| 2016/0270717 A1 | 9/2016 | Luna et al. |
| 2016/0299526 A1 | 10/2016 | Inagaki et al. |
| 2016/0314670 A1 | 10/2016 | Roberts et al. |
| 2017/0011210 A1 | 1/2017 | Cheong et al. |
| 2017/0060359 A1 | 3/2017 | Chaudhri et al. |
| 2017/0083202 A1 | 3/2017 | Yang et al. |
| 2017/0147197 A1 | 5/2017 | Yang et al. |
| 2017/0153795 A1 | 6/2017 | Yang et al. |
| 2017/0177797 A1 | 6/2017 | Kurniawan et al. |
| 2017/0192730 A1 | 7/2017 | Yang et al. |
| 2017/0227935 A1 | 8/2017 | Su et al. |
| 2017/0274267 A1 | 9/2017 | Blahnik |
| 2017/0353836 A1 | 12/2017 | Gordon et al. |
| 2018/0067904 A1 | 3/2018 | Li |
| 2018/0081918 A1 | 3/2018 | Gravenites et al. |
| 2018/0120985 A1 | 5/2018 | Wallace et al. |
| 2018/0213354 A1 | 7/2018 | Wang et al. |
| 2019/0034050 A1 | 1/2019 | Williams et al. |
| 2019/0149972 A1 | 5/2019 | Parks et al. |
| 2019/0187861 A1 | 6/2019 | Yang |
| 2019/0286301 A1 | 9/2019 | Yang et al. |
| 2019/0332229 A1 | 10/2019 | Chaudhri et al. |
| 2019/0361729 A1 | 11/2019 | Gruber et al. |
| 2020/0008010 A1 | 1/2020 | Pai et al. |
| 2020/0186960 A1 | 6/2020 | Nolan |
| 2020/0245928 A1 | 8/2020 | Kang et al. |
| 2020/0363914 A1 | 11/2020 | Dascola et al. |
| 2020/0381099 A1 | 12/2020 | Crowley et al. |
| 2020/0382908 A1 | 12/2020 | Behzadi et al. |
| 2020/0409537 A1 | 12/2020 | Story et al. |
| 2021/0011586 A1 | 1/2021 | Chaudhri et al. |
| 2021/0011587 A1 | 1/2021 | Chaudhri et al. |
| 2021/0173431 A1 | 6/2021 | Yang et al. |
| 2021/0225482 A1 | 7/2021 | Crowley et al. |

FOREIGN PATENT DOCUMENTS

| | | |
|---|---|---|
| CN | 1556955 A | 12/2004 |
| CN | 1848988 A | 10/2006 |
| CN | 1852335 A | 10/2006 |
| CN | 1950762 A | 4/2007 |
| CN | 101321156 A | 12/2008 |
| CN | 101390371 A | 3/2009 |
| CN | 101433034 A | 5/2009 |
| CN | 101625620 A | 1/2010 |
| CN | 101835026 A | 9/2010 |
| CN | 101981987 A | 2/2011 |
| CN | 101997972 A | 3/2011 |
| CN | 102075619 A | 5/2011 |
| CN | 102111505 A | 6/2011 |
| CN | 102395128 A | 3/2012 |
| CN | 102404458 A | 4/2012 |
| CN | 102754071 A | 10/2012 |
| CN | 102830795 A | 12/2012 |
| CN | 102866828 A | 1/2013 |
| CN | 103260059 A | 8/2013 |
| CN | 103500079 A | 1/2014 |
| CN | 103558916 A | 2/2014 |
| CN | 103581413 A | 2/2014 |
| CN | 103582873 A | 2/2014 |
| CN | 103765385 A | 4/2014 |
| CN | 103778082 A | 5/2014 |
| CN | 103839023 A | 6/2014 |
| CN | 103944811 A | 7/2014 |
| CN | 203930358 U | 11/2014 |
| CN | 104205785 A | 12/2014 |
| CN | 104272854 A | 1/2015 |
| CN | 104281430 A | 1/2015 |
| CN | 104335234 A | 2/2015 |
| CN | 104346297 A | 2/2015 |
| EP | 1079371 A1 | 2/2001 |
| EP | 1357458 A2 | 10/2003 |
| EP | 1406176 A1 | 4/2004 |
| EP | 1662760 A1 | 5/2006 |
| EP | 1708464 A2 | 10/2006 |
| EP | 1760584 A1 | 3/2007 |
| EP | 1858238 A2 | 11/2007 |
| EP | 2219105 A1 | 8/2010 |
| EP | 2306262 A1 | 4/2011 |
| EP | 2428947 A2 | 3/2012 |
| EP | 2523109 A1 | 11/2012 |
| EP | 2568409 A1 | 3/2013 |
| EP | 2574026 A1 | 3/2013 |
| EP | 2632131 A1 | 8/2013 |
| EP | 2720442 A1 | 4/2014 |
| EP | 2849042 A1 | 3/2015 |
| EP | 2891049 A1 | 7/2015 |
| EP | 2921899 A2 | 9/2015 |
| EP | 2891049 A4 | 3/2016 |
| EP | 3096235 A1 | 11/2016 |
| EP | 3101882 A2 | 12/2016 |
| JP | 6-202842 A | 7/1994 |
| JP | 11-45117 A | 2/1999 |
| JP | 2000-122957 A | 4/2000 |
| JP | 2001-309455 A | 11/2001 |
| JP | 2002-342356 A | 11/2002 |
| JP | 2002-351768 A | 12/2002 |
| JP | 2002-366485 A | 12/2002 |
| JP | 2003-30245 A | 1/2003 |
| JP | 2003-169372 A | 6/2003 |
| JP | 2006-79427 A | 3/2006 |
| JP | 2006-113637 A | 4/2006 |
| JP | 2006-129429 A | 5/2006 |
| JP | 2006-172464 A | 6/2006 |
| JP | 2006217487 A | 8/2006 |
| JP | 2006-235957 A | 9/2006 |
| JP | 2007-3293 A | 1/2007 |
| JP | 2007028158 A | 2/2007 |
| JP | 2007-304983 A | 11/2007 |
| JP | 2008104068 A | 5/2008 |
| JP | 2008-522262 A | 6/2008 |
| JP | 2009-502048 A | 1/2009 |
| JP | 2009-521753 A | 6/2009 |
| JP | 2009-239867 A | 10/2009 |
| JP | 2009-543166 A | 12/2009 |
| JP | 2010-245940 A | 10/2010 |
| JP | 2011-43401 A | 3/2011 |
| JP | 2011-101097 A | 5/2011 |
| JP | 2011-516936 A | 5/2011 |
| JP | 2011-209786 A | 10/2011 |
| JP | 2012-511282 A | 5/2012 |
| JP | 2012-198369 A | 10/2012 |
| JP | 2012-248090 A | 12/2012 |
| JP | 2013-506225 A | 2/2013 |
| JP | 2013-48389 A | 3/2013 |
| JP | 2013-530458 A | 7/2013 |
| JP | 2013-175188 A | 9/2013 |
| JP | 2014-503861 A | 2/2014 |
| JP | 2014027544 A | 2/2014 |
| JP | 2014-53692 A | 3/2014 |
| JP | 2014-57129 A | 3/2014 |
| JP | 2014-123169 A | 7/2014 |
| JP | 2014-519126 A | 8/2014 |
| JP | 2015-8001 A | 1/2015 |
| JP | 2015-501022 A | 1/2015 |
| JP | 2015-524974 A | 8/2015 |
| JP | 2015-171114 A | 9/2015 |
| JP | 2015-526776 A | 9/2015 |
| JP | 2016-40716 A | 3/2016 |
| JP | 2016537910 A | 12/2016 |
| KR | 10-2006-0105441 A | 10/2006 |
| KR | 10-2013-0108563 A | 10/2013 |
| KR | 10-2014-0031283 A | 3/2014 |
| TW | 201012152 A1 | 3/2010 |
| TW | 201215086 A1 | 4/2012 |
| TW | M474482 U | 3/2014 |

(56) References Cited

FOREIGN PATENT DOCUMENTS

| | | |
|---|---|---|
| TW | 201509168 A | 3/2015 |
| WO | 2004/095414 A1 | 11/2004 |
| WO | 2005/053225 A1 | 6/2005 |
| WO | 2005/109829 A1 | 11/2005 |
| WO | 2007/008321 A2 | 1/2007 |
| WO | 2007/076210 A1 | 7/2007 |
| WO | 2007/102110 A2 | 9/2007 |
| WO | 2009/082377 A1 | 7/2009 |
| WO | 2009/097555 A2 | 8/2009 |
| WO | 2009/137419 A2 | 11/2009 |
| WO | 2009/140095 A2 | 11/2009 |
| WO | 2010/065752 A2 | 6/2010 |
| WO | 2011/041427 A2 | 4/2011 |
| WO | 2011/063516 A1 | 6/2011 |
| WO | 2011/084857 A1 | 7/2011 |
| WO | 2011/149231 A2 | 12/2011 |
| WO | 2012/128824 A1 | 9/2012 |
| WO | 2012/154748 A1 | 11/2012 |
| WO | 2012/170446 A2 | 12/2012 |
| WO | 2012/172970 A1 | 12/2012 |
| WO | 2013/048880 A1 | 4/2013 |
| WO | 2013/093558 A1 | 6/2013 |
| WO | 2013/097895 A1 | 7/2013 |
| WO | 2013/111239 A1 | 8/2013 |
| WO | 2013/135270 A1 | 9/2013 |
| WO | 2013/169842 A2 | 11/2013 |
| WO | 2013/169865 A2 | 11/2013 |
| WO | 2013/169870 A1 | 11/2013 |
| WO | 2013/169875 A2 | 11/2013 |
| WO | 2013/173504 A1 | 11/2013 |
| WO | 2013/176847 A1 | 11/2013 |
| WO | 2014/021967 A1 | 2/2014 |
| WO | 2014/032461 A1 | 3/2014 |
| WO | 2014/065846 A1 | 5/2014 |
| WO | 2014/083001 A2 | 6/2014 |
| WO | 2013/173504 A8 | 12/2014 |
| WO | 2015/038684 A1 | 3/2015 |
| WO | 2015/120358 A1 | 8/2015 |
| WO | 2015/034163 | 12/2015 |
| WO | 2015183558 A1 | 12/2015 |
| WO | 2016/036472 A1 | 3/2016 |

OTHER PUBLICATIONS

U.S. Appl. No. 14/475,446, filed Sep. 2, 2014, entitled, "Coordination of Message Alert Presentations Across Devices Based on Device Modes," (unpublished).
International Search Report and Written Opinion for International PCT Application No. PCT/US2015/046805, dated Dec. 10, 2015, 11 pages.
Invitation to Pay Additional Fees for PCT Application No. PCT/US2015/046807, dated Dec. 15, 2015, 7 pages.
Restriction Requirement for U.S. Appl. No. 14/475,446, dated Jul. 18, 2016. 8 pages.
International Search Report and Written Opinion for International PCT Application No. PCT/US2015/030591, dated Jul. 21, 2015, 12 pages.
Benjamin, Jeff, "How Apple can solve the multiple iMessage alert conundrum," iDownloadBlog [online], Apr. 13, 2012, [retrieved on Nov. 19, 2014], retrieved from the internet <URL: http://www.idownloadblog.com/2012/04/13/imessage-alert-priority/>, 5 pages.
Kissell, Joe, "An Alarming Abundance of Alerts," TidBITS, [online], May 13, 2012, [retrieved on Nov. 19, 2014], retrieved from the internet <URL: https://tidbits.com/article/13000>, 7 pages.
"Do Not Disturb Node—Push to Pebble Not iPhone," (on-line discussion forum), GetPebble.com, [online], Mar. 2013, [retrieved on Nov. 19, 2014], retrieved from the internet <URL: http://forums.getpebble.com/discussion/2949/do-not-disturb-mode-push-to-pebble-not-iphone>, 3 pages.
"Cisco SPA3000 Series and SPA500 Series IP Phones with Unified Communications UC320W User Guide," [online], 2011-2012, [retrieved on Nov. 19, 2014], retrieved from the internet <URL: http://www.cisco.com/c/dam/en/us/td/docs/voice_ip_comm/csbpipp/ip_phones/user/guide/spa300-500-uc320w/SPA300-500-UC320W_UG_78-19372.pdf>, 95 pages.
"PushNotify forwards notifications from iPhone and iPad to your Mac," iOS Hacker, [online], 2014, [retrieved on Nov. 19, 2014], retrieved from the internet <URL: http://ioshacker.com/cydia/pushnotify-forwards-notifications-iphone-ipad-mac>, 3 pages.
Benjamin, Jeff, "Upcoming 'PushNotify' tweak will let you forward push notifications from iOS to the Mac," iDownloadBlog [online], Apr. 8, 2014, [retrieved on Nov. 19, 2014], retrieved from the internet <URL: http://www.idownloadblog.com/2014/04/08/upcoming-pushnotify-tweak-will-let-you-forward-push-notifications-from-ios-to-the-mac/>, 5 pages.
"Use GrowlNotifier to Send iOS Notifcations Directly to your Mac," Gizmocrazed.com, [online], Dec. 3, 2011, [retrieved on Nov. 19, 2014], retrieved from the internet <URL: http://www.gizmocrazed.com/2011/12/use-growlnotifier-to-send-ios-notifications-directly-to-your-mac/>, 8 pages.
"Pushbullet," (product data sheet), Google Play, [online], Nov. 5, 2014, [retrieved on Nov. 19, 2014], retrieved from the internet <URL: https://play.google.com/store/apps/details?id=com.pushbullet.android>, 3 pages.
Ravenscraft, Eric, "How to Use Pushbullet to Get Notified of Anything on Any Device," Lifehacker.com, [online], Mar. 21, 2014, [retrieved on Nov. 19, 2014], retrieved from the internet <URL: http://lifehacker.com/how-to-use-pushbullet-to-get-notified-of-anything-on-an-1548595270>, 9 pages.
International Search Report and Written Opinion received for PCT Application No. PCT/US2015/046807, dated Apr. 1, 2016, 17 pages.
International Preliminary Report on Patentability and the Written Opinion of the ISA dated Dec. 8, 2016 in U.S. International Application No. PCT/US2015/030591. 10 pages.
Non-Final Office Action dated Nov. 18, 2016 in U.S. Appl. No. 14/475,446.
"Examination Report No. 1 for Standard Patent Application," dated May 25, 2017 in Australian Application No. 2015267514. 3 pages.
Non-Final Office Action dated Nov. 18, 2016 in U.S. Appl. No. 14/475,471. 19 pages.
Office Action dated Feb. 16, 2018 in Japanese Patent Application No. 2016-566998. 13 pages (includes summary of Office Action).
Notice of Allowance received for Taiwanese Patent Application No. 104128702, dated Oct. 25, 2017, 3 pages (Official Copy Only) {See attached Communication 37 CFR 1.98 (a)(3)}.
International Preliminary Report on Patentability received for PCT Patent Application No. PCT/US2015/046807, dated Mar. 16, 2017. 13 pages.
International Preliminary Report on Patentability received for PCT Patent Application No. PCT/US2015/046805, dated Mar. 16, 2017. 8 pages.
Office Action received for Taiwanese Patent Application No. 104128702, dated Feb. 7, 2017, 12 pages (5 pages of English Translation and 7 pages of Official Copy).
Do Not Disturb Mode-Push to Pebble Not IPhone-Pebble Forums, Mar. 2013 available at: https://forums.getpebble.com/discussion/2949/do-not-disturb-mode-push-to-pebble-not-iphone. Originally accessed on Nov. 19, 2014. 2 pages.
"Non-Final Office Action," dated Jun. 28, 2018, in U.S. Appl. No. 14/475,446. 21 pages.
Final Office Action dated Jul. 14, 2017 in U.S. Appl. No. 14/475,446. 20 pages.
Second Examination Report in Australian Patent Application No. 2015267514 dated May 22, 2018. 3 pages.
Notice of Preliminary Rejection dated Dec. 20, 2017 in Korean Patent Application No. 10-2016-7032697. 14 pages includes English Translation.
Notice of Allowance in Korean Patent Application No. 10-2016-7032697 dated Jul. 16, 2018. 13 pages (includes English translation of the claims).
Notification of the First Office Action dated Feb. 2, 2019 in Chinese Patent Application No. 201580028073.4. 18 pages (includes English translation).

(56) References Cited

OTHER PUBLICATIONS

Notice of Decision to Grant dated Oct. 26, 2018 in Japanese Patent Application No. 2016-566998. 6 pages (includes English translation of claims).
Final Office Action received for U.S. Appl. No. 14/475,446, dated Apr. 18, 2019, 28 pages.
Office Action received for European Patent Application No. 15727130.5, dated Jun. 8, 2018, 5 pages.
Office Action received for European Patent Application No. 15727130.5, dated Mar. 13, 2019, 4 pages.
First Examination Report dated Jan. 3, 2019 in Australian Patent Application No. 2018203708. 4 pages.
Advisory Action received for U.S. Appl. No. 14/475,446, dated Sep. 20, 2019, 12 pages.
Advisory Action received for U.S. Appl. No. 14/838,263, dated Jul. 12, 2018, 3 pages.
Advisory Action received for U.S. Appl. No. 15/348,204, dated Feb. 4, 2019, 4 pages.
AIRIZE, "Notification & Control Center Problem Issue Solution", Available online at: https://www.youtube.com/watch?v=K0zCueYlaTA, Dec. 6, 2013, 1 page.
Basu, Saikat, "MS Outlook Tip: How to Automatically Organize Incoming Emails", Available online at: http://www.makeuseof.com/tag/ms-outlook-productivity-tip-how-to-move-emails-to-individual-folders-automatically/, Sep. 27, 2009, pp. 1-6.
Chan, Christine, "Handoff Your Browser to Your iPhone or iPad! Plus a Chance to Win a Copy!", Apr. 12, 2011, 2 pages.
Corrected Notice of Allowance received for U.S. Appl. No. 14/839,897, dated Jan. 23, 2019, 6 pages.
Corrected Notice of Allowance received for U.S. Appl. No. 14/839,903, dated Feb. 13, 2019, 2 pages.
Corrected Notice of Allowance received for U.S. Appl. No. 14/839,903, dated Mar. 1, 2019, 2 pages.
Corrected Notice of Allowance received for U.S. Appl. No. 15/005,945, dated Oct. 18, 2016, 6 pages.
Corrected Notice of Allowance received for U.S. Appl. No. 15/348,204, dated Apr. 11, 2019, 8 pages.
Corrected Notice of Allowance received for U.S. Appl. No. 15/348,204, dated May 31, 2019, 8 pages.
Decision to Grant received for Danish Patent Application No. PA201770126, dated Mar. 27, 2018, 2 pages.
Decision to Grant received for European Patent Application No. 15711969.4, dated Sep. 26, 2019, 2 pages.
Decision to Grant received for Japanese Patent Application No. 2014-513804, dated Jul. 31, 2015, 6 pages (3 pages of English Translation and 3 pages of Official Copy).
"Dell Streak Softbank001DL Manual", Softbank Corp., vol. 2, Mar. 2011, 28 pages (Official Copy Only) {See Communication under 37 CFR § 1.98(a) (3)}.
Extended European Search Report received for European Patent Application No. 18170262.2, dated Jul. 25, 2018, 8 pages.
Final Office Action received for U.S. Appl. No. 09/735,499, dated Dec. 9, 2010, 13 pages.
Final Office Action received for U.S. Appl. No. 09/735,499, dated Dec. 18, 2003, 12 pages.
Final Office Action received for U.S. Appl. No. 09/735,499, dated May 17, 2005, 12 pages.
Final Office Action received for U.S. Appl. No. 13/312,618, dated Dec. 12, 2014, 13 pages.
Final Office Action received for U.S. Appl. No. 13/489,415, dated Jun. 11, 2014, 34 pages.
Final Office Action received for U.S. Appl. No. 14/838,235, dated Jun. 15, 2016, 18 pages.
Final Office Action received for U.S. Appl. No. 14/838,263, dated Feb. 21, 2019, 31 pages.
Final Office Action received for U.S. Appl. No. 14/838,263, dated Mar. 22, 2018, 33 pages.
Final Office Action received for U.S. Appl. No. 14/839,897, dated Jan. 10, 2018, 16 pages.
Final Office Action received for U.S. Appl. No. 14/841,455, dated Nov. 6, 2018, 14 pages.
Final Office Action received for U.S. Appl. No. 14/977,219, dated Dec. 13, 2018, 9 pages.
Final Office Action received for U.S. Appl. No. 15/128,952, dated Jul. 18, 2018, 19 pages.
Final Office Action received for U.S. Appl. No. 15/348,204, dated Oct. 13, 2017, 26 pages.
Final Office Action received for U.S. Appl. No. 15/348,204, dated Sep. 13, 2018, 29 pages.
Final Office Action received for U.S. Appl. No. 14/839,903, dated Sep. 18, 2018, 11 pages.
Frakes, Dan, "How to Get Started with Airplay", available at: https://www.macworld.com/article/2039770/how-to-get-started-with-airplay.html, Macworld, May 27, 2013, 8 pages.
"How to Move Mail to Different Folders in Gmail", Available online at: https://web.archive.org/web/20140731230338/http://www.wikihow.com/Move-Mail-to-Different-Folders-in-Gmail, Jul. 31, 2014, pp. 1-4.
Intention to Grant received for Danish Patent Application No. PA201570550, dated Dec. 22, 2016, 2 pages.
Intention to Grant received for Danish Patent Application No. PA201570773, dated Mar. 9, 2018, 2 pages.
Intention to Grant received for Denmark Patent Application No. PA201770126, dated Jan. 19, 2018, 2 pages.
Intention to Grant received for European Patent Application No. 15711969.4, dated May 29, 2019, 11 pages.
Intention to Grant received for European Patent Application No. 15759981.2, dated Aug. 12, 2019, 8 pages.
Intention to Grant received for European Patent Application No. 15759981.2, dated Mar. 21, 2019, 8 pages.
International Preliminary Report on Patentability received for PCT Patent Application No. PCT/US2012/040962, dated Dec. 10, 2013, 11 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/044083, dated Mar. 16, 2017, 24 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/021012, dated Sep. 21, 2017, 11 pages.
International Search Report and Written Opinion received for PCT Patent Application No. PCT/US2012/040962, dated Jan. 3, 2013, 15 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2015/044083, dated Feb. 4, 2016, 33 pages.
International Search Report and Written Opinion received for PCT Patent Application No. PCT/US2015/055165, dated Apr. 20, 2016, 22 pages.
International Search Report and Written Opinion received for PCT Patent Application No. PCT/US2016/021012, dated Jun. 2, 2016, 15 pages.
Invitation to Pay Additional Fees received for PCT Patent Application No. PCT/US2015/019317, mailed on May 22, 2015, 7 pages.
Invitation to Pay Additional Fees received for PCT Patent Application No. PCT/US2015/044083, mailed on Nov. 4, 2015, 11 pages.
Invitation to Pay Additional Fees received for PCT Patent Application No. PCT/US2015/055165, mailed on Jan. 18, 2016, 6 pages.
IOSVLOG Daily, "iOS 7 Notification Center Complete Walkthrough", Available online at: https://www.youtube.com/watch?v=gATXt-o42LA, Jun. 10, 2013, 1 page.
"Kinect Gesture Commands—Kinect Voice Commands", Xbox Wire, Available Online at: https://hwcdn.libsyn.com/p/4/4/c/44c89c7f273167b4/Xbox_One_Kinect_Voice_Gesture.pdf?c_id=

(56) References Cited

OTHER PUBLICATIONS

6458139&cs_id=6458139&expiration=1555411736&hwt=fe78eb09654ea677c9fbf836ad2ed82b, 2013, 2 pages.

Leonard, Jonathan Oh, "How to: dismiss banner notifications or toast notifications on ios7". Available online at: https://www.youtube.com/watch?v=vSjHnBFIWM, Dec. 17, 2013, 1 page.

Lewis, Jeffery, "iOS Notification Banner Pull Down to Notification Center in iOS 7 Beta 5", Available online at: https://www.youtube.com/watch?v=nP0s6ETPxDg, Aug. 6, 2013, 1 page.

Miller, Eric, "Background Polling", Microsoft Outlook Express, Jul. 30, 1998, 1 page.

Minutes of the Oral Proceedings received for European Application No. 15711969.4, mailed on May 16, 2019, 7 pages.

Non-Final Office Action received for U.S. Appl. No. 14/838,263, dated Jul. 14, 2017, 34 pages.

Non-Final Office Action received for U.S. Appl. No. 14/841,455, dated Apr. 25, 2018, 13 pages.

Non-Final Office Action received for U.S. Appl. No. 14/977,219, dated Apr. 6, 2018, 6 pages.

Non-Final Office Action received for U.S. Appl. No. 09/735,499, dated Jul. 21, 2004, 11 pages.

Non-Final Office Action received for U.S. Appl. No. 09/735,499, dated Jun. 21, 2010, 11 pages.

Non-Final Office Action received for U.S. Appl. No. 09/735,499, dated May 22, 2003, 12 pages.

Non-Final Office Action received for U.S. Appl. No. 09/735,499, dated Nov. 16, 2007, 11 pages.

Non-Final Office Action received for U.S. Appl. No. 13/489,415, dated Dec. 5, 2013, 25 pages.

Non-Final Office Action received for U.S. Appl. No. 13/489,415, dated Feb. 11, 2015, 30 pages.

Non-Final Office Action received for U.S. Appl. No. 14/838,263, dated Aug. 16, 2019, 33 pages.

Non-Final Office Action received for U.S. Appl. No. 14/838,263, dated Sep. 21, 2018, 33 pages.

Non-Final Office Action received for U.S. Appl. No. 14/839,897, dated May 18, 2017, 11 pages.

Non-Final Office Action received for U.S. Appl. No. 14/839,903, dated Feb. 26, 2018, 10 pages.

Non-Final Office Action received for U.S. Appl. No. 14/977,219, dated Sep. 6, 2019, 8 pages.

Non-Final Office Action received for U.S. Appl. No. 15/005,945, dated May 17, 2016, 9 pages.

Non-Final Office Action received for U.S, U.S. Appl. No. 15/128,952, dated Apr. 1, 2019, 20 pages.

Non-Final Office Action received for U.S. Appl. No. 15/128,952, dated Dec. 29, 2017, 13 pages.

Non-Final Office Action received for U.S, U.S. Appl. No. 15/348,204, dated Apr. 28, 2017, 22 pages.

Non-Final Office Action received for U.S. Appl. No. 15/348,204, dated Feb. 20, 2018, 28 pages.

Non-Final Office Action received for U.S. Appl. No. 15/425,273, dated Oct. 3, 2018, 10 pages.

Non-Final Office Action received for U.S. Appl. No. 15/431,435, dated Jun. 8, 2017, 13 pages.

Non-Final Office Action received for U.S. Appl. No. 14/841,455, dated Apr. 11, 2019, 13 pages.

Non-Final Office Action received for U.S. Appl. No. 13/312,618, dated Jun. 11, 2014, 11 pages.

Non-Finai Office Action received for U.S. Appl. No. 14/838,235, dated Jan. 5, 2016, 3 pages.

Notice of Acceptance received for Australian Patent Application No. 2012268312, dated Feb. 3, 2016, 2 pages.

Notice of Acceptance received for Australian Patent Application No. 2015267671, dated Apr. 4, 2018, 3 pages.

Notice of Acceptance received for Australian Patent Application No. 2015385757, dated Jul. 16, 2018, 3 pages.

Notice of Acceptance received for Australian Patent Application No. 2016203250, dated Mar. 15, 2018, 3 pages.

Notice of Acceptance received for Australian Patent Application No. 2016230001, dated May 25, 2018, 3 pages.

Notice of Acceptance received for Australian Patent Application No. 2018202751, dated Sep. 4, 2019, 3 pages.

Notice of Acceptance received for Australian Patent Application No. 2018204028, dated Jun. 12, 2019, 3 pages.

Notice of Acceptance received for Australian Patent Application No. 2018204430, dated Jun. 26, 2019, 3 pages.

Notice of Acceptance received for Australian Patent Application No. 2018247345, dated May 15, 2019, 3 pages.

Notice of Acceptance received for Australian Patent Application No. 2019246830, dated Oct. 24, 2019, 3 pages.

Notice of Acceptance received for Australian Patent Application No. 2015312369, dated Mar. 21, 2018, 3 pages.

Notice of Allowance received for Chinese Patent Application No. 201280027281.9, dated Jun. 13, 2017, 4 pages (2 pages of English Translation and 2 pages of Official Copy).

Notice of Allowance received for Chinese Patent Application No. 201510549056.7, dated Jul. 2, 2019, 2 pages (1 page of English Translation and 1 page of Official Copy).

Notice of Allowance received for Chinese Patent Application No. 201520669842.6, dated May 18, 2016, 4 pages (2 pages of English Translation and 2 pages of Official Copy).

Notice of Allowance received for Chinese Patent Application No. 201580028073.4, dated Oct. 22, 2019, 2 pages (1 page of English Translation and 1 page of Official Copy).

Notice of Allowance received for Chinese Patent Application No. 201580028505.1, dated Sep. 19, 2019, 2 pages (1 page of English Translation and 1 page of Official Copy).

Notice of Allowance received for Chinese Patent Application No. 201620830403.3, dated Sep. 8, 2017, 2 pages (1 page of English Translation and 1 page of Official Copy).

Notice of Allowance received for Chinese Patent Application No. 201810321928.8, dated Sep. 11, 2019, 2 pages (1 page of English Translation and 1 page of Official Copy).

Notice of Allowance received for Danish Patent Application No. PA201570550, dated Mar. 20, 2017, 2 pages.

Notice of Allowance received for Danish Patent Application No. PA201570771, dated Sep. 2, 2016, 2 pages.

Notice of Allowance received for Danish Patent Application No. PA201570773, dated Apr. 26, 2018, 2 pages.

Notice of Allowance received for Japanese Patent Application No. 2015-171114, dated Mar. 1, 2019, 3 pages (1 page of English Translation and 2 pages of Official Copy).

Notice of Allowance received for Japanese Patent Application No. 2016-569669, dated Mar. 19, 2018, 4 pages (1 page of English translation and 3 pages of Official Copy).

Notice of Allowance received for Japanese Patent Application No. 2017-510297, dated May 7, 2018, 4 pages (1 page of English Translation and 3 pages of Official Copy).

Notice of Allowance received for Japanese Patent Application No. 2017-545733, dated Jun. 1, 2018, 4 pages (1 page of English Translation and 3 pages of Official Copy).

Notice of Allowance received for Japanese Patent Application No. 2018-072632, dated Dec. 7, 2018, 4 pages (1 page of English Translation and 3 pages of Official Copy).

Notice of Allowance received for Japanese Patent Application No. 2018-126311, dated Feb. 1, 2019, 4 pages (1 page of English Translation and 3 pages of Official Copy).

Notice of Allowance received for Korean Patent Application No. 10-2013-7034852, dated Aug. 24, 2016, 3 pages (1 page of English Translation and 2 pages of Official Copy).

Notice of Allowance received for Korean Patent Application No. 10-2015-7007065, dated Aug. 28, 2019, 4 pages (2 pages of English Translation and 2 pages of Official Copy).

Notice of Allowance received for Korean Patent Application No. 10-2015-7037047, dated Oct. 30, 2017, 3 pages (Official Copy Only) {See Communication under 37 CFR § 1.98(a) (3)}.

Notice of Allowance received for Korean Patent Application No. 10-2016-7032902, dated Sep. 7, 2018, 3 pages (1 page of English Translation and 2 pages of Official Copy).

(56) References Cited

OTHER PUBLICATIONS

Notice of Allowance received for Korean Patent Application No. 10-2017-7005628, dated Jun. 18, 2018, 5 pages (2 page of English Translation and 3 pages of Official Copy).
Notice of Allowance received for Korean Patent Application No. 10-2017-7022905, dated Jul. 31, 2019, 4 pages (2 pages of English Translation and 2 pages of Official Copy).
Notice of Allowance Received for Korean Patent Application No. 10-2018-7027006, dated May 23, 2019, 4 pages (1 pages of English Translation and 3 pages of Official Copy).
Notice of Allowance received for Taiwanese Patent Application No. 104108223, dated Jan. 10, 2017, 3 pages (Official Copy Only) {See Communication under 37 CFR § 1.98(a) (3)}.
Notice of Allowance received for Taiwanese Patent Application No. 104128704, dated Feb. 21, 2018, 5 pages (2 pages of English Translation and 3 pages of Official Copy).
Notice of Allowance received for Taiwanese Patent Application No. 104133756, dated Nov. 30, 2017, 5 pages (2 pages of English Translation and 3 pages of Official Copy).
Notice of Allowance received for Taiwanese Patent Application No. 104133757, dated Jan. 18, 2017, 3 paaes (Official Copy only) {See Communication under 37 CFR § 1.98(a) (3)}.
Notice of Allowance received for U.S. Appl. No. 09/735,499, dated Aug. 30, 2011, 8 pages.
Notice of Allowance received for U.S. Appl. No. 13/489,415, dated Nov. 17, 2015, 12 pages.
Notice of Allowance received for U.S. Appl. No. 13/489,415, dated Oct. 22, 2015, 15 pages.
Notice of Allowance received for U.S. Appl. No. 14/838,235, dated Dec. 29, 2016, 4 pages.
Notice of Allowance Received for U.S. Appl. No. 14/838,235, dated Oct. 4, 2016, 7 pages.
Notice of Allowance received for U.S. Appl. No. 14/839,897, dated Jun. 8, 2018, 11 pages.
Notice of Allowance received for U.S. Appl. No. 14/839,903, dated Jan. 3, 2019, 7 pages.
Notice of Allowance received for U.S. Appl. No. 15/005,945, dated Aug. 12, 2016, 9 pages.
Notice of Allowance received for U.S. Appl. No. 15/348,204, dated Mar. 14, 2019, 11 pages.
Notice of Allowance received for U.S. Appl. No. 15/425,273, dated Mar. 7, 2019, 8 pages.
Notice of Allowance received for U.S. Appl. No. 15/431,435, dated Jan. 23, 2018, 8 pages.
Notice of Allowance received for U.S. Appl. No. 14/841,455, dated Oct. 22, 2019, 10 pages.
Notice of Allowance received for U.S, U.S. Appl. No. 13/312,618, dated Aug. 14, 2015, 9 pages.
Nozawa Naoki, et al., "iPad Perfect Manual for iOS 4", JPN, SOTEC Ltd., Yanagisawa Junichi, Dec. 31, 2010, pp. 189-190 (Official Copy Only) {See Communication under 37 CFR § 1.98(a) (3)}.
Office Action received for Australian Patent Application No. 2016230001, dated Feb. 7, 2018, 3 pages.
Office Action received for European Patent Application No. 15711969.4, dated Nov. 17, 2017, 9 pages.
Office Action received for Australian Patent Application No. 2012268312, dated Feb. 16, 2015, 3 pages.
Office Action received for Australian Patent Application No. 2015101188, dated Apr. 14, 2016, 3 pages.
Office Action received for Australian Patent Application No. 2015267671, dated Apr. 5, 2017, 2 pages.
Office Action received for Australian Patent Application No. 2015385757, dated Sep. 11, 2017, 3 pages.
Office Action received for Australian Patent Application No. 2016203250, dated May 26, 2017, 2 pages.
Office Action received for Australian Patent Application No. 2017100197, dated Apr. 28, 2017, 4 pages.
Office Action received for Australian Patent Application No. 2017100198, dated Apr. 20, 2017, 4 pages.
Office Action received for Australian Patent Application No. 2018202751, dated Apr. 2, 2019, 4 pages.
Office Action received for Australian Patent Application No. 2018204028, dated Apr. 17, 2019, 2 pages.
Office Action received for Australian Patent Application No. 2018204430, dated Aug. 15, 2018, 5 pages.
Office Action received for Australian Patent Application No. 2018220115, dated Oct. 4, 2019, 3 pages.
Office Action received for Australian Patent Application No. 2018247345, dated May 6, 2019, 2 pages.
Office Action received for Australian Patent Application No. 2015312369, dated Mar. 29, 2017, 3 pages.
Office Action received for Chinese Patent Application No. 201280027281.9, dated Jan. 4, 2016, 9 pages (English Translation Only).
Office Action received for Chinese Patent Application No. 201280027281.9, dated Sep. 21, 2016, 12 pages (4 pages of English Translation and 8 pages of Official Copy).
Office Action received for Chinese Patent Application No. 201510549056.7, dated Aug. 7, 2018, 7 pages (2 pages of English Translation and 5 pages of Official Copy).
Office Action received for Chinese Patent Application No. 201510549056.7, dated Mar. 15, 2019, 7 pages (3 pages of English Translation and 4 pages of Official Copy).
Office Action received for Chinese Patent Application No. 201510549056.7, dated Nov. 24, 2017, 15 pages (6 pages of English Translation and 9 pages of Official Copy).
Office Action received for Chinese Patent Application No. 201520669842.6, dated Dec. 4, 2015, 7 pages (4 pages of English Translation and 3 Pages of Official Copy).
Office Action received for Chinese Patent Application No. 201580028505.1, dated Jan. 16, 2019, 15 pages (5 pages of English Translation and 10 pages of Official Copy).
Office Action received for Chinese Patent Application No. 201580028505.1, dated Jun. 20, 2019, 7 pages (3 pages of English Translation and 4 pages of Official Copy).
Office Action Received for Chinese Patent Application No. 201620830403.3, dated Jun. 7, 2017, 2 pages (1 page of English Translation and 1 page of Official Copy).
Office Action Received for Chinese Patent Application No. 201620830403.3, dated Mar. 7, 2017, 3 pages (2 pages of English Translation and 1 page of Official Copy).
Office Action received for Chinese Patent Application No. 201810321928.8, dated Jul. 2, 2019, 10 pages (5 pages of English Translation and 5 pages of Official Copy).
Office Action received for Chinese Patent Application No. 201280027281.9, dated Mar. 2, 2017, 5 pages (2 pages of English Translation and 3 pages of Official Copy).
Office Action received for Danish Patent Application No. PA201570550, dated Dec. 7, 2015, 6 pages.
Office Action received for Danish Patent Application No. PA201570550, dated Jan. 19, 2016, 2 pages.
Office Action received for Danish Patent Application No. PA201570550, dated Oct. 19, 2016, 3 pages.
Office Action received for Danish Patent Application No. PA201570771, dated Mar. 17, 2016, 8 pages.
Office Action received for Danish Patent Application No. PA201570771, dated Jun. 13, 2016, 3 pages.
Office Action received for Danish Patent Application No. PA201570773, dated Aug. 28, 2017, 3 pages.
Office Action received for Danish Patent Application No. PA201570773, dated Feb. 15, 2017, 3 pages.
Office Action received for Danish Patent Application No. PA201570773, dated Sep. 12, 2016, 3 pages.
Office Action Received for Danish Patent Application No. PA201570773, dated Mar. 18, 2016, 9 pages.
Office Action received for Danish Patent Application No. PA201770125, dated Jan. 26, 2018, 5 pages.
Office Action received for Danish Patent Application No. PA201770125, dated Jul. 20, 2018, 2 pages.
Office Action received for Danish Patent Application No. PA201770126, dated Oct. 18, 2017, 3 pages.

(56) References Cited

OTHER PUBLICATIONS

Office Action received for European Patent Application No. 15759981.2, dated Apr. 19, 2018, 6 pages.
Office Action received for European Patent Application No. 15759981.2, dated Aug. 6, 2018, 10 pages.
Office Action received for European Patent Application No. 15759981.2, dated May 16, 2018, 6 pages.
Office Action received for European Patent Application No. 15787091.6, dated Aug. 2, 2019, 8 pages.
Office Action received for European Patent Application No. 15787091.6, dated Oct. 8, 2018, 7 pages.
Office Action received for European Patent Application No. 16710590.7, dated Mar. 15, 2019, 10 pages.
Office Action received for European Patent Application No. 18170262.2, dated May 16, 2019, 6 pages.
Office Action received for European Patent Application No. 18170262.2, dated May 27, 2019, 6 pages.
Office Action Received for European Patent Application No. 12727053.6, dated Jul. 4, 2018, 5 pages.
Office Action Received for European Patent Application No. 127270536, dated Mar. 21, 2016, 6 pages.
Office Action received for Japanese Patent Application No. 2018-126311, dated Nov. 2, 2018, 4 pages (2 pages of English Translation and 2 pages of Official Copy).
Office Action received for Japanese Patent Application No. 2014-513804, dated Nov. 28, 2014, 7 pages (4 pages of English Translation and 3 pages of Official Copy).
Office Action received for Japanese Patent Application No. 2015-171114, dated Dec. 22, 2017, 16 pages (8 pages of English Translation and 8 pages of Official Copy).
Office Action received for Japanese Patent Application No. 2015-171114, dated May 19, 2017, 11 Pages (6 pages of English Translation and 5 pages of Official Copy).
Office Action received for Japanese Patent Application No. 2015-171114, dated May 22, 2018, 11 pages (6 pages of English Translation and 5 pages of Official Copy).
Office Action received for Japanese Patent Application No. 2015-171114, dated Sep. 5, 2016, 6 pages (3 pages of English Translation and 3 pages of Official Copy).
Office Action received for Japanese Patent Application No. 2017-510297, dated Dec. 4, 2017, 5 pages (2 page of English Translation and 3 pages of Official Copy).
Office Action received for Japanese Patent Application No. 2017-510297, dated Jul. 10, 2017, 10 pages (5 pages of English Translation and 5 pages of Official Copy).
Office Action received for Japanese Patent Application No. 2017-543762, dated Apr. 8, 2019, 5 pages (2 pages of English Translation and 3 pages of Official Copy).
Office Action received for Japanese Patent Application No. 2017-543762, dated Jul. 9, 2018, 8 pages (4 pages of English Translation and 4 pages of Official Copy).
Office Action received for Japanese Patent Application No. 2017-545733, dated Feb. 13, 2018, 7 pages (3 pages of English Translation and 4 pages of Official Copy).
Office Action received for Japanese Patent Application No. 2018-071908, dated Jan. 28, 2019, 11 pages (5 pages of English Translation and 6 pages of Official Copy).
Office Action received for Japanese Patent Application No. 2018-072632, dated Jul. 9, 2018, 5 Pages (2 Pages of English Translation and 3 pages of Official Copy).
Office Action received for Japanese Patent Application No. 2018-080122, dated Aug. 9, 2019, 5 pages (2 pages of English Translation and 3 pages of Official Copy).
Office Action received for Japanese Patent Application No. 2018-080122, dated Jan. 28, 2019, 11 pages (6 pages of English Translation and 5 pages of Official Copy).
Office Action received for Korean Patent Application No. 10-2013-7034852, dated Apr. 26, 2016, 6 pages (3 pages of English Translation and 3 pages of Official Copy).

Office Action received for Korean Patent Application No. 10-2013-7034852, dated Jul. 30, 2015, 6 pages (3 pages English Translation and 3 pages of Official Copy).
Office Action received for Korean Patent Application No. 10-2013-7034852, dated Nov. 19, 2014, 7 pages (3 pages of English Translation and 4 pages of Official Copy).
Office Action received for Korean Patent Application No. 10-2015-7007065, dated Aug. 21, 2017, 5 pages (2 pages of English Translation and 3 pages of Official Copy).
Office Action received for Korean Patent Application No. 10-2015-7007065, dated Dec. 24, 2018, 9 pages (4 pages of English translation and 5 pages of Official Copy).
Office Action received for Korean Patent Application No. 10-2015-7007065, dated Feb. 28, 2018, 8 pages (4 page of English Translation and 4 pages of Official Copy).
Office Action received for Korean Patent Application No. 10-2015-7037047, dated Mar. 15, 2016, 11 pages (5 pages of English Translation and 6 pages of Official Copy).
Office Action received for Korean Patent Application No. 10-2015-7037047, dated Nov. 29, 2016, 10 pages (5 pages of English translation and 5 pages of Official Copy).
Office Action received for Korean Patent Application No. 10-2017-7005628, dated Jan. 30, 2018, 6 pages (2 pages of English translation and 4 pages of Official Copy).
Office Action received for Korean Patent Application No. 10-2017-7005628, dated May 10, 2017, 12 pages (5 pages of English Translation and 7 pages of Official Copy).
Office Action received for Korean Patent Application No. 10-2017-7022905, dated Oct. 22, 2018, 9 pages (4 pages of English Translation and 5 pages of official copy).
Office Action Received for Korean Patent Application No. 10-2018-7027006, dated Jan. 14, 2019, 6 pages (2 pages of English Translation and 4 pages of Official Copy).
Office Action received for Korean Patent Application No. 10-2019-7024901, dated Sep. 26, 2019, 6 pages (2 pages of English Translation and 4 pages of Official Copy).
Office Action received for Taiwanese Patent Application No. 104108223, dated Apr. 25, 2016, 10 pages (5 pages of English Translation and 5 pages of Official Copy).
Office Action received for Taiwanese Patent Application No. 104128704, dated Jul. 31, 2017, 7 pages (3 pages of English Translation and 4 pages of Official Copy).
Office Action received for Taiwanese Patent Application No. 104128704, dated Nov. 2, 2016, 12 pages (5 pages of English Translation and 7 pages of Official Copy).
Office Action received for Taiwanese Patent Application No. 104133756, dated May 17, 2017, 13 pages (6 pages of English Translation and 7 pages of Official Copy).
Office Action received for Taiwanese Patent Application No. 104133757, dated Jul. 6, 2016, 22 pages (9 pages of English Translation and 13 pages of Official Copy).
Patterson, Ben, "iOS 7 tip: Alerts, banners, and badgesâwhats the difference?", Available online at: https://web.archive.org/web/20140128072440/http://heresthethingblog.com/2014/01/22/ios-7-tip-whats-difference-alert/, Jan. 22, 2014, 5 pages.
Saitou, Kazuo, "Web Site expert", vol. 32, Oct. 25, 2010, 8 pages (Official Copy Only) {See Communication under 37 CFR § 1.98(a)(3)}.
Samsung Gear 2, "User Manual", Available online at: http://www.manualslib.com/download/754923/Samsung-Gear-2.html, 2014, pp. 1-97.
Samsung "User Manual", SM-R380_UM_EU_Eng_D13_140411.pdf, Apr. 2014, 78 pages.
Samsung, "Samsung Gear 2 User manual", Online Available at: https://data2.manualslib.com/pdf3/76/7550/754923-samsung/gear_2.pdf?7eb313a9f65b1566bcf9ff58661c6b3a&take=binary, XP055464984, retrieved on Apr. 5, 2018, Apr. 9, 2014, pp. 1-97.
Search Report and Opinion received for Netherlands Patent Application No. 2015354, dated Jun. 22, 2017, 24 pages (10 pages of English Translation and 14 pages of Official Copy).
Search Report and Opinion received for Netherlands Patent Application No. 2019878, dated Apr. 6, 2018, 24 pages (12 pages of English Translation and 12 pages of Official Copy).

(56) References Cited

OTHER PUBLICATIONS

Search Report received for Danish Patent Application No. PA201770125, dated May 5, 2017, 10 pages.
Search Report received for Danish Patent Application No. PA201770126, dated Apr. 26, 2017, 8 pages.
Shankland, Stephen, "Chrome OS Gets 'OK Google' Voice Search Control", Available online at: http://www.cnet.com/news/chrome-os-gets-ok-google-voice-search-control/, May 21, 2014, 4 pages.
Summons to Attend Oral Proceedings received for European Patent Application No. 15711969.4, mailed on Oct. 22, 2018, 12 pages.
Office Action received for Australian Patent Application No. 2018203708, dated Aug. 15, 2019, 5 pages.
Notice of Allowance received for Japanese Patent Application No. 2018-071908, dated Nov. 25, 2019, 8 pages (5 pages of English Translation and 3 pages of Official Copy).
Office Action received for European Patent Application No. 18170262.2, dated Dec. 9, 2019, 3 pages.
Extended European Search Report received for European Patent Application No. 19203942.8, dated Apr. 1, 2020, 10 pages.
Non-Final Office Action received for U.S. Appl. No. 16/281,838, dated Mar. 26, 2020, 18 pages.
Notice of Allowance received for U.S. Appl. No. 14/838,263, dated Mar. 24, 2020, 9 pages.
Vanhemert, Kyle, "Why Siri Could Be the Killer App for Smartwatches", XP002798416, Retrieved from the Internet: URL: https://www.wired.com/2013/12/what-can-a-smartwatch-really-do/,Dec. 19, 2013, 14 pages.
Applicant-Initiated Interview Summary received for U.S. Appl. No. 14/838,263, dated Jan. 17, 2020, 6 pages.
Decision to Grant received for European Patent Application No. 15759981.2, dated Jan. 8, 2020, 2 pages.
Examiner's Answer to Appeal Brief received for U.S. Appl. No. 15/128,952, mailed on Jan. 8, 2020, 9 pages.
Non-Final Office Action received for U.S. Appl. No. 14/475,446, dated Mar. 18, 2020, 20 pages.
Intention to Grant Received for European Patent Application No. 12727053.6, dated Mar. 6, 2020, 8 pages.
Chenzai, "Apple, Please Don't Screw up Notifications on the Apple Watch", published on Sep. 18, 2014 on Digi Tech QQ in Chinese <https://digi.tech.qq.com/a/20140918/060747.htm>, English publication by Hamburger published on Sep. 9, 2014 on the Verge <https://www.theverge.com/2014/9/9/6127913/apple-please-dont-screw-up-notifications-on-the-apple-watch>, 8 pages (4 pages of Official Copy and 4 pages of English Translation).
Non-Final Office Action received for U.S. Appl. No. 14/977,219, dated Feb. 7, 2020, 10 pages.
Office Action received for Chinese Patent Application No. 201580077218.X, dated Feb. 3, 2020, 23 pages (6 pages of English Translation and 17 pages of Official Copy).
Office Action received for European Patent Application No. 15727130.5, dated Feb. 14, 2020, 4 pages.
Office Action received for Chinese Patent Application No. 201680011682.3, dated Dec. 2, 2019, 14 pages (7 pages of English Translation and 7 pages of Official Copy).
Examiner's Pre-Review Report received for Japanese Patent Application No. 2018-080122, dated Feb. 25, 2020, 6 pages (3 pages of English Translation and 3 pages of Official Copy).
Notice of Allowance received for Japanese Patent Application No. 2017-543762, dated Mar. 30, 2020, 4 pages (1 page of English Translation and 3 pages of Official Copy).
Office Action received for Japanese Patent Application No. 2019-000698, dated Mar. 9, 2020, 8 pages (4 pages of English Translation and 4 pages of Official Copy).
Applicant Initiated Interview Summary received for U.S. Appl. No. 16/507,664, dated Aug. 26, 2020, 5 pages.
Applicant Initiated Interview Summary received for U.S. Appl. No. 16/669,187, dated Jul. 2, 2021, 3 pages.
Applicant-Initiated Interview Summary received for U.S. Appl. No. 14/475,446, dated May 3, 2021, 3 pages.
Applicant-Initiated Interview Summary received for U.S. Appl. No. 16/281,838, dated Jun. 2, 2020, 5 pages.
Applicant-Initiated Interview Summary received for U.S. Appl. No. 16/434,747, dated Sep. 8, 2021, 4 pages.
Applicant-Initiated Interview Summary received for U.S. Appl. No. 16/669,187, dated Nov. 23, 2020, 3 pages.
Applicant-Initiated Interview Summary received for U.S. Appl. No. 16/880,714, dated Feb. 26, 2021, 5 pages.
Brief Communication Regarding Oral Proceedings received for European Patent Application No. 18170262.2, dated Oct. 4, 2021, 2 pages.
Corrected Notice of Allowance received for U.S. Appl. No. 16/281,838, dated Oct. 30, 2020, 2 pages.
Corrected Notice of Allowance received for U.S. Appl. No. 16/507,664, dated Nov. 27, 2020, 7 pages.
Decision on Appeal received for U.S. Appl. No. 15/128,952, dated Dec. 28, 2020, 23 pages.
Decision to Grant received for European Patent Application No. 12727053.6, dated Aug. 27, 2020, 2 pages.
Decision to Grant received for European Patent Application No. 15787091.6, dated Dec. 3, 2020, 2 pages.
Decision to Grant received for European Patent Application No. 16710590.7, dated Oct. 28, 2021, 2 pages.
European Search Report received for European Patent Application No. 20192404.0, dated Nov. 20, 2020, 4 pages.
Extended European Search Report received for European Patent Application No. 20195339.5, dated Dec. 11, 2020, 7 pages.
Final Office Action received for U.S. Appl. No. 14/475,446, dated Jun. 11, 2021, 23 pages.
Final Office Action received for U.S. Appl. No. 16/669,187, dated Mar. 31, 2021, 46 pages.
Final Office Action received for U.S. Appl. No. 17/031,702, dated Oct. 21, 2021, 16 pages.
Intention to Grant received for European Patent Application No. 15727130.5, dated Oct. 19, 2021, 8 pages.
Intention to Grant received for European Patent Application No. 15787091.6, dated Apr. 23, 2020, 7 pages.
Intention to Grant received for European Patent Application No. 15787091.6, dated Sep. 30, 2020, 7 pages.
Intention to Grant received for European Patent Application No. 16710590.7, dated Jun. 14, 2021, 8 pages.
Intention to Grant received for European Patent Application No. 18170262.2, dated Jun. 30, 2020, 8 pages.
Intention to Grant received for European Patent Application No. 18170262.2, dated Oct. 27, 2021, 8 pages.
Intention to Grant received for European Patent Application No. 12727053.6, dated Aug. 4, 2020, 8 pages.
International Search Report and Written Opinion received for PCT Patent Application No. PCT/US2020/034155, dated Sep. 17, 2020, 19 pages.
International Search Report and Written Opinion received for PCT Patent Application No. PCT/US2020/035164, dated Feb. 8, 2021, 26 pages.
International Search Report and Written Opinion received for PCT Patent Application No. PCT/US2020/052041, dated Feb. 8, 2021, 18 pages.
Invitation to Pay Additional Fees and Partial International Search Report received for PCT Patent Application No. PCT/US2020/035164, dated Oct. 16, 2020, 14 pages.
Invitation to Pay Additional Fees received for PCT Patent Application No. PCT/US2020/034155, mailed on Jul. 27, 2020, 12 pages.
Kern et al., "Context-Aware Notification for Wearable Computing", Perceptual Computing and Computer Vision, Proceedings of the Seventh IEEE International Symposium on Wearable Computers, 2003, 8 pages.
Non-Final Office Action received for U.S. Appl. No. 16/507,664, dated May 11, 2020, 16 pages.
Non-Final Office Action received for U.S. Appl. No. 14/475,446, dated Mar. 9, 2021, 22 pages.
Non-Final Office Action received for U.S. Appl. No. 16/434,747, dated Jun. 10, 2021, 13 pages.
Non-Final Office Action received for U.S. Appl. No. 16/669,187, dated Sep. 25, 2020, 40 pages.

(56) References Cited

OTHER PUBLICATIONS

Non-Final Office Action received for U.S. Appl. No. 16/880,714, dated Oct. 28, 2020, 11 pages.
Non-Final Office Action received for U.S. Appl. No. 17/031,700, dated May 11, 2021, 10 pages.
Non-Final Office Action received for U.S. Appl. No. 17/031,702, dated Apr. 26, 2021, 13 pages.
Notice of Acceptance received for Australian Patent Application No. 2018220115, dated Jun. 29, 2020, 3 pages.
Notice of Acceptance received for Australian Patent Application No. 2020200028, dated Nov. 10, 2020, 3 pages.
Notice of Allowance received for Chinese Patent Application No. 201580077218.X, dated Nov. 13, 2020, 2 pages (1 page of English Translation and 1 page of Official Copy).
Notice of Allowance received for Chinese Patent Application No. 201680011682.3, dated Aug. 5, 2020, 2 pages (1 page of English Translation and 1 page of Official Copy).
Notice of Allowance received for Chinese Patent Application No. 201710734839.1, dated Dec. 4, 2020, 3 pages (1 page of English Translation and 2 pages of Official Copy).
Notice of Allowance received for Japanese Patent Application No. 2018-080122, dated May 7, 2021, 28 pages (1 page of English Translation and 27 pages of Official Copy).
Notice of Allowance received for Japanese Patent Application No. 2019-000698, dated Feb. 8, 2021, 4 pages (1 page of English Translation and 3 pages of Official Copy).
Notice of Allowance received for Korean Patent Application No. 10-2018-7035747, dated Dec. 9, 2020, 5 pages (2 pages of English Translation and 3 pages of Official Copy).
Notice of Allowance received for Korean Patent Application No. 10-2019-7024901, dated May 12, 2020, 5 pages (2 pages of English Translation and 3 pages of Official Copy).
Notice of Allowance received for U.S. Appl. No. 16/281,838, dated Aug. 26, 2020, 9 pages.
Notice of Allowance received for U.S. Appl. No. 16/281,838, dated May 20, 2021, 9 pages.
Notice of Allowance received for U.S. Appl. No. 16/507,664, dated Oct. 15, 2020, 11 pages.
Notice of Allowance received for U.S. Appl. No. 16/880,714, dated Jun. 9, 2021, 6 pages.
Notice of Allowance received for U.S. Appl. No. 16/880,714, dated Mar. 19, 2021, 7 pages.
Notice of Allowance received for U.S. Appl. No. 17/031,700, dated Oct. 14, 2021, 11 pages.
Office Action received for Australian Patent Application No. 2018220115, dated Apr. 21, 2020, 3 pages.
Office Action received for Australian Patent Application No. 2020200028, dated Sep. 24, 2020, 3 pages.
Office Action received for Australian Patent Application No. 2020239692, dated Jul. 20, 2021, 5 pages.
Office Action received for Chinese Patent Application No. 201710734839.1, dated Apr. 14, 2020, 20 pages (11 pages of English Translation and 9 pages of Official Copy).
Office Action received for Chinese Patent Application No. 201710734839.1, dated Aug. 24, 2020, 6 pages (3 pages of English Translation and 3 pages of Official Copy).
Office Action received for Chinese Patent Application No. 201810654707.2, dated Mar. 1, 2021, 23 pages (8 pages of English translation and 15 pages of Official Copy).
Office Action received for Chinese Patent Application No. 202010009882.3, dated Aug. 9, 2021, 11 pages (5 pages of English Translation and 6 pages of Official Copy).
Office Action received for Danish Patent Application No. PA202070620, dated May 10, 2021, 5 pages.
Office Action received for European Patent Application No. 15727130.5, dated Nov. 19, 2020, 5 pages.
Office Action received for European Patent Application No. 19203942.8, dated Oct. 29, 2021, 6 pages.
Office Action received for European Patent Application No. 20192404.0, dated Dec. 2, 2020, 8 pages.
Office Action received for European Patent Application No. 20192404.0, dated Jun. 8, 2021, 7 pages.
Office Action received for Japanese Patent Application No. 2018-080122, dated Nov. 27, 2020, 16 pages (8 pages of English Translation and 8 pages of Official Copy).
Office Action received for Japanese Patent Application No. 2019000698, dated Oct. 23, 2020, 4 pages (2 pages of English Translation and 2 pages of Official Copy).
Office Action received for Japanese Patent Application No. 2019-234184, dated Jan. 29, 2021, 6 pages (3 pages of English Translation and 3 pages of Official Copy).
Office Action received for Korean Patent Application No. 10-2018-7035747, dated Apr. 9, 2020, 11 pages (5 pages of English Translation and 6 pages of Official Copy).
Office Action received for Korean Patent Application No. 10-2018-7035747, dated Oct. 14, 2020, 6 pages (3 pages of English Translation and 3 pages of Official Copy).
Result of Consultation received for European Patent Application No. 16710590.7, dated Dec. 7, 2020, 4 pages.
Result of Consultation received for European Patent Application No. 18170262.2, dated Jan. 18, 2021, 3 pages.
Search Report and Opinion received for Danish Patent Application No. PA202070620, dated Dec. 11, 2020, 9 pages.
Summons to Attend Oral Proceedings received for European Patent Application No. 18170262.2, mailed on Dec. 15, 2020, 5 pages.
Supplemental Notice of Allowance received for U.S. Appl. No. 16/880,714, dated Sep. 16, 2021, 2 pages.
Office Action received for Chinese Patent Application No. 202110011509.6, dated Oct. 11, 2021, 10 pages (5 pages of English Translation and 5 pages of Official Copy).
Office Action received for Japanese Patent Application No. 2019-234184, dated Oct. 15, 2021, 8 pages (4 pages of English Translation and 4 pages of Official Copy).
Final Office Action received for U.S. Appl. No. 16/434,747, dated Nov. 26, 2021, 14 pages.
Office Action received for Danish Patent Application No. PA202070620, dated Nov. 19, 2021, 2 pages.
Office Action received for Australian Patent Application No. 2021201059, dated Feb. 15, 2022, 4 pages.
Notice of Allowance received for Chinese Patent Application No. 202010009882.3 dated Jan. 14, 2022, 4 pages (1 page of English Translation and 3 pages of Official Copy).
Decision to Grant received for European Patent Application No. 15727130.5, dated Mar. 3, 2022, 3 pages.

* cited by examiner

COORDINATING DEVICE

MOBILE DEVICE

MESSAGE PROCESSING BY SUBSCRIBER APP PRIOR TO MESSAGE FORWARDING

CROSS-REFERENCE TO RELATED APPLICATIONS

This application claims the benefit of and priority to U.S. Provisional Application No. 62/004,346, filed on May 29, 2014, which is hereby incorporated by reference in its entirety for all purposes.

FIELD OF INVENTION

The present disclosure relates generally to device forwarding of app messages and inter-device communications to coordinate presentations of (e.g., visual) notification presentations and/or (e.g., audio or haptic) alerts for messages.

BACKGROUND

Electronic devices are frequently used to notify a user of a variety of events. In some instances, a sound alert initially notifies a user of an event, and additional detail can be viewed using an application operating on the device. For example, a computer can emit a tone when a new email for a user email account has been received, or a phone can play an audio signal when a new text message is received. However, nowadays, a single user can use multiple devices. Which device is most convenient to the user for alerts and/or notification presentations can depend on the day, time and/or other factors.

In some instances, each device of a user can be configured to receive a single event. For example, multiple devices can be configured to access email from a same account. This can provide some conveniences, as it may be more likely that a user is near at least one device to be notified of a new email. However, it can also result in multiple, redundant alerts of the email. For example, FIG. 1 illustrates a situation in which a user 105 is near three electronic devices: a phone 110a, a tablet computer 110b and a laptop computer 110c. When a new email is received via an account of user 105, each of devices 110a-110c sound can sound an alert. Given the location of user 105 and of devices 110a-110c, the alerts can be redundant with each other and potentially annoying to user 105. Further, such configurations can increase a load on a server associated with the event. Thus, it would be desirable to coordinate between devices such that messages are available on multiple devices but in a manner that reduces server load and redundant alerts.

SUMMARY

In some embodiments, a computer-implemented method can be provided that can include detecting, at a coordinating device, a message and determining a location characteristic of a mobile device. The method can also include determining, based on the location characteristic, that a proximate condition is satisfied and determining whether the coordinating device is in an active mode. When it is determined that the coordinating device is in the active mode, a coordinating-device alert can be presented at the coordinating device. When it is determined that the coordinating device is not in the active mode, a signal can be transmitted to the mobile device that corresponds to an invitation to present a mobile-device alert corresponding to the message.

In some embodiments, a computer-implemented method can be provided that can include detecting, at a mobile device, a message at a first time and monitoring a communication channel to determine whether a signal corresponding to an invitation to present an alert corresponding to the message is received from a coordinating device within a time period from the first time. When the signal is received from the coordinating device within the time period, it can be identified whether the mobile device is in an active mode. When it is identified that the mobile device is in the active mode, a mobile-device alert for the message can be presented at the mobile device and a second signal can be transmitted to the coordinating device. The second signal can indicate that the mobile device is handling presentation of the alert for the message. When the signal is not received from the coordinating device within the time period, a mobile-device alert for the message can be presented.

In some embodiments, a coordinating device can be provided. The coordinating device can include an output component configured to output stimuli and a connection component configured to transmit communications to other devices. The coordinating device can also include one or more processors coupled to the output component and the connection component and a computer-readable storage medium containing instructions, that, when executed by the one or more processors, cause the one or more processors to perform actions. The actions can include part or all of one or more methods disclosed herein.

In some embodiments, a mobile device can be provided that can include an output component configured to output stimuli and a connection component configured to transmit communications over one or more communication channels to other devices. The mobile device can also include one or more processors coupled to the output component and the connection component and a computer-readable storage medium containing instructions, that, when executed by the one or more processors, cause the one or more processors to perform actions. The actions can include part or all of one or more methods disclosed herein.

In some embodiments, a coordinating device system can be provided. The coordinating device system can include a detection module for detecting a message and a device detector module for determining a location characteristic of a mobile device and determining, based on the location characteristic, that a proximate condition is satisfied. The coordinating device system can include a mode detection module for determining whether the coordinating device system is in an active mode and an output module for, when it is determined that the coordinating device is in the active mode, presenting a coordinating-device alert at the coordinating device system. The coordinating device system can include an alert coordination module for, when it is determined that the coordinating device is not in the active mode, transmitting a signal to the mobile device that corresponds to an invitation to present a mobile-device alert corresponding to the message.

In some embodiments, a mobile device system can be provided. The mobile device system can include a detection module for detecting a message at a first time and an alert coordination module for determining whether a signal corresponding to an invitation to present an alert corresponding to the message is received from a coordinating device within a time period from the first time. The mobile device system can also include a mode detection module for identifying, when the signal corresponding to the invitation to present the alert corresponding to the message is received from the coordinating device within the time period from the first time, whether the mobile device system is in an active mode. The mobile device system can further include an output module for presenting an alert for the message when the signal is received from the coordinating device within the time period and the mobile device system is in the active mode or the signal is not received from the coordinating device within the time period. The alert coordination module can further be for transmitting a second signal to the coordinating device when the signal is received from the coordinating device within the time period and when the mobile electronic is in the active mode. The second signal can indicate that the mobile device system is handling presentation of the alert for the message.

In some embodiments, a system can be provided that includes a coordinating device system and a mobile device system disclosed herein. In some embodiments, a system can be provided that includes a coordinating device and a mobile device disclosed herein.

In some embodiments, a computer-implemented method can be provided. The method can include detecting, at a coordinating device, a message and identifying an app associated with the message. The method can further include determining whether the app can be identified on a blacklist and, when it is determined that the app is not identified on the blacklist: a mobile device can be identified (where each of the coordinating device and the other electronic device can be associated with a same account) and it can be determined whether a subscribing app is subscribed to process the message. The subscribing app can include the app associated with the message or another app. When it is determined that a subscribing app is subscribed to process the message and when it is determined that the app is not identified on the blacklist, the subscribing app can be enabled to process the message, the processed message can be accessed; and a signal can be transmitted from the coordinating device that includes the processed message to the mobile device. When it is determined that a subscribing app is not subscribed to process the message, a signal can be transmitted from the coordinating device to the mobile device. The signal can include at least part of the message. When it is determined that the app is identified on the blacklist, the coordinating device can refrain from forwarding the message or processed version thereof to the other electronic device. A location characteristic of the mobile device can be determined. Based on the location characteristic, it can be determined that a proximate condition is satisfied. The coordinating device can determine whether the coordinating device is in an active mode. When it is determined that the coordinating device is in the active mode, a coordinating-device alert can be presented at the coordinating device. When it is determined that the coordinating device is not in the active mode, a signal can be transmitted to the mobile device. The signal can correspond to an invitation to present a mobile-device alert corresponding to the message.

In some embodiments, a computer-implemented method can be provided. The method can include detecting, at a coordinating device, a message, and identifying an app associated with the message. The method can also include determining, based on the identified app, whether the coordinating device is to handle message forwarding for the app; and when it is determined that the coordinating device is to handle message forwarding for the app: identifying another electronic device. Each of the coordinating device and the other electronic device can be associated with a same account. The method can further include transmitting, from the coordinating device, a signal to the other electronic device. The signal can include at least part of the message. In some instances, only one of the coordinating device and the other device presents an audio or haptic alert for the message.

Determining whether the coordinating device is to handle message forwarding for the app can include determining whether the app is identified on a blacklist. It can be determined that the coordinating device is not to handle message forwarding for the app when it is determined that the app is identified on the blacklist. An operating system for the coordinating device can include the blacklist. The blacklist can be static such that which apps are identified on the blacklist does not change. Determining whether the coordinating device is to handle message forwarding for the app can include determining whether the app is associated with an electronic subscriber for handling message distribution. It can be determined that the coordinating device is not to handle message forwarding for the app when the app has a subscriber.

Determining whether the coordinating device is to handle message forwarding for the app can include performing a look-up technique using an identifier of the app. The coordinating device can present the audio or haptic alert for the message when it is determined that the coordinating device is in an active mode or when neither the coordinating device nor the other device is determined to be in the active mode. Determining whether the coordinating device is in the active mode can include determining whether a screen of the coordinating device is on or unlocked.

The method can be performed by a daemon executing on the coordinating device. Detecting the message can include receiving a first signal that can include the message from a server. The signal transmitted to the other electronic device can lack at least some of the data in the first signal. The other electronic device can be a wearable electronic device. When it is determined that the coordinating device is to handle message forwarding for the app, a plurality of other electronic devices can be identified. Each of the other electronic device and the coordinating device can be associated with the same account. The plurality of other electronic devices can include the other electronic device. Further, when it is determined that the coordinating device is to handle message forwarding for the app, a signal can be transmitted from the coordinating device to each of the other electronic devices. The signal can include at least part of the message.

In some embodiments, a computer-implemented method can be provided that includes receiving, at a mobile device, a first message that was forwarded to the mobile device by a coordinating device. The message can be associated with a first app for which the coordinating device is to handle message forwarding. The method can also include determining that another device is to handle alert presentation for the first message and, in response to determining that another device is to handle alert presentation for the message, suppressing, at the mobile device, a presentation of a non-visual alert for the first message. The method can further include receiving, at the mobile device, a second message from a source. In some instances, the source is not the coordinating device. The message can be associated with a second app for which the coordinating device is not to handle message forwarding. The method can further include presenting a non-visual alert for the second message.

Suppressing the presentation of the non-visual alert can include not presenting the non-visual alert for the first message. Determining that the other device is to handle alert presentation for the first message can include determining that an alert-presentation invitation was not received for the first message within a defined time period. The source can be a remote server. The mobile device and the coordinating device can be connected via a short-range connection.

In some embodiments, a coordinating device is provided. The device can include an output component configured to output stimuli and a connection component configured to transmit communications over one or more communication channels to other devices. The device can also include one or more processors coupled to the output component and the connection component and a computer-readable storage medium containing instructions, that, when executed by the one or more processors, cause the one or more processors to perform a method disclosed herein.

In some embodiments, a mobile device is provided. The device can include an output component configured to output stimuli and a connection component configured to receive communications over one or more communication channels from other devices. The device can also include one or more processors coupled to the output component and the connection component and a computer-readable storage medium containing instructions, that, when executed by the one or more processors, cause the one or more processors to perform actions including a method disclosed herein.

In some embodiments, a coordinating device system is provided. The system can include a detection module for detecting a message and an app identification module for identifying an app associated with the message. The system can also include a notification distribution module for determining, based on the identified app, whether the coordinating device is to handle message forwarding for the app and identifying, when it is determined that the coordinating device is to handle message forwarding for the app, an other electronic devices. Each of the coordinating device system and the other electronic device can be associated with a same account. When it is determined that the coordinating device is to handle message forwarding for the app, the notification distribution module can transmit, from the coordinating device system, a signal to the other electronic device. The signal can include at least part of the message. In some instances, only one of the coordinating device system and the other device presents an audio or haptic alert for the message.

In some embodiments, a mobile device system is provided. The system can include a detection module for receiving a first message that was forwarded to the mobile device system by a coordinating device. The message can be associated with a first app for which the coordinating device is to handle message forwarding. The detection module can further be for receiving a second message from a source. In some instances, the source is not the coordinating device. The message can be associated with a second app for which the coordinating device is not to handle message forwarding. The system can also include an alert coordination module for determining that another device is to handle alert presentation for the first message. The system can further include an output module for suppressing, in response to determining that another device is to handle alert presentation for the first message, a presentation of a non-visual alert for the first message and for presenting a non-visual alert for the second message.

In some instances, a system is provided that includes a coordinating device system disclosed herein and a mobile device system disclosed herein. In some instances, a system is provided that includes a coordinating device disclosed herein and a mobile device disclosed herein.

In some embodiments, a computer-implemented method can be provided. The method can include detecting, at a coordinating device, a message. The message can be generated locally at the coordinating device or received at the coordinating device from a remote source. The method can also include identifying an app that is subscribed to process the message and enabling the app to process the message. The method can further include identifying an other electronic device. Each of the coordinating device and the other electronic device can be associated with a same account. The method can still further include transmitting, from the coordinating device, a signal that includes the processed message to the other electronic device.

In some embodiments, a computer-implemented method that can include receiving, at an electronic device, a signal transmitted from a coordinating device. The signal can include data corresponding to an event message generated locally at the coordinating device representing an event or a received message received at the coordinating device from a remote source. Each of the coordinating device and the electronic device is associated with a same account. The method can further include identifying an app associated with the signal and enabling the app to transform, at the electronic device, the data in the signal into a notification representing the event or the received message. The method can also include generating a visual notification presentation for the notification and presenting the visual notification presentation.

In some embodiments, a coordinating device can be provided that can include a connection component configured to transmit communications over one or more communication channels to other devices and one or more processors coupled to the connection component. The coordinating device can also include a computer-readable storage medium containing instructions, that, when executed by the one or more processors, cause the one or more processors to perform some or all actions included in one or more methods disclosed herein.

In some embodiments, an electronic device can be provided that can include an output component configured to output stimuli and a connection component configured to transmit communications over one or more communication channels to other devices. The electronic device can also include one or more processors coupled to the output component and the connection component and a computer-readable storage medium containing instructions, that, when executed by the one or more processors, cause the one or more processors to perform some or all actions included in one or more methods disclosed herein.

In some embodiments, a coordinating device system can be provided that can include a detection module for detecting a message. The message can be generated locally at the coordinating device system or received at the coordinating device system from a remote source. The coordinating device system can also include a subscriber detection module for identifying an app that is subscribed to process the message and a notification distribution module for enabling the app to process the message; and transmitting a signal that includes the processed message to an other electronic device. The coordinating device system can further include a destination identification module for identifying the other electronic device. Each of the coordinating device system and the other electronic device can be associated with a same account.

In some embodiments, a system can be provided that can include a detection module for receiving a signal transmitted from a coordinating device. The signal can include data corresponding to an event message generated locally at the coordinating device representing an event or a received message received at the coordinating device from a remote source. Each of the coordinating device and the system can be associated with a same account. The system can also include an app identification module for identifying an app associated with the signal and an other-device distribution module for enabling the app to transform the data in the signal into a notification representing the event or the received message. The system can further include an output module for generating a visual notification presentation for the notification; and presenting the visual notification presentation.

In some instances, a system is provided that includes a coordinating device system disclosed herein and a system disclosed herein. In some instances, a system is provided that includes a coordinating device disclosed herein and an electronic device disclosed herein.

The following detailed description together with the accompanying drawings will provide a better understanding of the nature and advantages of the present invention.

DETAILED DESCRIPTION

Figure 1:
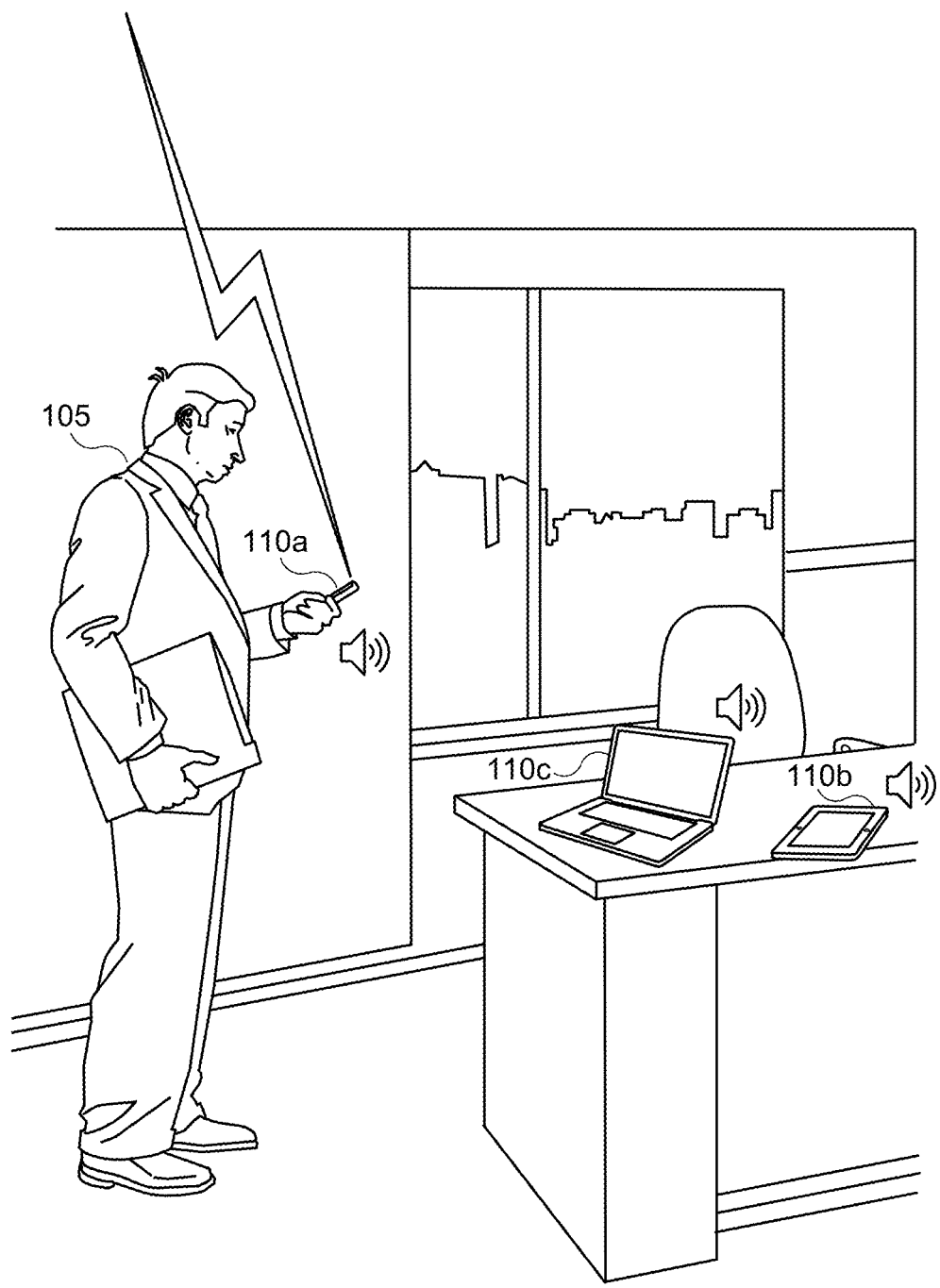
FIG. 1 shows an example of multiple nearby devices redundantly presenting an alert on a single message.

Certain embodiments of the present invention can facilitate distribution of event messages across devices and coordinated alert presentation. This facilitation can reduce a number of devices that a server is to communicate a message to, while still allowing the message to be availed to multiple devices.

As described in further detail herein, in some embodiments, a device (e.g., a coordinating device) can detect a message or notification of a message. For example, the device can receive the message from a server or other device (e.g., associated with a shared user account or a paired device) or can locally generate the message (e.g., upon detecting a time associated with a calendar event, a stock price crossing a threshold or a sensor measurement crossing a threshold). For example, a daemon can detect a new notification representing the new message (e.g., on a notification board) or a signal from a server including a new message. The message can include received content (e.g., originating from another user or source) and/or can represent an occurrence of an event.

Upon detecting the message, the device can identify an app associated with the message (e.g., an SMS app, an email app, a social-network app, etc.) and can generate a notification for the message (e.g., identifying an associated app, a source, a time and/or part or all of the message content). The device can then add the notification to a notification board.

A blacklist can be accessed that identifies one or more apps for which messages are not to be forwarded by a notification distributor on the coordinating device. Further, a subscriber structure (e.g., table) can be accessed that identifies whether each of one or more apps has a subscriber that will handle message distribution, such that the notification distributor need not forward messages for those apps.

If an app for a message neither is included on the blacklist nor has a distribution-handling subscriber, the coordinating device can generate a signal based on the message and send the signal to a mobile device. In some instances, the signal sent from the coordinating device to the mobile device is a reduced and/or compressed communication. For example, a coordinating device can reduce data received from a server to exclude at least part of the data that does not apply to the mobile device (e.g., as determined based on a characteristic of the mobile device).

Message forwarding can allow a user to access messages (e.g., text message, voice-mail identifications, etc.) on any of a set of devices. Some embodiments of the present invention further coordinate across devices such that redundant alerts (e.g., audio or haptic alerts) are inhibited. A given device can determine whether to present an alert (e.g., an audio and/or haptic alert) based, at least in part, on whether a condition is satisfied. The condition can indicate circumstances in which at least one device in a set of devices (e.g., each associated with a same user account) are to suppress (e.g., not present) an alert. Such circumstances can include, for example, detecting that the set of devices are physically close to each other (e.g., by determining whether the devices can communicate via Bluetooth technology or Bluetooth low energy, by comparing the devices' geographic coordinates and/or via one device's detection of another device's feature). To specifically illustrate, the condition can be satisfied when the devices can be paired via Bluetooth technology or when the devices are separated by 30 feet or less. In one instance, the condition determines whether any of a set of devices is in a particular mode (e.g., indicating that the device is receiving user input and/or being worn).

When the condition is not satisfied, each device of a set of devices (e.g., associated with a user account) can present an alert (e.g., an audio and/or haptic alert) of a message. When the condition is satisfied, one of the devices can be selected to present the alert. Which device is selected can depend upon evaluation of a rule, a mode of a device (e.g., whether it is active, asleep or in a do-not-disturb mode) and/or a device priority.

In some instances, if it is determined that the condition is satisfied, further analysis can be performed to determine which of the set of devices is to present the alert and/or which are to suppress alerts. Presentation of an alert can then be suppressed or prevented for at least one of the devices. The analysis can include, for example, determining which devices are in particular modes (e.g., an active mode and/or being worn) and/or evaluating devices priorities in a priority ranking. For example, if only one of the multiple devices is in an active mode and/or detected as being worn, that device can be selected to present the alert. If more than one device (e.g., in a set of devices that are physically near each other and associated with a user account) is in an active mode and/or detected as being worn, the active-mode and/or worn device of a high (or highest) priority in a priority ranking (and/or hierarchy based on device characteristics, device modes or particular devices) can be selected to present the alert. If no device is in an active mode and/or detected as being worn, the device of a high (or highest) priority in a priority ranking (or highest along a hierarchy) can be selected to present the alert. Devices can directly or indirectly communicate with each other to determine relative locations, modes of the devices, and/or whether to present an alert.

Additionally or alternatively, the device can determine whether to present a visual notification presentation for the message. The visual presentation can include, for example, an identifier of a source user, a time associated with the message, an app associated with the message and/or some or all of the message content. Determining whether to present the notification presentation can include determining whether another device (e.g., of multiple devices associated with a user account shared with the device) has already presented the notification presentation for the message and/or whether a user action (e.g., viewing and/or closing the notification presentation) has already been received (e.g., at another device) for the message.

Figure 2A:
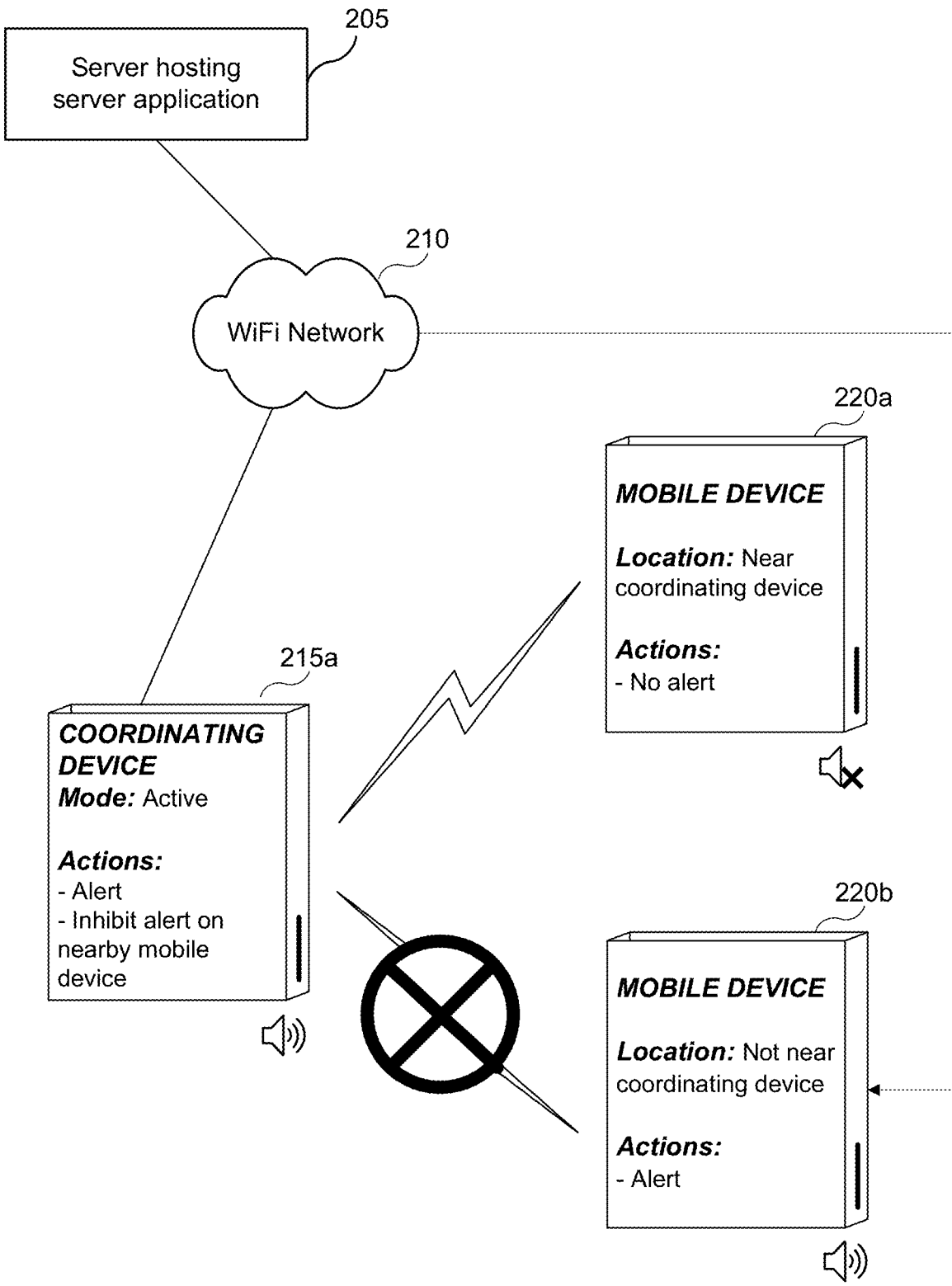
FIGS. 2A-2C show examples of selective presentation of an alert given various device characteristics according to an embodiment of the present invention.
Figure 2B:
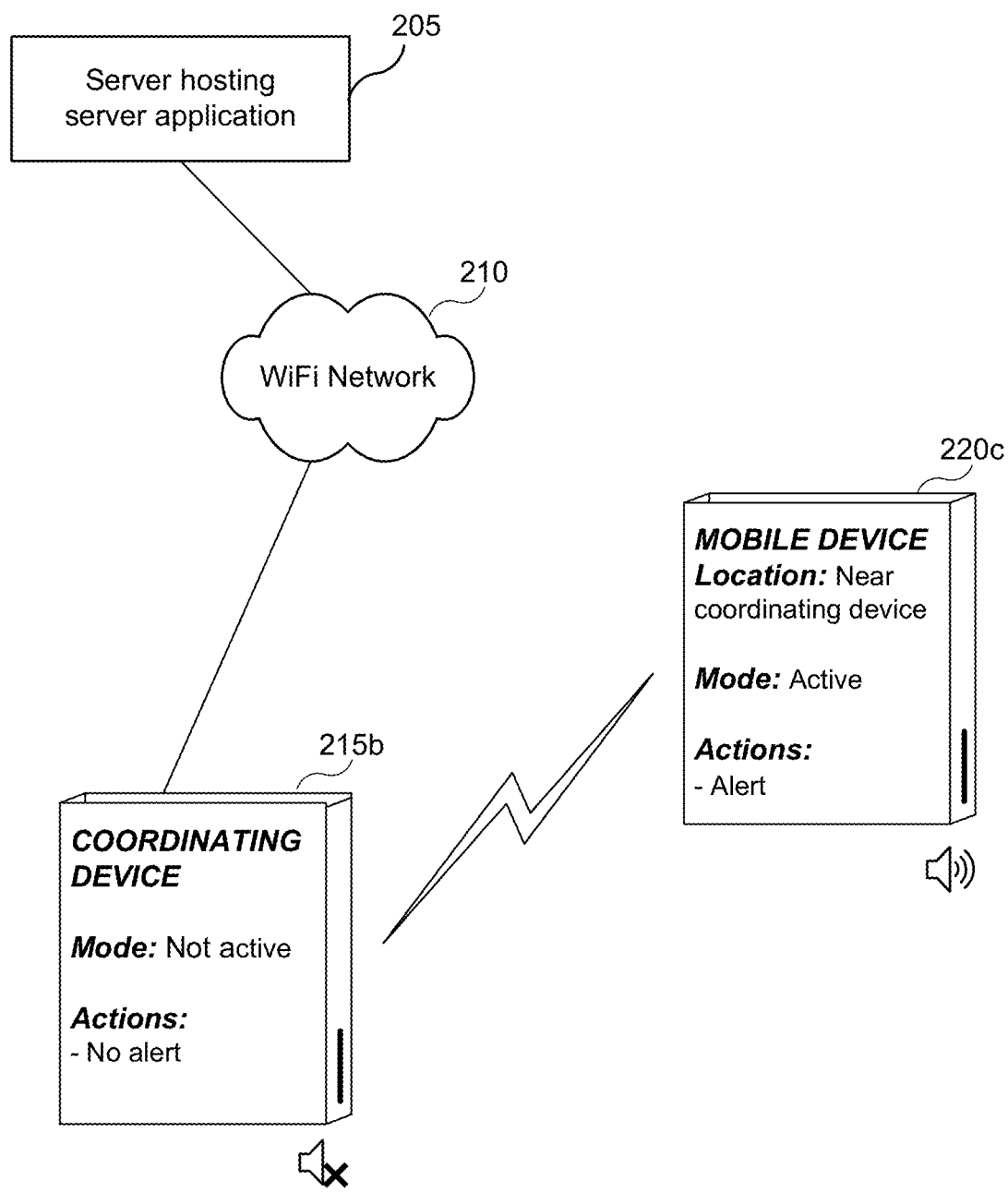
Figure 2C:
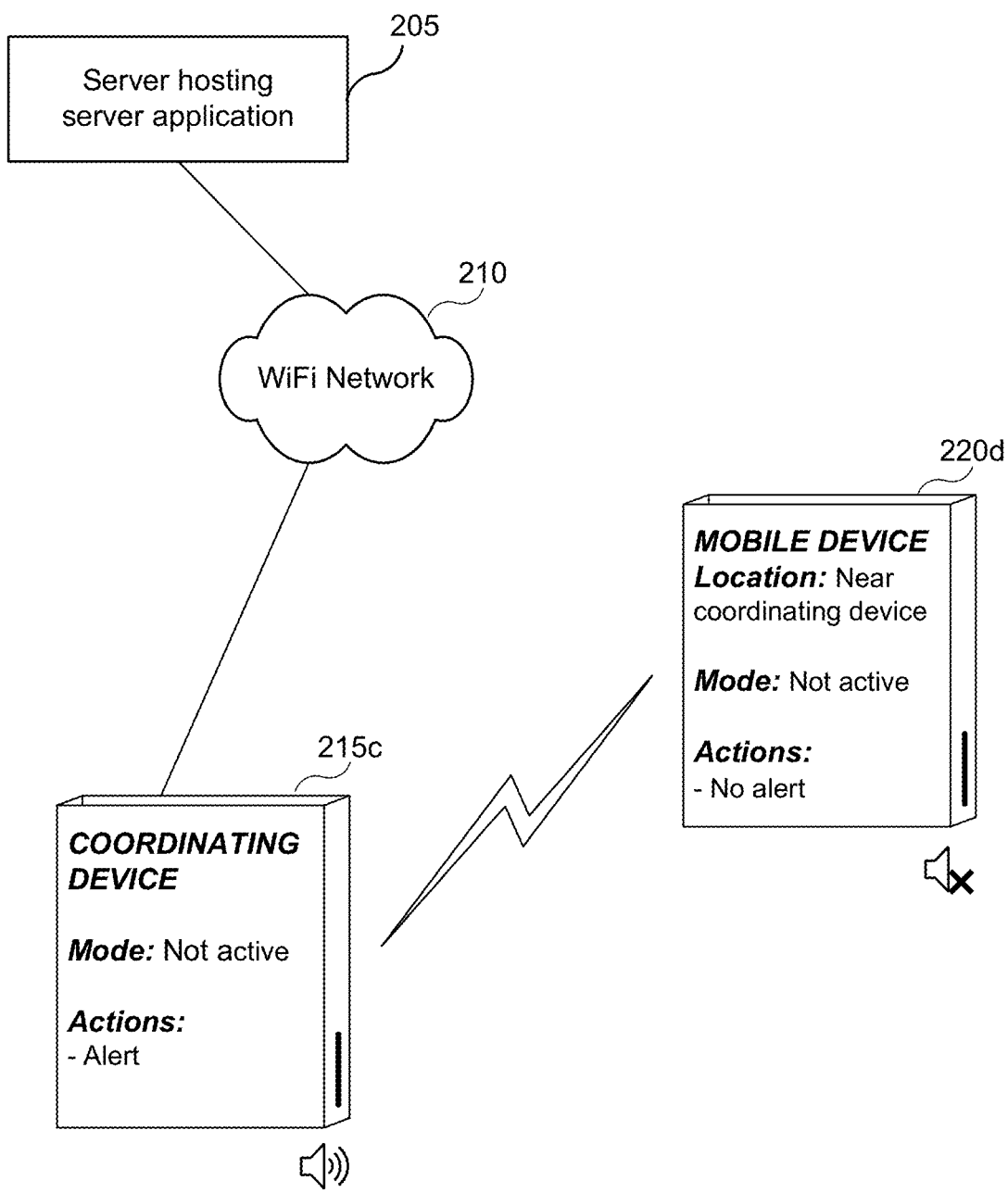

FIGS. 2A-2C show examples of selective presentation of an alert given various device characteristics according to an embodiment of the present invention. Each of FIGS. 2A-2C show various illustrative characteristics of multiple electronic devices and an indication as to which device(s) present an alert in response to a detection of a new message received at an account of a user.

Each device is labeled as being a mobile device or a coordinating device. In some instances, a coordinating device can be a device associated with a larger battery, a larger memory and/or a faster processor relative to a corresponding characteristic of a mobile device. In some instances, a coordinating device is a device that receives app messages from an app server, and/or a mobile device receives app messages only via one or more other devices.

In some instances, a coordinating device can be a device associated with a higher priority (e.g., on a priority list that ranks devices by device identifiers or device types) than a priority associated a mobile device. The priority list can be fixed (e.g., as part of an operating system) or can be adjusted based on, for example, app data and/or user input. The priority list can be app-specific or can apply to all apps (e.g., such that an app developer can influence a priority list applicable for a given app). Depending on the embodiment, a device's designation as being a coordinating device or a mobile device can be fixed or can change in time or circumstance (e.g., depending on which other devices are nearby).

It will be appreciated that (in various embodiments) neither, one or both of a coordinating device and a mobile device, as referred to herein, can be an electronic device. In some instances, one or both of a coordinating device and a mobile device can be a wearable device (e.g., a necklace, headband, clip, belt, bracelet, watch, pair of glasses, armband, or ear piece). A device's designation as being a coordinating device or a mobile device (e.g., receiving communications from a coordinating device) can be fixed or can vary in time or based on a applicable task. For example, a particular device can be a coordinating device with regard to a message-forwarding process but a mobile device that can be subordinate to another coordinating device with regard to an alert-presentation-selection process. As another example, a particular device can be a coordinating device for messages that correspond to a first app but a non-coordinating device with regard to messages that correspond to a second app. Such distinction can result from the device varying in terms of priority across the tasks or apps. Further, a designation may, or may not, be exclusive to other designations (e.g., such that a device can hold multiple designations while concurrently performing different tasks).

In some instances, a coordinating device can include a tablet, desktop computer, laptop computer, a mobile device or smart phone. In some instances, a mobile device can include a wearable device and/or a necklace, headband, clip, belt, bracelet, watch, pair of glasses, armband, or ear piece. In some instances, a coordinating device can be of a different device type as compared to a mobile device. In various instances, there can be a single mobile device, a single coordinating device, multiple mobile devices and/or multiple coordinating devices. Thus, there can be a one-to-one, one-to-many, many-to-one or many-to-many relationship between coordinator and mobile devices.

While a "mobile device" can be a mobile (e.g., handheld) device, it will be appreciated that in alternative embodiments, techniques disclosed herein can be extended to apply to a non-mobile device. For example, what is referred to herein as a mobile device can instead include a smart appliance, a smart television, or a thermostat. Further, a "coordinating device" can, but need not, be a mobile device.

Further, while a "coordinating device" can perform coordination techniques, it will be appreciated that in alternative embodiments, techniques disclosed herein can be extended such that the coordinating device does not perform and/or does not participate in coordination. Further yet, it will be appreciated that, in some instances, a mobile device can perform and/or can participate in coordination. In one example, a mobile or non-mobile first device can perform actions disclosed herein and/or have functionalities disclosed herein with respect to a "coordinating device", and a different mobile or non-mobile second device can perform actions disclosed herein and/or have functionalities disclosed herein with respect to a "mobile device".

Disclosures herein can pertain to communications between or coordination amongst one or more coordinator and/or mobile devices. These devices can include, for example, devices associated with a same user account (e.g., an account for an operating system, an email account, or a social-network account) or paired devices.

In the illustration in FIG. 2A, a server 205 that hosts a server application can communicate via a WiFi network 210 (or via another network, such as a LAN or short-range network) with a coordinating device 215a. Server 205 can host an app that generates and/or transmits messages. A message can include, for example, a message from a person (e.g., a text message, email message, voice message or call) or a message generated in response to a detection (e.g., of a new news story, of a financial metric crossing a threshold, of a security-alarm condition being satisfied, of a user's status change, of an appointment start time as being within a defined time period, etc.). The application can include an email app, SMS app, social-network app, app with sharing capability (e.g., ability to share photos, links, audio clips, audio files, videos, etc.), news app (e.g., configured to send notifications of specific types of new news stories), a financial app (e.g., configured to send notifications in response to a stock price, mutual-fund price, interest rate, etc. crossing a threshold), or a calendar app (e.g., configured to send notifications identifying upcoming appointments, meeting invitation, invitation responses, etc.). An app hosted by server 205 can be one installed on one or more coordinator and/or mobile devices.

Upon detecting a message (e.g., receiving a message from server 205 or another device or detecting a local trigger), coordinating device 215a can determine whether to forward it to one or more mobile devise 220a-b. In some instances, coordinating device 215a can identify which app is associated with the message (e.g., by detecting an app identifier in the message). Coordinating device 215a can use the app identity to determine whether messages for that app are to be forwarded to other devices (e.g., paired devices or other devices associated with a particular account).

In one instance, coordinating device 215a can determine whether that app is on a forwarding blacklist and/or whether there are one or more distribution-handling subscribers for the app. The blacklist and/or subscriber identifiers can be included in an operating system for the app. Depending on the embodiment, the blacklist and/or subscriber identifiers may, or may not, be adjustable such that a user or app developer can modify the blacklist and/or subscriber identifiers. For example, in some instances, a blacklist can be fixed such that a developer of a new app cannot add its app to the blacklist. In other instances, app characteristics that can be defined by a developer can be used to dynamically determine which apps are to be included in the blacklist. In still other instances, a user of a coordinating device 215a can be allowed to add or remove apps from the blacklist. Apps can be included on a blacklist or associated with a subscriber when messages are distributed across devices in a manner different than a forwarding technique that would otherwise apply. For example, a server can transmit the messages for such apps to each of a set of devices, rather than relying on message forwarding across devices.

When it is determined that the message is to be forwarded, coordinating device 215a can generate a message to transmit to one or more mobile devices 220. In some instances, the forwarded message differs from one received (e.g., from server 205). For example, coordinating device 215a can exclude data in the received message that does not apply to mobile devices 220a-b. For example, coordinating device 215a can identify one or more characteristics (e.g., operating system, device type, screen size, app installation, browser, etc.) of one or more mobile devices and can exclude data from a forwarded message that only applies to devices with other characteristics. Coordinating device 215a can further reduce the message, for example, by applying a compression technique or reducing an image size or resolution. If appropriate, a target device can expand the reduced message (e.g., by decompressing it) upon receipt of the message or upon detecting user input corresponding to an instruction to present the message.

Coordinating device 215a can forward the message over a variety of channels, such as over the Internet, a LAN, or a short-range network (e.g., using Bluetooth or Bluetooth Low Energy (BTLE)). In one instance, the message is forwarded over a short-range network when coordinating device 215a is within range and/or can pair with a receiving mobile device 220, and the message is otherwise forwarded over WiFi network 210. For example, in FIG. 2A, coordinating device 215a can forward a message to mobile device 220a over a Bluetooth connection, while the message is forwarded to mobile device 220b over WiFi network 210.

A condition can be used to determine which (if any) of a set of devices are to belong to a set in which one or more devices are to suppress an alert corresponding to a message. The condition can include, for example, a proximate condition which can determine whether (and which) devices are near each other. In one instance, the proximate condition can compare a geographical separation between a mobile device and a coordinating device (each of which can be determined, e.g., based on GPS or access signals) to a threshold. Devices can be defined to be near each other or to be nearby devices when the distance is less than the threshold. In one instance, the proximate condition can include a functional assessment. For example, devices can be defined to be near each other or to be nearby devices when a short-range connection can be established and/or when connection strength exceeds a threshold. The condition can alternatively or additionally depend on whether it is inferred that one or more devices are being used, moved or worn. In some instances, the condition and/or device-set definition depends on device types. For example, if it is detected that a mobile device is in motion, a set can include all mobile devices associated with a user. As another example, a condition can require that at least one mobile device be near another device associated with a same user account.

When the condition is not satisfied and/or a device is not in a set for which the condition is satisfied, the device can respond to a new message by presenting an alert (e.g., a sound or haptic stimulus. Characteristics of the alert (e.g., whether it is sound or haptic, or particular selection of an audio signal or haptic stimulus) can be fixed across user accounts, can be configurable based on user input, can be the same across message types, can vary across message types, and/or can vary based on other factors.

For example, in the illustrated scenario in FIG. 2A, mobile device 220b associated with a user account is not near another device associated with the user account. Thus, a proximate condition may not be satisfied, and mobile device 220b can present an alert (e.g., a sound alert) in response to detecting a new message (e.g., forwarded by coordinating device 215a over WiFi network 210).

Meanwhile, in this illustration, a proximate condition can indicate that coordinating device 215a is defined to be near mobile device 220a. Thus, a coordinating technique can be implemented such that only one of these nearby devices presents an alert. Which device presents an alert can depend on, for example, an activity mode of one or more of the devices and/or a device priority.

In one instance, device selection amongst a set of devices (e.g., all devices associated with a user or account and/or all devices determined to be near each other) can be biased towards a device in an active mode. A definition of what constitutes an active mode can be fixed or can vary across devices. A device can be defined to be in an active mode, for example, when: a screen of the device is on, user input has been received via a user interface within a defined time period (e.g., within the last minute), a screen of the device is unlocked, a sensor detects that a user is wearing the device, and/or a sensor detects that a user is holding the device. In one instance, a mode of a coordinating device 215a can be defined as "active" when its screen is unlocked, and a mode of a mobile device 220a-b can be defined to be "active" when its screen is unlocked and the device is being worn. Other potential device modes can include one or more of: inactive (e.g., when a screen is locked, when a screen is off, when user input has not been received within a defined time period, and/or when a device is not being worn), and/or sleep (e.g., when a screen is off), locked (e.g., when a device is locked). In some instances, a device mode can be defined based on a user-definable setting. For example, a mode can include a do-not-disturb mode or a vibrate mode. It will thus be appreciated that, in some instances, a device can be in multiple modes (e.g., active and vibrate).

In one instance, the alert can be presented by a device of highest priority amongst a set of devices (e.g., a set of nearby devices) that is in a particular mode (e.g., an active mode). If none of the set of devices is in the particular mode, the alert can be presented by the device of highest priority amongst the set of devices. In one instance, the alert can be presented by a coordinating device in the set of devices if the coordinating device is in the particular mode. If the coordinating device is not in the particular mode, the alert can be presented by a mobile device in the set of nearby devices if the mobile device is in the particular mode. If none of the set of nearby devices is in the particular mode, the alert can be presented by the coordinating device.

In the illustration of FIG. 2A, coordinating device 215a can present an alert of a new message while mobile device 220a can suppress an alert for the message (though it can detect the message as well since coordinating device 215a can forward the message to the mobile device via a short-range connection). This device selection can be due to coordinating device 215a being in an active mode and due to coordinating device 215a being defined as a coordinating device or due to its priority. The alert presentation by coordinating device 215a and the lack of alert presentation by mobile device 220a can occur irrespective of a mode of mobile device 220a.

In the illustration of FIG. 2B, coordinating device 215b is not in an active mode (e.g., and is instead in an inactive mode), though nearby mobile device 220c is in an active mode. Because no coordinating and/or high-priority device is in the active mode, the presentation can be made by a lower priority and/or mobile device if it is in an active mode. Accordingly, mobile device 220c is shown as presenting the alert of a new message, while coordinating device 215b can suppress an alert for the new message.

In the illustration of FIG. 2C, neither coordinating device 215c nor mobile device 220d is in an active mode, and coordinating device 215c can present the alert while mobile device 220d can suppress an alert for the new message. This device selection between devices not in an active mode can be due to coordinating device 215a being defined as a coordinating device or due to its priority.

Figure 3:
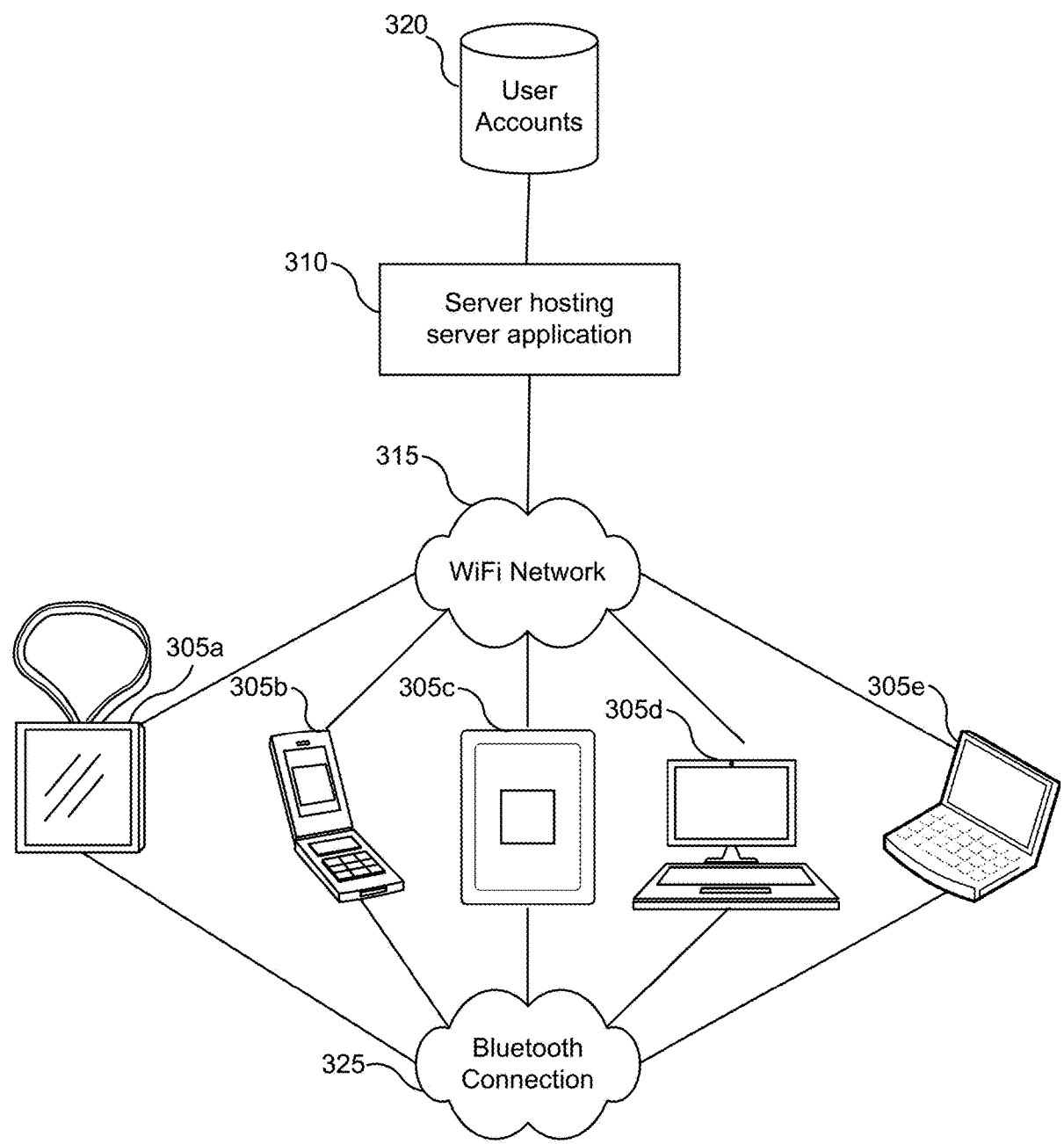
FIG. 3 shows examples of devices connected on a network to facilitate message distribution and/or coordinated alert presentation according to an embodiment of the present invention.

FIG. 3 shows examples of devices connected on a network to facilitate message distribution and/or coordinated alert presentation according to an embodiment of the present invention. Exemplary devices 305 that can receive messages, present messages and/or present alerts of messages can include a mobile device 305a (e.g., a necklace, headband, clip, belt, bracelet, watch, pair of glasses, armband, or ear piece), a phone 305b (e.g., a smart phone), a tablet 305c, a desktop computer 305d and a laptop computer 305e.

A device 305 can provide an output to inform a user of a message. The output can include, e.g., a display of information, an audio signal to alert a user of a message and/or a haptic signal. A device 305 can also include an input interface via which a user can provide input. For example, the input can include one to initiate an action, such as an action to: dismiss a visual notification presentation or non-visual alert, establish a pairing, send an invitation (e.g., for pairing with a device), view a message, open an app, and/or generate a message.

Each of one or more devices 305 can communicate with a remote server 310 over a connection (e.g., a wireless connection, such as WiFi network 315). Server 310 can be any device that communicates with one or more electronic devices (e.g., associated with a user account and/or running an app). Server 310 can host an app, as described above in relation to FIGS. 2A-2C. Server 305 can be mobile or non-mobile. Examples of server devices can include a smart phone, tablet computer, other handheld computing and/or communication device, a laptop computer, a desktop computer systems, a security system, an environmental control systems, and so on.

Sever 310 can store account data for each of a plurality of user accounts in an account data store 325. Account data can include, for example, one or more of: a user's name, a login, an email address, a password, and a phone number. Each of two or more devices 305a-e can be associated with a same account. The two or more devices can include multiple devices of a same type and/or devices of different types. In one instance, user input (e.g., a login and password) received by each of the two or more devices can identify a same user account. Receipt of the input can result in the input-receiving device being logged into an account. In one instance, a connection between two or more devices (e.g., a device pairing) can indicate that one of the connected devices corresponds to a same account associated with another of the connected devices.

Server 310 (or another device, which can include a device 305) can transmit a message to one or more devices 305a-e (e.g., via WiFi network 315). In some instances, a device 305a-e locally generates the message, which can include an indication that an event is occurring, such as an alarm, calendar event, reminder, battery alert, storage-space alert or connectivity alert. The message can be one associated with a user account and/or with the server application. In some instances, the message can be transmitted to an incomplete subset of a set of devices associated with a user account. For example, a number of devices (e.g., one), n, can be defined indicating how many devices are to receive the message. Devices can then be ranked along a priority list, and a message can be delivered to the n devices with a relatively high or highest priority. In some instances, the message can be transmitted to a subset of devices that are associated with a particular designation (e.g., a coordinating device) and/or device type (e.g., a phone).

One or more devices 305a-e that receive the message can then determine whether to forward the message (e.g., based on whether an app associated with message is on a blacklist or has a distribution-handling subscribing) and can forward messages to one or more devices associated with a same user account. Messages can be forwarded, for example, over a wireless link (e.g., WiFi network 315 and/or the Internet) and/or via a short-range connection (e.g., Bluetooth connection 325 or a BTLE connection). In some instances, a message can be forwarded over a short-range connection when the short-range connection is available and otherwise over a WiFi network. In some instances, the forwarded message can include an indication as to the connection used to forward the message (e.g., whether a short-range connection was used), which can provide an indication as to whether alert coordination is to be performed.

Devices receiving a message can determine whether one or more other devices associated with a user account are nearby. If so, a coordination technique can be implemented to prevent each nearby device from presenting an alert. As an alternative to redundant alerting, one or more devices in a set of proximate devices can be selected to present the alert. In one instance, nearby devices communicate over a short-range network (e.g., Bluetooth connection 325) such that one or more devices can determine whether it is to present an alert based on characteristics of one or more other devices. In some embodiments, alerts are suppressed according to an additional or alternative condition not focused on device proximity. For example, if it is detected that a device associated with a user account (e.g., any such device or one of a particular type) is in an active, mobile or worn mode, an alert can be suppressed at each of one or more other devices associated with the account (e.g., any such other device or one of a particular type).

Figure 4A:
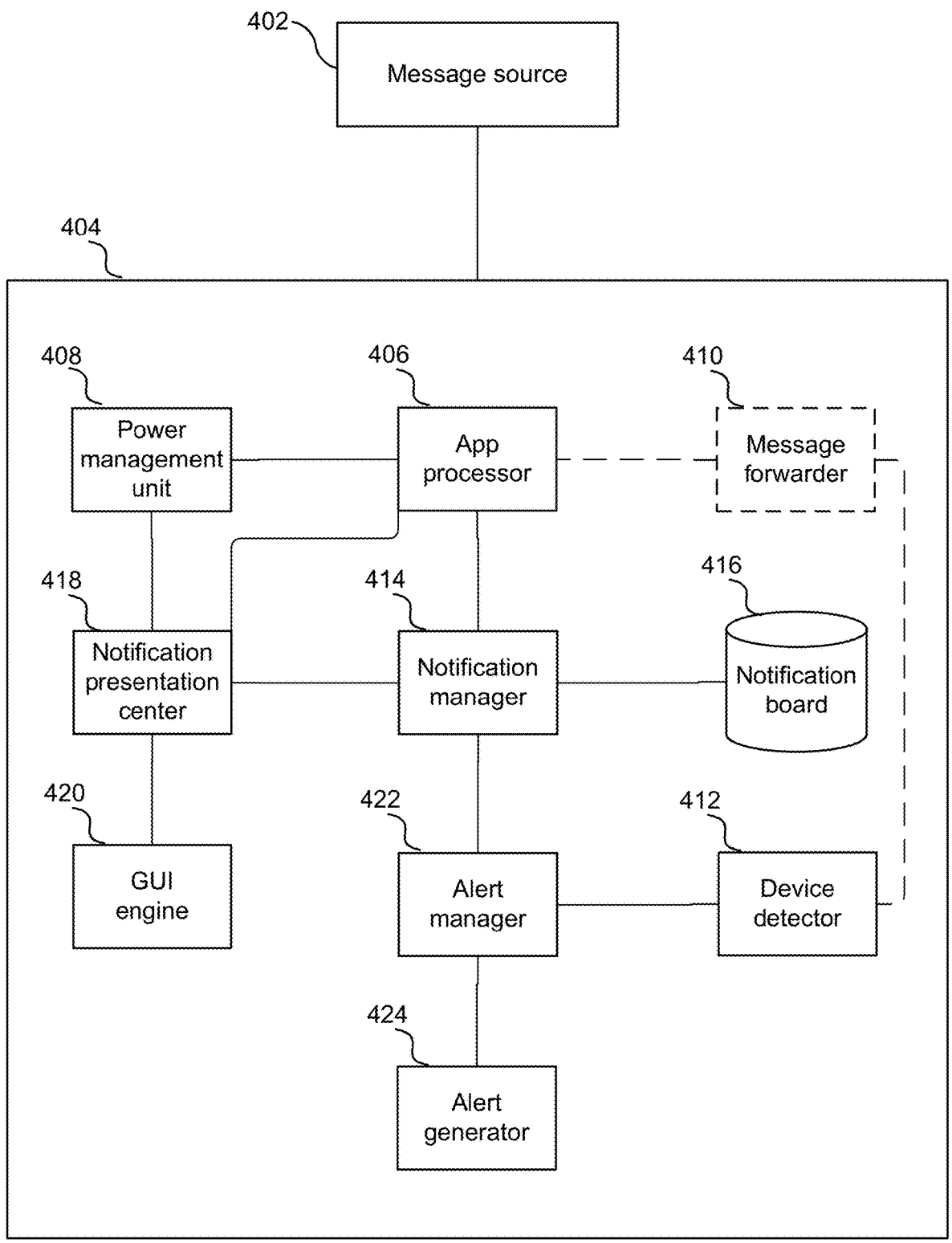
FIG. 4A shows a block diagram of a user device according to an embodiment of the invention.

FIG. 4A shows a block diagram of a user device 404 according to an embodiment of the invention. Device 404 can include a coordinating device or a mobile device. A message can be received from a message source, which can include, for example, a server hosting a server application or another device associated with a same user account as associated with device 404.

In some instances, user device 404 locally generates the message (e.g., based on a rule defining when an alarm, alert or notification is to occur, which can be based on user input defining, for example, a calendar event or alarm).

In some instances, an app associated with the message can be running, in which case an app processor 406 can receive the message. In some instances, the app can be not running, in which case a power management unit 408 can receive the message and send it to app processor 406 such that the app will then begin to run.

In some instances, device 404 can include a message forwarder 410 that can determine whether to forward a particular message to another device. In such instances, message forwarder 410 can detect which app is associated with a message and can determine whether the app is on a blacklist or has a subscriber (e.g., another app) that will handle distribution of messages for the app. For example, a blacklist can include an identification of a reminder app, a calendar app, an emergency app and/or a phone app. As another example, a mail app can have a subscriber to handle forwarding.

When it is determined that the message is to be forwarded (e.g., because the app is neither on the blacklist nor has a distribution-coordinating subscriber), message forwarder 410 can identify other devices to forward the message to (e.g., other devices associated with a same user account as one associated with device 404). In some instances, device detector 412 determines whether device 404 can communicate with any of the other devices over a short-range connection. If so, the message can be sent accordingly. Otherwise, the message can be sent over a WiFi connection (e.g., the Internet).

App processor 406 can also inform a notification manager 414 of the message, and notification manager 414 can add a notification for the message to a notification board 416. Notification board 416 can electronically manage notifications representative of messages. Each notification in notification board 416 can be ranked relative to other notifications on board 416. A notification's rank can depend, for example, on when it is added to board 416, a message priority and/or which app the message corresponds to. For example, in one instance, whenever a new notification is added to board, it can be assigned a lowest rank and ranks of all other notifications are shifted. In one instance, apps can be prioritized, such that messages from one app are not to be ranked above (with lower rank) messages from another app. In one instance, messages can be assigned a priority (e.g., based on a message type and/or corresponding app), and messages with one priority are to be ranked above messages with another priority.

A notification can include or can be associated with a time, such as a time that the notification was added to notification board 416 or a time that a corresponding message was received. A notification can include, for example, a message identifier, part or all of a message, information pertaining to a source of a message (e.g., a phone number, an email address, or a user name), an identifier or name of an associated app, action options (e.g., view message, dismiss, snooze, etc.), and/or an expiration time.

Notification manager 414 can also remove one or more notifications from notification board 416. Such removal can occur, for example, upon detecting that: a defined period of time has passed since an addition of the notification to board 416, a user action has closed a notification (e.g., by dismissing or interacting with a notification presentation and/or interface corresponding to an alert), a number of notifications in board 416 has surpassed a threshold (e.g., such that one or more older notifications are removed), and/or a signal received from another device indicates that the notification is to be removed (e.g., indicating that a user action received at that device closed the notification).

Notification manager 414 can alert a notification presentation center 418 when a new notification is added to notification board 416 and/or when a new message is received. When notification presentation center 418 detects that a screen of device 404 is on, notification presentation center 418 can generate a visual presentation for the notification. The visual presentation can include, e.g., a message title or subject, part or all of a message, an identifier of an app corresponding to the message, a time corresponding to the notification, action options, and/or source information. The presentation can be configured to be presented over a portion of or over all of a screen of device 404.

In some instances, a presentation is initially presented in a reduced form, and an expanded notification can be presented in response to user action. For example, a visual indicator (e.g., near an app icon or near a screen corner) can indicate that new notification presentations are available. If a user selects the indicator (e.g., by opening an app or clicking on or touching the indicator) more or all of one, more or all new notification presentations (e.g., all new notification presentations corresponding to one app or all new notification presentations) can be presented.

In some instances, when multiple notification presentations are generated (in response to multiple new notifications), notification presentations can be stacked, such that a response to one notification presentation (e.g., by dismissing it) can cause another notification presentation to appear. An order of the notification presentations in the stacking (e.g., influencing which notification presentation is shown first) can be based on ranks of the corresponding notifications. In some instances, when multiple notification presentations are generated, notification presentations can be presented at different portions of the screen. Each notification presentation's screen position can be based on ranks of the corresponding notifications (e.g., such that notifications with higher ranks are associated with notification presentations with positions higher on a screen relative to other notification presentations).

Notification presentation center 418 can send notification presentations to a graphical user interface (GUI) engine 420 to visually present the notification presentations on a screen of device 404. GUI engine 420 can detect user interactions with the notification presentations, such as selection of an action option. In some instances, an action can be handled by notification presentation center 418 and notification manager 414. For example, if a user dismisses a notification presentation, notification presentation center 418 can cease presentation of the notification presentation, and notification manager 414 can remove the corresponding notification from notification board 416. In some instances, an action can be handled by notification presentation center 418 and app processor 406. For example, if a user selects a notification presentation or selects a view option, notification presentation center 418 can cease presentation of the notification and app processor 406 can present an interface for the app and/or a corresponding message.

It will thus be appreciated that, in some instances, there can be a variable delay between a first time at which notification presentation center 418 is informed of a new message and/or notification and a second time at which a corresponding notification presentation is presented. For example, a delay can be caused by a screen not being on at the first time, based on a presence of multiple new messages and/or notification (e.g., if a user must view one notification presentation before being presented another) and/or based on a delay in receiving user input corresponding to a request to present a notification presentation (e.g., clicking on a notification indicator).

Notification manager 414 can also notify an alert manager 422 when a new notification is added to notification board 416 and/or a new message is received. Alert manager 422 can determine whether to present an alert, such as a short-latency and/or non-visual alert (e.g., an audio and/or haptic alert presented immediately or shortly after being notified of the new notification and/or message). In one instance, device detector 412 determines whether a proximate condition is satisfied, thereby indicating that one or more other devices (e.g., or a user or corresponding to a user account) are near device 404. If not, alert manager 422 can instruct alert generator 424 to output the alert. If so, alert manager 422 can implement a coordinating technique (e.g., such as a technique described herein) to determine whether device 404 is to present the alert. If device 404 is to present the alert, alert manager 422 can instruct alert generator 424 to output the alert. Otherwise, alert manager 422 can suppress an alert (e.g., by not instructing alert generator 424 to output the alert).

While electronic device 404 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 4 be implemented in a given embodiment of an electronic device disclosed herein (e.g., a coordinating device or mobile device). For example, a device (e.g., a mobile device) can lack message forwarder 410.

Figure 4B:
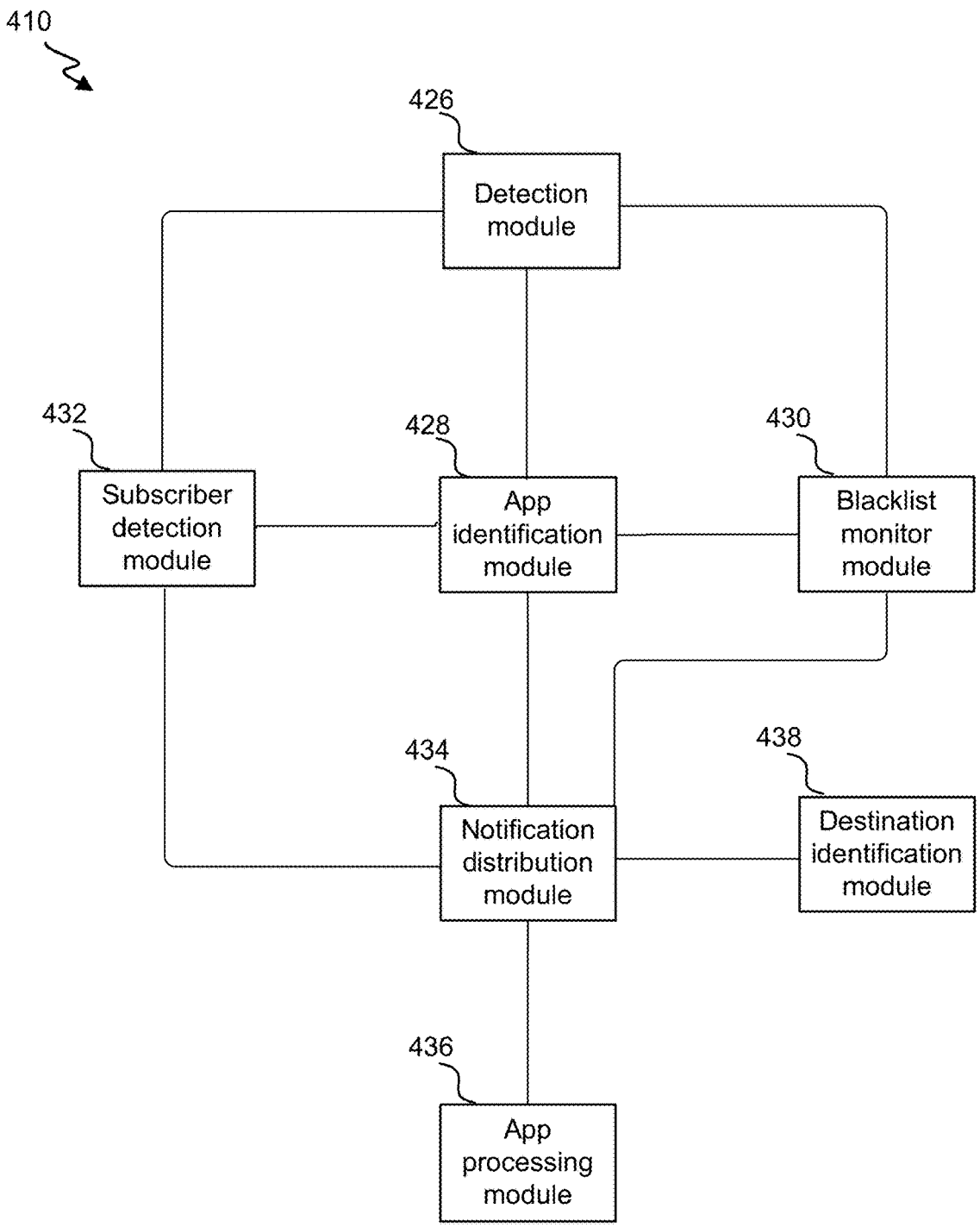
FIG. 4B shows a block diagram of message forwarder according to an embodiment of the invention.

FIG. 4B shows a block diagram of message forwarder 410 according to an embodiment of the invention. Message forwarder [426] 410 can include a detection module 426 that can detect a message. The message can include one generated locally at the coordinating device system (e.g., a message identifying that a device has that a defined time or time period (e.g., associated with a calendar appointment) has passed), an expected weather condition is forecasted, a news story or event has been reported, and so on).

In one instance, the message includes data pertaining to a location of the device or is generated in response to detecting that a location-based condition is satisfied based on a location of the device. For example, the message can indicate that the device has entered a defined geographical region (e.g., associated with a "home" region), has crossed a geographical border, or is within a defined distance from a store or upcoming turn in a navigation route. Such locating of the device and/or detecting that a location-based condition is satisfied can include, for example, determine which other devices (e.g., GPS satellites, WiFi hotspots, merchant devices and/or fixed user devices) the device can communicate with, determining a delay and/or strength of such communication(s), triangulating a position, estimating a geographical coordinate, and/or comparing a signal strength or delay to a threshold. In some instances, locating of the device and/or detecting that a location-based condition is satisfied uses particular hardware elements (e.g., a GPS receiver) in the device that may not be present in other user devices.

The message can alternatively or additionally include on a message received at the coordinating device system from a remote source (e.g., another user device or a remote server). For example, the message can include a text message, SMS message, email or voice message.

In some instances, an app identification module 428 can identify an app associated with the detected message. For example, the message can include an identifier of the app (e.g., such that a calendar-reminder message includes an identifier of a calendar app). The app can include one that was (locally or remotely) at least partly responsible for generation and/or transmission of the message.

Message forwarder 410 can include a blacklist monitor module 430, which can determine whether the identified app is on a blacklist. The blacklist can be locally stored on the device (e.g., as part of an operating system). In some instances, the blacklist can be modified (e.g., based on input from a device user or based on installation of an app). In some instances, it is static (e.g., such that which apps identified on the blacklist cannot be changed based on user input or app execution). When blacklist monitor module 430 determines that the identified app is on a blacklist, it can refrain from transmitting the message (or processed version thereof) to another device (e.g., another device associated with a same user account and/or a nearby device).

Message forwarder 410 can include a subscriber detection module 432 that identifies one or more apps subscribed to process or handle distribution of the message. In some instances, an app subscribed to process or handle distribution of the message includes the app identified as being associated with the detected message. For example, a message indicating that a stock price crossed a threshold value can be associated with a stock app, and the stock app can be subscribed to process the message.

In some instances, an app subscribed to process or handle distribution of the message includes an app different than one as being associated with (e.g., at least partly responsible for generation of) the message. For example, a calendar app may be subscribed to process messages generated by a weather app (e.g., such that a user can re-evaluate outdoor events).

A subscriber structure (e.g., a subscriber table) can indicate, for example, that one is subscribed to process all messages associated with a same or different app, to process all messages associated with a particular characteristic (e.g., associated with a particular contact or a particular calendar) and/or to process particular messages. Thus, subscriber detection module 432 can perform a look-up technique to determine whether an identifier corresponding to (for example) the app associated with the message, a characteristic of the message and/or an identifier of the message; to determine whether an identifier corresponding to the app is present in a corresponding field (e.g., a table column or row) in the structure and/or whether there are any subscribing apps associated with the identified app associated with the message, message characteristic or app identifier.

For example, a subscriber structure can include a table, where a first column can identify various apps at least partly responsible for generating a message, a second column can identify one or more apps subscribed to handle message distribution for messages of the app and a third column can identify one or more apps to handle processing of the message for the app. Upon a device having received a message and identified an app at least partly responsible for having generated the message, subscriber detection module 432 can determine whether the app is represented in the first column and then determine whether and/or which apps are in the second and/or third columns of a matching row.

The subscriber structure can be locally stored on the device (e.g., as part of an operating system). In some instances, the subscriber structure can be modified (e.g., based on input from a device user or based on installation of an app). In some instances, it is static (e.g., such that which apps identified on the blacklist cannot be changed based on user input or app execution).

When one or more subscribing apps are identified, a notification distribution module 434 can enable each or the subscribing apps (or one or more select subscribing apps) to access (and/or process) the message. Notification distribution module 434 can transmit all or part of the message to an app processing module 436 (e.g., associated with a subscribing app), which can be local on device 400 or remote.

In some instances, app processing module 436 can then handle distribution of (a processed or unprocessed version) the message. Thus, a subscribing app can use its own distribution rules to determine, for example, how to distribute the message (e.g., via a remote server or relying on a remote server to have independently transmitted the message to each device; selecting a transmission protocol; and/or selecting a distribution time), to which device(s) to distribute the message to, and so on.

In some instances, app processing module 436 can transform or process (used interchangeably in this context) the message. The transformation or processing can include, for example, removing select content in the message (e.g., a precise time stamp, a full source of a message or an identifier of a generating app), condensing or compressing part or all of the message, extracting an incomplete subset of data in the message to selectively include in the transformed message (e.g., such that a transformed message includes an identifier of a calendar event but not all of the event details or such that the transformed message includes an identifier of a text-message sender but not her particular name and number), generating a summary of the message, identifying an action to be performed at another device based on content in the message, for example, generating a new message (e.g., pursuant to a rule having a condition of detecting a particular type of message). Thus, in some instances, a size (e.g., in terms of storage space) of the transformed or processed message is smaller than a size of the detected message. The transformation or processing can be performed in accordance with a transformation protocol defined, e.g., as part of an operating system, as part of code of the subscribing app, as part of code of the identified message-associated app, and/or based on user input.

Upon transforming or processing the message, app processing module 436 can (in some instances) transmit the transformed or processed message to notification distribution module 436 or can otherwise allow for notification distribution module 436 to access the transformed or processed message.

A destination identification module 438 can identify one or more other electronic devices to receive the transformed or processed message. The other electronic device(s) and device 400 can each be associated with a same account, can be physically near each other, and/or can be paired. The identification of the other device(s) can be based on content in (or associated with) the detected message, content in (or associated with) the transformed or processed message, a subscriber structure (e.g., associating particular subscriptions or subscribing apps to particular destination devices), and/or a search for nearby devices, a local or remote data structure identifying devices associated with a particular account or having a particular relationship (e.g., pairing) with each other and/or a locally or remotely stored transmission rule (a general rule or one specific to a device type, user account, message characteristic and/or subscribing app).

As one example, a transmission rule can indicate that a coordinating device is to transmit either a processed or unprocessed message to each other device associated with a same user account so long as an app associated with the message is not on a blacklist. When an app is subscribed to process the message, a processed version of the message can be transmitted.

Otherwise, an unprocessed version can be transmitted.

Notification distribution module 436 can then transmit a signal that includes the processed (or unprocessed—when there is no subscriber app) message to the identified other destination device(s). The signal can, in some instances, include an identifier of the app associated with the detected message and/or a subscriber app that processed or transformed the message.

In some instances, the transmission can occur immediately (e.g., upon processing of the message). Notification distribution module 436 can, in some instances, determine whether the transmission was successful. If, instead, a transmission failure or time-out is detected, notification distribution module 436 may reattempt the transmission (e.g., for a defined time period or defined number of times or upon receiving an indication that the other device is responsive to device 400).

Upon receiving the signal, a destination device may itself use similar or complementary modules to respond to the signal. For example, the destination device can include a detection module to detect the message in the signal and can include an app identification module 428 that identifies an app associated with the app. This app may be one associated with the message initially detected by the transmitting app and/or a subscribing app.

In some instances, the destination device can also include a notification distribution module to enable the app to transform data in the signal into a notification. This transformation can, in some instances, include processing counter to that performed at the transmitting device. For example, a transmitting device may have generated a condensed or summary version of a message, and a destination device may then expand the version into a complete message. The expansion can include, for example, retrieving data stored at the destination device (e.g., associated with the app, a characteristic of data in the signal, and/or a portion of data in the signal). The retrieved data can then independently serve as a notification for the message or can be combined with some or all of the data in the signal to form the notification. The destination device can also include an output module to generate a visual notification presentation corresponding to the message and to present the visual notification.

For example, a geolocation app on a first device can generate a message that a user has entered a geographical region that is to trigger a particular reminder set up by a user using a calendar app. Thus, the calendar app can be subscribed to process the message. An app processing module associated with the calendar app on the first device can transform the message to include only an identifier of the particular reminder and an indication that a condition of the reminder has been satisfied. The transformed message can be transmitted to another user device, which can then detect that the message is associated with the calendar app. An app processing module associated with the calendar app on the second device can then retrieve from storage the identified reminder. An output module on the second device can then present a visual notification on a screen of the second device that includes part or all of content of the reminder.

Figure 4C:
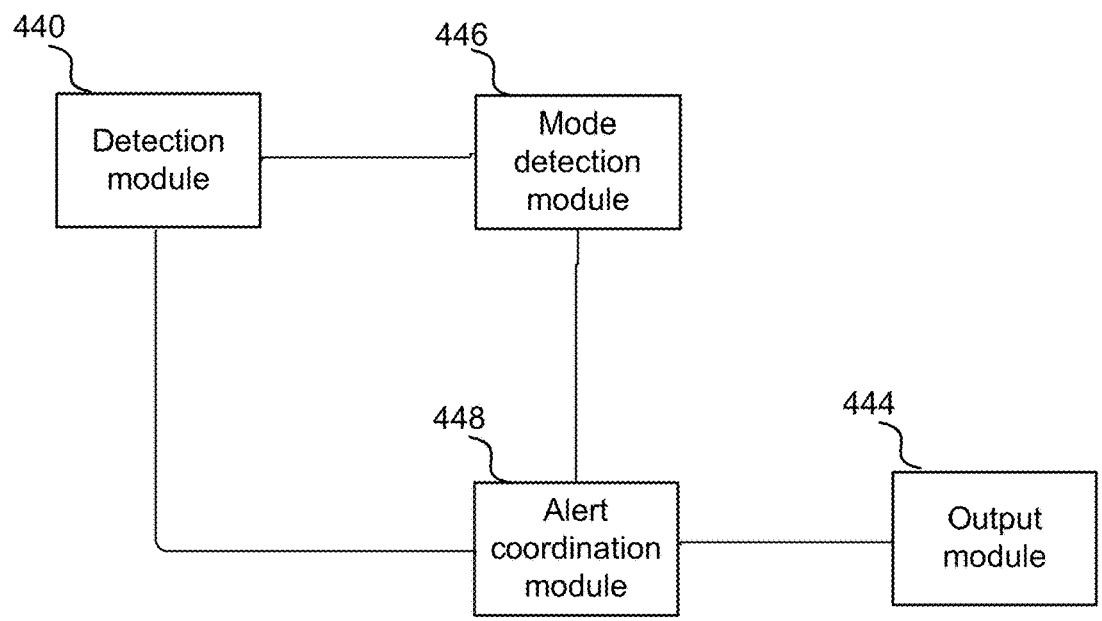
FIG. 4C shows a block diagram of alert manager according to an embodiment of the invention.

FIG. 4C shows a block diagram of alert manager 422 according to an embodiment of the invention. Alert manager 422 can include a detection module 440 that can detect a message. The message can include one generated locally at the coordinating device system (e.g., a message identifying that a device has that a defined time or time period (e.g., associated with a calendar appointment) has passed), an expected weather condition is forecasted, a news story or event has been reported, and so on). The message can alternatively or additionally include one received at the coordinating device system from a remote source (e.g., another user device or a remote server). For example, the message can include one forwarded from another user device and/or a text message, SMS message, email or voice message. Detection module 440 can parallel or be the same as detection module 426 of message forwarder 410.

Upon detecting the message, an alert coordination module 444 can communicate with device detector 412 to determine whether a proximate condition is satisfied. Device detector 412 can determine a location characteristic for another device (e.g., associated with a same account) and use the characteristic to determine whether a proximate condition is satisfied. The location characteristic can include, for example, whether device 400 can communicate with a mobile device via a particular type of communication channel (e.g., over a short-range network, a Bluetooth network or BTLE network), a signal strength between device 400 and a mobile device over a particular type of communication channel, or a distance between device 400 and a mobile device. The proximate condition can be one that is satisfied, for example, when communication over a particular type of communication channel is established, when a signal strength is over a defined threshold, or when a separation distance is less than a defined threshold.

Device detector 412 can, in some instances, scan to determine whether any user devices (e.g., associated with a particular account and/or of a particular device type) can be detected over one or more particular communication channels (e.g., via a short-range communication channel, Bluetooth channel, or BTLE channel) and/or whether device 400 is paired to another device (e.g., associated with a particular account and/or of a particular device type). Detecting another device over a particular communication channel or detecting a paired device can be determined to correspond to satisfaction of the proximate condition.

Device detector 412 can, in some instances, receive information identifying a location characteristic of each of one or more devices (e.g., associated with a particular account and/or of a particular device type). For example, GPS coordinates can be determined for each device (locally at the device or remotely at a server), and the GPS coordinates can be communicated to device detector 412 (e.g., periodically, upon detecting a change in location or in response to a request from device detector). Device detector 412 can then determine whether any device (and/or which device(s)) is within a threshold distance from device 400.

When the proximate condition is not satisfied, an output module 444 can present an alert (e.g., an audio and/or haptic alert) for the message. When the proximate condition is satisfied, an alert-coordination process can be initiated to inhibit multiple nearby devices from redundantly presenting alerts corresponding a single message. Which device is to present an alert can depend on which mode each of one or more of the nearby devices are in.

A mode detection module 446 can detect a mode of the coordinating device. In some instances, mode detection module 446 can determine whether device 400 is in an active mode (e.g., by determining whether a screen of the device is on, whether the device is unlocked, whether input has been received within a defined time period, whether the device is within a defined orientation space and/or elevation region and/or whether sensor data indicates that the device is being worn).

When it is determined that a coordinating device is in an active mode, an output module 444 can present an alert for the message. For example, an audio or haptic stimulus can be presented. Further, an alert coordination module 448 can transmit a signal to each of one or more other devices (e.g., those for which the proximate condition was satisfied) indicating that the receiving device is to suppress (e.g., not present) an alert for the message (e.g., to not present any alert, any non-visual alert, any haptic alert or any audio alert). The signal can include an identifier for the message and/or of the coordinating device.

When it is determined that a coordinating device is not in an active mode (e.g., when mode detection module 446 detects that the coordinating device is in a sleep mode and/or is not in the active mode), alert coordination module 448 can transmit a signal to another device (e.g., one for which the proximate condition was satisfied), the signal corresponding to an invitation to present an alert for the message. The signal can include an identifier for the message and/or of the coordinating device.

A detection module on the receiving device can detect the signal and an alert coordination module on the receiving device can identify the invitation to present the alert. Whether the receiving device accepts the invitation can depend on a mode of the receiving device. A mode detection module at the receiving device can identify a mode of the device (e.g., whether it is in an active mode, sleep mode or do-not-disturb mode). If the device is in an active mode or do-not-disturb mode, an alert coordination module can transmit a signal back to the coordinating device identifying an acceptance of the alert-presentation invitation. If the device is in an active mode, an alert can be presented via an output module of the device. If the device is in a do-not-disturb mode, the output module can suppress presentation of the alert.

Returning to the coordinating device, upon transmitting the invitation signal, alert coordination module 448 can then monitor for a response signal from the other device. If a signal is received indicating that the other device will handle presentation of an alert for the message, output module 444 can suppress presentation of an alert for the message at the coordinating device (e.g., by not presenting an audio alert, haptic alert and/or visual alert for the message).

If a signal is received from the other device indicating that the other device will not handle presentation of an alert for the message and/or if no signal is received responsive to the invitation within a defined time period, output module 446 can present an alert for the message.

Mode detection module 444 can also determine whether device 400 is in a do-not-disturb mode. A do-not-disturb mode can correspond to a mode (e.g., set in response to corresponding user input or to a rule, such as one defined by a user) during which at least some (or all) audio and/or haptic stimuli are not to be presented. For example, when a device is in a do-not-disturb mode, audio and/or haptic stimuli that would otherwise be triggered, via execution of one or more select apps (or all apps), by events (e.g., receiving a call, message or notification) can be suppressed. When it is determined that a coordinating device is in a do-not-disturb mode, the coordinating device may suppress an alert for the message and also send a signal to one or more other devices (e.g., for which the proximate condition is satisfied) indicating that they are to also suppress presenting an alert for the message.

It will be appreciated that, in some instances, audio and/or haptic alerts outputs initiated by execution of one or more particular apps (e.g., a device-finding and/or emergency app) are not to be affected by a do-not-disturb mode (e.g., as determined based on a device setting or configuration, instructions for the app and/or user input). For example, a do-not-disturb mode may prevent a device from presenting a sound responsive to a new email but may allow a sound to be presented upon detecting that a user is remotely executing software to find the device. In these situations—where the do-not-disturb effect is selective—it will be appreciated that disclosures herein relating to coordinated efforts to respect such a mode may be limited to apply to the apps and/or events that are to be influenced by the mode. Thus, a device may, in essence, determine whether it is in a do-not-disturb mode on an app-specific basis.

Figure 5:
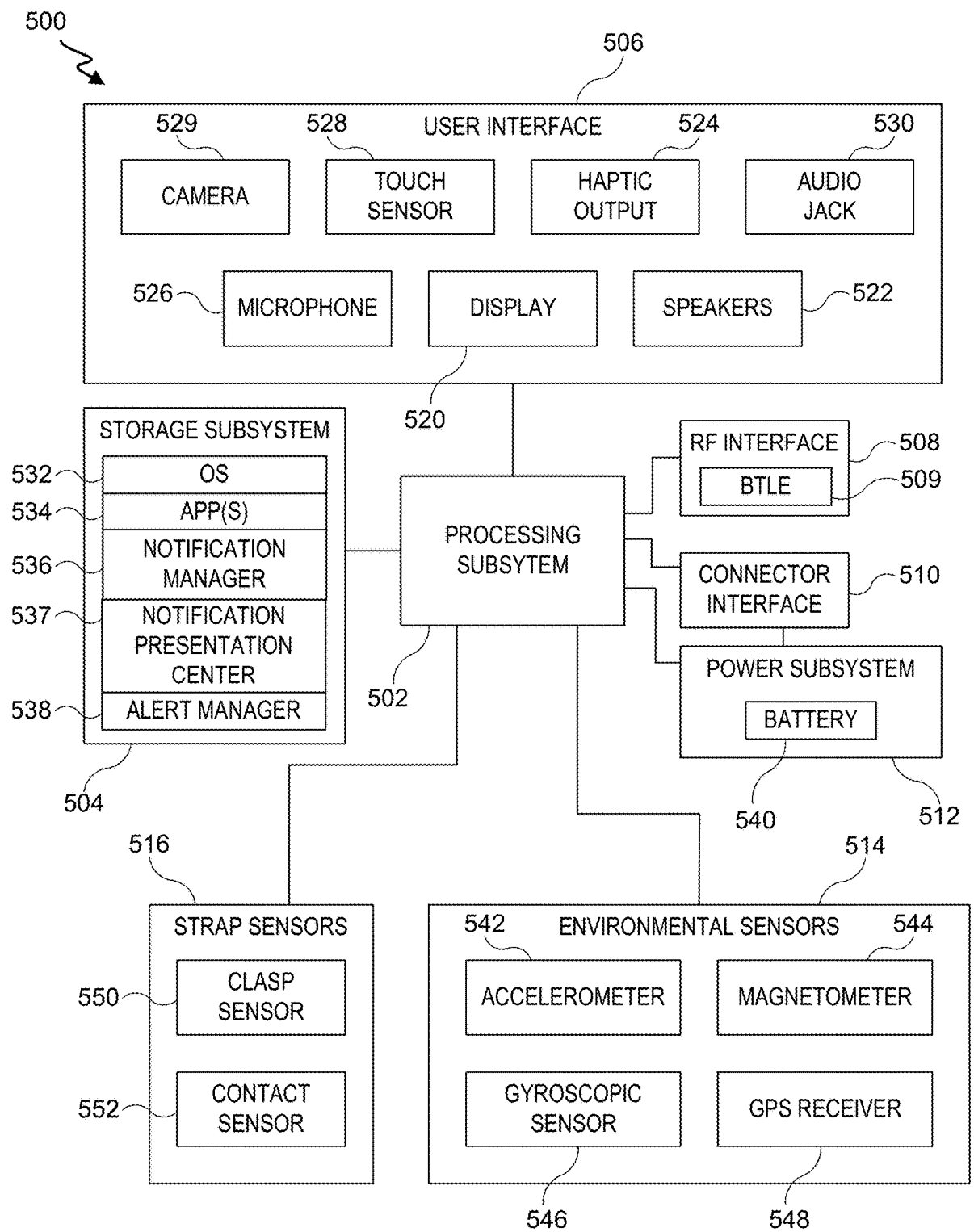
FIG. 5 is a simplified block diagram of a target device according to an embodiment of the present invention.

FIG. 5 is a simplified block diagram of a mobile device 500 (e.g., implementing mobile device 220*a*, 220*b*, 220*c* and/or 220*d*) according to an embodiment of the present invention. Mobile device 500 can include processing subsystem 502, storage subsystem 504, user interface 506, one or more connection components (e.g., RF interface 508 and/or connector interface 510), power subsystem 512, environmental sensors 514, and strap sensors 516. Mobile device 500 can also include other components (not explicitly shown).

Storage subsystem 504 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 504 can store media items such as audio files, video files, image or artwork files; information about a user's contacts (names, addresses, phone numbers, etc.); information about game-performance assessments and/or games that a user previously participated in; information about a user's scheduled games, appointments and events; notes; and/or other types of information, examples of which are described below. In some embodiments, storage subsystem 504 can also store one or more application programs (or apps) 534 to be executed by processing subsystem 502 (e.g., video game programs, personal information management programs, media playback programs, interface programs associated with particular host devices and/or host device functionalities, etc.).

User interface 506 can include any combination of input and output devices. A user can operate input devices of user interface 506 to invoke the functionality of mobile device 500 and can view, hear, and/or otherwise experience output from mobile device 500 via output devices of user interface 506.

Examples of output devices include display 520, speakers 522, and haptic output generator 524. Display 520 can be implemented using compact display technologies, e.g., LCD (liquid crystal display), LED (light-emitting diode), OLED (organic light-emitting diode), or the like. In some embodiments, display 520 can incorporate a flexible display element or curved-glass display element, allowing mobile device 500 to conform to a desired shape. One or more speakers 522 can be provided using small-form-factor speaker technologies, including any technology capable of converting electronic signals into audible sound waves. In some embodiments, speakers 522 can be used to produce tones (e.g., beeping or ringing) and can but need not be capable of reproducing sounds such as speech or music with any particular degree of fidelity. Haptic output generator 524 can be, e.g., a device that converts electronic signals into vibrations; in some embodiments, the vibrations can be strong enough to be felt by a user wearing mobile device 500 but not so strong as to produce distinct sounds.

Examples of input devices include microphone 526, touch sensor 528, and camera 529. Microphone 526 can include any device that converts sound waves into electronic signals. In some embodiments, microphone 526 can be sufficiently sensitive to provide a representation of specific words spoken by a user; in other embodiments, microphone 526 can be usable to provide indications of general ambient sound levels without necessarily providing a high-quality electronic representation of specific sounds.

Touch sensor 528 can include, e.g., a capacitive sensor array with the ability to localize contacts to a particular point or region on the surface of the sensor and in some instances, the ability to distinguish multiple simultaneous contacts. In some embodiments, touch sensor 528 can be overlaid over display 520 to provide a touchscreen interface (e.g., touchscreen interface 403 of FIG. 4), and processing subsystem 504 can translate touch events (including taps and/or other gestures made with one or more contacts) into specific user inputs depending on what is currently displayed on display 520.

Camera 529 can include, e.g., a compact digital camera that includes an image sensor such as a CMOS sensor and optical components (e.g., lenses) arranged to focus an image onto the image sensor, along with control logic operable to use the imaging components to capture and store still and/or video images. Images can be stored, e.g., in storage subsystem 504 and/or transmitted by mobile device 500 to other devices for storage. Depending on implementation, the optical components can provide fixed focal distance or variable focal distance; in the latter case, autofocus can be provided. In some embodiments, camera 529 can be disposed along an edge of a face member e.g., the top edge, and oriented to allow a user to capture images of nearby objects in the environment such as a bar code or QR code. In other embodiments, camera 529 can be disposed on the front surface of a device face member, e.g., to capture images of the user. Zero, one, or more cameras can be provided, depending on implementation.

In some embodiments, user interface 506 can provide output to and/or receive input from an auxiliary device such as a headset. For example, audio jack 530 can connect via an audio cable (e.g., a standard 2.5-mm or 3.5-mm audio cable) to an auxiliary device. Audio jack 530 can include input and/or output paths. Accordingly, audio jack 530 can provide audio to the auxiliary device and/or receive audio from the auxiliary device. In some embodiments, a wireless connection interface can be used to communicate with an auxiliary device.

Processing subsystem 502 can be implemented as one or more integrated circuits, e.g., one or more single-core or multi-core microprocessors or microcontrollers, examples of which are known in the art. In operation, processing system 502 can control the operation of mobile device 500. In various embodiments, processing subsystem 504 can execute a variety of programs in response to program code and can maintain multiple concurrently executing programs or processes. At any given time, some or all of the program code to be executed can be resident in processing subsystem 504 and/or in storage media such as storage subsystem 504.

Through suitable programming, processing subsystem 502 can provide various functionality for mobile device 500. For example, in some embodiments, processing subsystem 502 can execute an operating system (OS) 532 and various applications 534 such as a phone-interface application, a text-message-interface application, a media interface application, a fitness application, and/or other applications. In some embodiments, some or all of these application programs can interact with a host device, e.g., by generating messages to be sent to the host device and/or by receiving and interpreting messages from the host device. In some embodiments, some or all of the application programs can operate locally to mobile device 500. For example, if mobile device 500 has a local media library stored in storage subsystem 504, a media interface application can provide a user interface to select and play locally stored media items.

Processing subsystem 502 can also execute a code for one or more components of device 404. For example, processing subsystem 502 can execute a notification manager code 536 (which can be part of OS 532 or separate as desired). Execution of notification manager code 536 can cause mobile device 500 to detect a new message and/or add, re-rank and/or remove one or more notifications to a notification board. Execution of notification manager code 536 can further cause a notification presentation center and/or alert manager to be notified of a notification. In some instances, notification manager 536 further includes code that, when executed, evaluates whether a particular message is to be forwarded to another device and/or coordinates any pre-forwarding processing of the message (e.g., by identifying a subscriber app to process the message).

Processing subsystem 502 can also or alternatively execute a notification presentation-center code 537 (which can be part of OS 532 or separate as desired). Execution of notification presentation center code 537 can cause mobile device 500 to determine whether, when and/or how to present a visual notification corresponding to a notification and/or message. For example, execution can result in a determination as to where, on a screen, a visual notification or visual notification indicator is to be presented on a screen and/or when a notification presentation is to be presented in a sequence of notification presentations.

Processing subsystem 502 can also or alternatively include an alert manager code 538 (which can be part of OS 532 or separate as desired). Execution of alert manager code 538 can cause mobile device 500 to determine whether, when and/or how to present an alert (e.g., a non-visual alert) corresponding to a notification and/or message. In some instances, execution of alert manager code 538 can cause mobile device 500 to communicate with another device (e.g., a coordinating device). For example, a communication from the other device can include an invitation to present an alert and/or a communication to the other device can identify a mode of mobile device 500 and/or whether an alert has been or will be presented.

RF (radio frequency) interface 508 can allow mobile device 500 to communicate wirelessly with various devices (e.g., a server or coordinating device). RF interface 508 can include RF transceiver components such as an antenna and supporting circuitry to enable data communication over a wireless medium, e.g., using Wi-Fi (IEEE 802.11 family standards), Bluetooth (a family of standards promulgated by Bluetooth SIG, Inc.), or other protocols for wireless data communication. In some embodiments, RF interface 508 can implement a Bluetooth LE (Low energy) proximity sensor 509 that supports proximity detection through an estimation of signal strength and/or other protocols for determining proximity to another electronic device. In some embodiments, RF interface 508 can provide near-field communication ("NFC") capability, e.g., implementing the ISO/IEC 18092 standards or the like; NFC can support wireless data exchange between devices over a very short range (e.g., 20 centimeters or less). RF interface 508 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 508.

Connector interface 510 can allow mobile device 500 to communicate with various devices (e.g., a server or coordinating device) via a wired communication path, e.g., using Universal Serial Bus (USB), universal asynchronous receiver/transmitter (UART), or other protocols for wired data communication. In some embodiments, connector interface 510 can provide a power port, allowing mobile device 500 to receive power, e.g., to charge an internal battery. For example, connector interface 510 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which can be transmitted to or from another device in analog and/or digital formats.

In some embodiments, connector interface 510 and/or RF interface 508 can be used to support synchronization operations in which data is transferred from a another device (e.g., a coordinating device) to mobile device 500 (or vice versa). For example, a user can be able to customize settings and other information for mobile device 500. While user interface 506 can support data-entry operations, a user can find it more convenient to define customized information on a separate device (e.g., a tablet or smartphone) that has a larger interface (e.g., including a real or virtual alphanumeric keyboard), then transfer the customized information to mobile device 500 via a synchronization operation. Synchronization operations can also be used to load and/or update other types of data in storage subsystem 504, such as media items, application programs, personal data, and/or operating system programs. Synchronization operations can be performed in response to an explicit user request and/or automatically, e.g., when wireless device 500 resumes communication with a particular host device or in response to either device receiving an update to its copy of synchronized information.

Environmental sensors 514 can include various electronic, mechanical, electromechanical, optical, or other devices that provide information related to external conditions around mobile device 500. Sensors 514 in some embodiments can provide digital signals to processing subsystem 502, e.g., on a streaming basis or in response to polling by processing subsystem 502 as desired. Any type and combination of environmental sensors can be used; shown by way of example are accelerometer 542, a magnetometer 544, a gyroscope 546, and a GPS receiver 548.

Some environmental sensors can provide information about the location and/or motion of mobile device 500. For example, accelerometer 542 can sense acceleration (relative to freefall) along one or more axes, e.g., using piezoelectric or other components in conjunction with associated electronics to produce a signal. Magnetometer 544 can sense an ambient magnetic field (e.g., Earth's magnetic field) and generate a corresponding electrical signal, which can be interpreted as a compass direction. Gyroscopic sensor 546 can sense rotational motion in one or more directions, e.g., using one or more MEMS (micro-electro-mechanical systems) gyroscopes and related control and sensing circuitry. Global Positioning System (GPS) receiver 548 can determine location based on signals received from GPS satellites.

In some instances, data detected from one or more environmental sensors can be used to identify a gesture indicative of particular input. For example, rather than using a touchscreen to select a notification action and/or dismiss an alert or notification presentation, this information can be conveyed by a particular arm movement.

Other sensors can also be included in addition to or instead of these examples. For example, a sound sensor can incorporate microphone 526 together with associated circuitry and/or program code to determine, e.g., a decibel level of ambient sound. Temperature sensors, proximity sensors, ambient light sensors, or the like can also be included.

Strap sensors 516 can include various electronic, mechanical, electromechanical, optical, or other devices that provide information as to whether mobile device 500 is currently being worn. Data from the strap sensors and/or other sensors can be used to infer whether mobile device 500 is being worn (e.g., by comparing one or more data values to a threshold). In some embodiments, certain features of mobile device 500 can be selectively enabled or disabled depending on whether mobile device 500 is currently being worn Power subsystem 512 can provide power and power management capabilities for mobile device 500. For example, power subsystem [514] 512 can include a battery 540 (e.g., a rechargeable battery) and associated circuitry to distribute power from battery 540 to other components of mobile device 500 that require electrical power. In some embodiments, power subsystem 512 can also include circuitry operable to charge battery 540, e.g., when connector interface 510 is connected to a power source. In some embodiments, power subsystem 512 can include a "wireless" charger, such as an inductive charger, to charge battery 540 without relying on connector interface 510. In some embodiments, power subsystem 512 can also include other power sources, such as a solar cell, in addition to or instead of battery 540.

In some embodiments, power subsystem 512 can control power distribution to components within mobile device 500 to manage power consumption efficiently. For example, power subsystem 512 can automatically place device 500 into a "hibernation" state when strap sensors 516 or other sensors indicate that device 500 is not being worn. The hibernation state can be designed to reduce power consumption; accordingly, user interface 506 (or components thereof), RF interface 508, connector interface 510, and/or environmental sensors 514 can be powered down (e.g., to a low-power state or turned off entirely), while strap sensors 516 are powered up (either continuously or at intervals) to detect when a user puts on mobile device 500. As another example, in some embodiments, while mobile device 500 is being worn, power subsystem 512 can turn display 520 and/or other components on or off depending on motion and/or orientation of mobile device 500 detected by environmental sensors 514.

Power subsystem 512 can also provide other power management capabilities, such as regulating power consumption of other components of mobile device 500 based on the source and amount of available power, monitoring stored power in battery 540, generating user alerts if the stored power drops below a minimum level, and so on.

In some embodiments, control functions of power subsystem 512 can be implemented using programmable or controllable circuits operating in response to control signals generated by processing subsystem 502 in response to program code executing thereon, or as a separate microprocessor or microcontroller.

It will be appreciated that mobile device 500 is illustrative and that variations and modifications are possible. For example, strap sensors 516 can be modified (or eliminated), and mobile device 500 can include a user-operable control (e.g., a button or switch) that the user can operate to provide input. Controls can also be provided, e.g., to turn on or off display 520, mute or unmute sounds from speakers 522, etc. Mobile device 500 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the mobile device has an RF interface, a connector interface can be omitted, and all communication between the mobile device and other devices can be conducted using wireless communication protocols. A wired power connection, e.g., for charging a battery of the mobile device, can be provided separately from any data connection.

Further, while the mobile device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 5 be implemented in a given embodiment of a mobile device.

Figure 6:
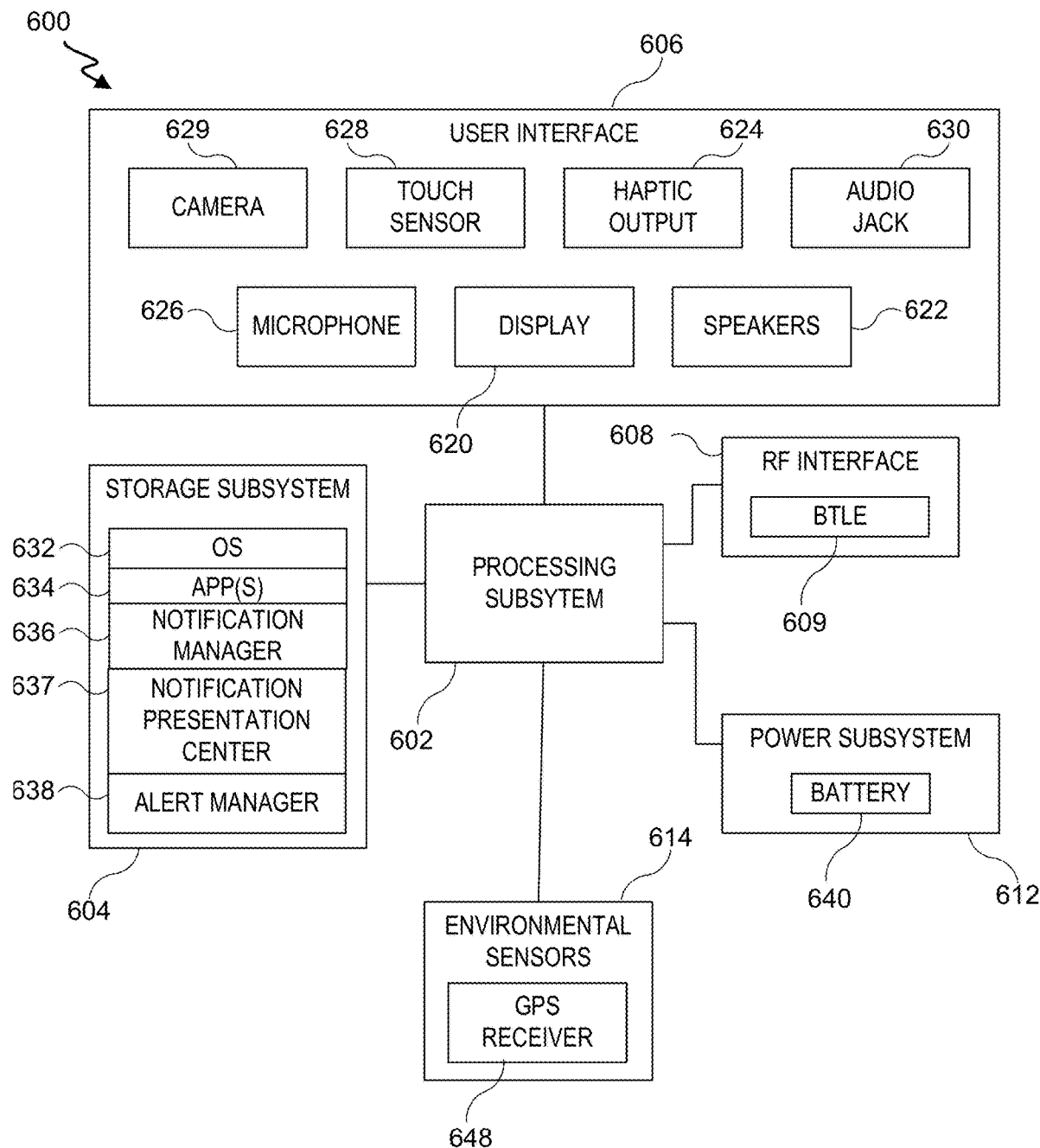
FIG. 6 is a simplified block diagram of a coordinating device according to an embodiment of the present invention.

A coordinating device such as one or more of coordinating devices 215a-215c can be implemented as an electronic device using blocks similar to those described above (e.g., processors, storage media, user interface devices, data communication interfaces, etc.) and/or other blocks or components. FIG. 6 is a simplified block diagram of a coordinating device 600 (e.g., implementing one or more of coordinating devices 215a-215c) according to an embodiment of the present invention. Coordinating device 600 can include processing subsystem 602, storage subsystem 604, user interface 606, one or more connection components (e.g., RF interface 608 and/or a connector interface, which is not shown) power subsystem 612, and environmental sensors 614. Coordinating device 600 can also include other components (not explicitly shown). Many of the components of coordinating device 600 can be similar or identical to those of mobile device 500 of FIG. 5.

For instance, storage subsystem 604 can be generally similar to storage subsystem 504 and can include, e.g., using magnetic storage media, flash memory, other semiconductor memory (e.g., DRAM, SRAM), or any other non-transitory storage medium, or a combination of media, and can include volatile and/or non-volatile media. Like storage subsystem 504, storage subsystem 604 can be used to store data and/or program code to be executed by processing subsystem 602.

User interface 606 can include any combination of input and output devices. A user can operate input devices of user interface 606 to invoke the functionality of coordinating device 600 and can view, hear, and/or otherwise experience output from coordinating device 600 via output devices of user interface 606. Examples of output devices include display 620, speakers 622, and haptic output generator 624. Examples of input devices include microphone 626, touch sensor 628, and camera 629. These input and output devices can be similar to output devices described above with reference to FIG. 5.

Processing subsystem 602 can be implemented as one or more integrated circuits, e.g., one or more single-core or multi-core microprocessors or microcontrollers, examples of which are known in the art. In operation, processing system 602 can control the operation of coordinating device 600. In various embodiments, processing subsystem 602 can execute a variety of programs in response to program code and can maintain multiple concurrently executing programs or processes. At any given time, some or all of the program code to be executed can be resident in processing subsystem 602 and/or in storage media such as storage subsystem 604.

Through suitable programming, processing subsystem 602 can provide various functionality for coordinating device 600. For example, in some embodiments, processing subsystem 602 can execute an operating system (OS) 632 and various applications 634 such as a phone-interface application, a text-message-interface application, a media interface application, a fitness application, and/or other applications. In some embodiments, some or all of these application programs can interact with a mobile device, e.g., by generating messages to be sent to the mobile device and/or by receiving and interpreting messages from the mobile device. In some embodiments, some or all of the application programs can operate locally on coordinating device 600.

In some embodiments, processing subsystem 602 can execute one or more of a notification manager code 636, a notification presentation center code 637 and an alert manager code 638 (each of which can be part of OS 632 or separate as desired). In some instances, one or more of these codes can operate similarly to or complementary to corresponding code stored on mobile device 500.

For example, execution of notification manager code 636 can cause coordinating device 600 to detect a new message (e.g., received from a server or other user device or locally generated) and/or add, re-rank and/or remove one or more notifications to a notification board. Execution of notification manager code 636 can further cause a notification presentation center and/or alert manager to be notified of a notification. Further, notification manager code 636 can include a distribution code that determines whether to forward a notification and/or message to another device (e.g., mobile device 500). For example, execution of the distribution code can cause coordinating device 600 to determine whether an app corresponding to a message or notification is on a blacklist or has at least one distribution-handling subscriber. If not, the execution can cause the message or notification to be forwarded to one or more other devices.

As another example, execution of notification presentation center code 637 can cause coordinating device 600 to determine whether, when and/or how to present a visual notification presentation corresponding to a notification and/or message. For example, execution can result in a determination as to where a notification presentation or notification indicator is to be presented on a screen and/or where a notification presentation is to be presented in a sequence of notification presentations.

As yet another example, execution of alert manager code 638 can cause coordinating device 600 to determine whether, when and/or how to present an alert (e.g., a non-visual alert) corresponding to a notification and/or message. In some instances, execution of alert manager code 638 causes coordinating device 600 to communicate with another device (e.g., a mobile device). For example, a communication from the other device can include a response to an invitation to present an alert and/or a communication to the other device can identify a mode of coordinating device 600, include an invitation to present an alert and/or identify whether an alert has been or will be presented.

RF (radio frequency) interface 608 can allow coordinating device 600 to communicate wirelessly with various other devices and networks. RF interface 608 can include RF transceiver components such as an antenna and supporting circuitry to enable data communication over a wireless medium, e.g., using cellular voice and/or data networks, Wi-Fi (IEEE 802.11 family standards). Bluetooth® (a family of standards promulgated by Bluetooth SIG. Inc.), or other protocols for wireless data communication. In some embodiments, RF interface 608 can implement a Bluetooth LE (Low energy) proximity sensor 609 that supports proximity detection through an estimation of signal strength and/or other protocols for determining proximity to another electronic device. In some embodiments, RF interface 608 can provide near-field communication ("NFC") capability, e.g., implementing the ISO/IEC 18092 standards or the like; NFC can support wireless data exchange between devices over a very short range (e.g., 20 centimeters or less). RF interface 608 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 608.

Environmental sensors 614 can include various electronic, mechanical, electromechanical, optical, or other devices that provide information related to external conditions around coordinating device 600. Sensors 614 in some embodiments can provide digital signals to processing subsystem 602, e.g., on a streaming basis or in response to polling by processing subsystem 602 as desired. Any type and combination of environmental sensors can be used; shown by way of example is a GPS receiver 648. This sensor can operate similarly to the corresponding sensor in mobile device 500 described above. Other sensors can also be included in addition to or instead of these examples, such as temperature sensors, proximity sensors, ambient light sensors, ambient sound (or noise) sensors, or the like.

Power subsystem 612 can provide power and power management capabilities for coordinating device 600. For example, power subsystem 612 can include a battery 640 (e.g., a rechargeable battery) and associated circuitry to distribute power from battery 640 to other components of coordinating device 600 that require electrical power. In some embodiments, power subsystem 612 can also include circuitry operable to charge battery 640, e.g., when an electrical connector (not shown) is connected to a power source. In some embodiments, power subsystem 612 can include a "wireless" charger, such as an inductive charger, to charge battery 640 without relying on a physical connector. In some embodiments, power subsystem 612 can also include other power sources, such as a solar cell, in addition to or instead of battery 640.

In some embodiments, power subsystem 612 can control power distribution to components within coordinating device 600 to manage power consumption efficiently. For example, when coordinating device 600 is in an inactive state (not interacting with a user), power subsystem 612 can place device 600 into a low-power state, e.g., by powering off various components of user interface 606, RF interface 608, and/or environmental sensors 614. Power subsystem 612 can also provide other power management capabilities, such as regulating power consumption of other components of coordinating device 600 based on the source and amount of available power, monitoring stored power in battery 640, generating user alerts if the stored power drops below a minimum level, and so on.

In some embodiments, control functions of power subsystem 612 can be implemented using programmable or controllable circuits operating in response to control signals generated by processing subsystem 602 in response to program code executing thereon, or as a separate microprocessor or microcontroller.

It will be appreciated that coordinating device 600 is illustrative and that variations and modifications are possible. In various embodiments, other controls or components can be provided in addition to or instead of those described above. Any device capable of interacting with another device (e.g., mobile and/or mobile device) to facilitate pairing of proximate devices, to forward messages and/or to coordinate message alerts can be a coordinating device.

Further, while coordinating device 600 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 6 be implemented in a given embodiment of a coordinating device.

Communication between one or more mobile devices, one or more coordinating devices and a server can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

In certain embodiments, an electronic device (e.g., device 500 or 600) may include one or more haptic modules for providing haptic feedback to the user. The embodiments described herein may relate to or take the form of one or more haptic actuators suitable to provide perceivable haptic feedback. Such actuators may include an electromagnetic coil, a permanent magnet or other magnetic field source. The magnetic field may induce motion in a mass of the haptic actuator by exerting a Lorentz force on the mass when the coil is energized. A direction of current through the coil determines the direction of motion of the mass, while the strength of the magnetic field determines the velocity of the mass and thus the magnitude of the haptic output.

In general, haptic actuators implemented in some embodiments may be configured to maximize or enhance resultant mechanical energy, given a very compact form factor of the electronic device.

In one embodiment, the haptic actuator may have a mass at least partially disposed within the coil when the mass is in a rest state. This mass may include two magnets of opposing polarities implemented as a magnet array affixed within a frame; the frame may provide extra weight to the mass and thus a stronger haptic output may be generated. A shaft may extend through the mass such that the mass may freely slide on the shaft.

The magnet array may generate a radial magnetic field that interacts with the magnetic field of the coil when the coil is energized by a current. The Lorentz force resulting from the interaction of the magnetic fields causes the mass to move along a shaft in a first direction. Reversing current flow through the coil reverses the Lorentz force. As a result, the magnetic field or force on the central magnet array is also reversed and the mass may move in a second direction. Thus, mass may move in both directions along the shaft, depending on the direction of current flow through the coil. Passing an alternating current through the coil may cause the central magnet array to move back and forth along a shaft. This motion may induce a motion in the housing of the actuator, which in turn may induce a motion in the housing of the electronic device.

In order to prevent the central magnet array from being attracted to the shaft, which could increase friction between the two and thereby increase the force necessary to move the central magnet array and frame, the shaft may be formed from a non-ferritic material such as tungsten, titanium, stainless steel, or the like, and the mass may slide along the shaft on bearings.

The actuator also may have structures that provide restoring force to the mass. For example, a spring may be located at either end of the shaft. As the mass impacts the spring, the spring compresses and stores kinetic energy. This kinetic energy may be released to return the mass along the shaft, thereby sending it to or near its initial starting position. The kinetic energy in the spring(s) may cooperate with the coil to move the magnet in such a fashion.

Although a linear actuator has been described herein, it should be appreciated that other types of actuators may be used in different embodiments. For example, some embodiments may employ a rotary actuator, a piezoelectric actuator, or any other suitable linear or non-linear actuator. Likewise, certain embodiments may employ multiple actuators working in concert.

In certain embodiments, an electronic device (e.g., device 500 or 600) may include one or more acoustic modules for transmitting and receiving acoustic energy. The acoustic module may be a speaker or microphone of an electronic device, as non-limiting examples.

The device housing may include a first acoustic port that is coupled to the acoustic module. In some instances, the acoustic module is configured to function as either a microphone or a speaker element for the device. However, for the purposes of the following description, the acoustic module is described as a speaker element or module. The acoustic port includes first and second orifices that facilitate the transmission of audible signals from the acoustic module to the user's ear. In this example, the orifices extend through the housing and acoustically connect internal components of the acoustic module with the external environment. In other examples, a single acoustic port may include more than two orifices or a single orifice. In some embodiments, the acoustic port may also include a housing structure ("umbrella"), screen mesh or other protective element configured to inhibit ingress of liquid or other foreign matter.

The umbrella structure generally prevents water or fluid from directly impacting the acoustic module. In one example, the acoustic port includes one or more orifices or openings that are offset with respect to an acoustic chamber of the module (e.g., the space between umbrella and mesh and including the one or more orifices. The umbrella structure may be formed into the outer surface of the case or housing. For example, the umbrella structure may be formed from the material located between two or more orifices or openings that are offset with respect to the acoustic chamber.

Further, certain embodiments may shape the acoustic chamber to reduce the likelihood that water accumulates in the chamber or other portion of the orifice. A screen may separate the acoustic cavity from the external environment and may impede the ingress of liquids or other foreign material from the external environment into the acoustic cavity. For example, the sidewalls of the orifice(s) may extend substantially to the surface of the screen in order to reduce surface tension of water in the orifice or chamber. Likewise, an exterior of the orifice may be chamfered to reduce surface tension of a liquid adjacent the orifice and thus facilitate liquid removal.

In the present example, the acoustic module is a speaker module. A speaker acoustic module may include various components for producing and transmitting sound, including a diaphragm, a voice coil, a center magnet, and side magnets/coils. In a typical implementation, the diaphragm is configured to produce sound waves or an acoustic signal in response to a stimulus signal in the voice coil. That is, a modulated stimulus signal in the voice coil causes movement of the diaphragm. Movement of the diaphragm creates sound waves, which propagate through the acoustic cavity of acoustic module and eventually out the port to the exterior environment. In some cases, the acoustic cavity functions as an acoustical resonator having a shape and size that is configured to amplify and/or dampen sound waves produced by movement of the diaphragm.

In certain embodiments, the acoustic module also includes structural support elements, such as an end wall and base. These elements may provide physical support for the speaker elements; various yokes, connectors and the like may also provide such support. Certain other embodiments may include a gasket to seal the interior of the device against the environment. It should be appreciated that the structure recited herein is meant as an example and not a limitation. For example, in alternative embodiments, the acoustic cavity may be formed from additional components or may be formed from a single component.

The acoustic module described above is provided as one example of a type of speaker acoustic module; other embodiments may use different types of speakers, microphones and the like. Further, although described in the context of a speaker, the foregoing is equally applicable to a microphone and many embodiments may likewise incorporate a microphone.

Figure 7:
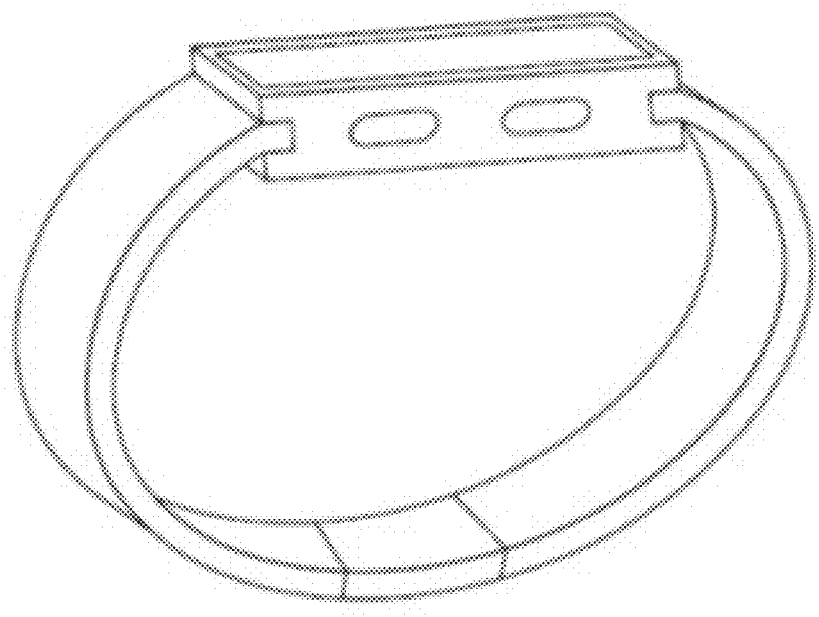
FIG. 7 shows an example of an electronic device according to an embodiment of the present invention.

Embodiments described herein may take the form of, be incorporated in, or operate with a suitable electronic device. One example of such a device is shown in FIG. 7 and takes the form of a wearable mechanism. As shown, the mechanism may be worn on a user's wrist and secured thereto by a band. The mechanism may have a variety of functions including, but not limited to: keeping time; monitoring a user's physiological signals and providing health-related information based on those signals; communicating (in a wired or wireless fashion) with other electronic devices, which may be different types of devices having different functionalities; providing alerts to a user, which may include audio, haptic, visual and/or other sensory output, any or all of which may be synchronized with one another, visually depicting data on a display; gather data form one or more sensors that may be used to initiate, control, or modify operations of the device; determine a location of a touch on a surface of the device and/or an amount of force exerted on the device, and use either or both as input; accepting voice input to control one or more functions; accepting tactile input to control one or more functions; and so on.

Alternative embodiments of suitable electronic devices include a phone; a tablet computing device; a portable media player; and so on. Still other suitable electronic devices may include laptop/notebook computers, personal digital assistants, touch screens, input-sensitive pads or surfaces, and so on.

Figure 8:
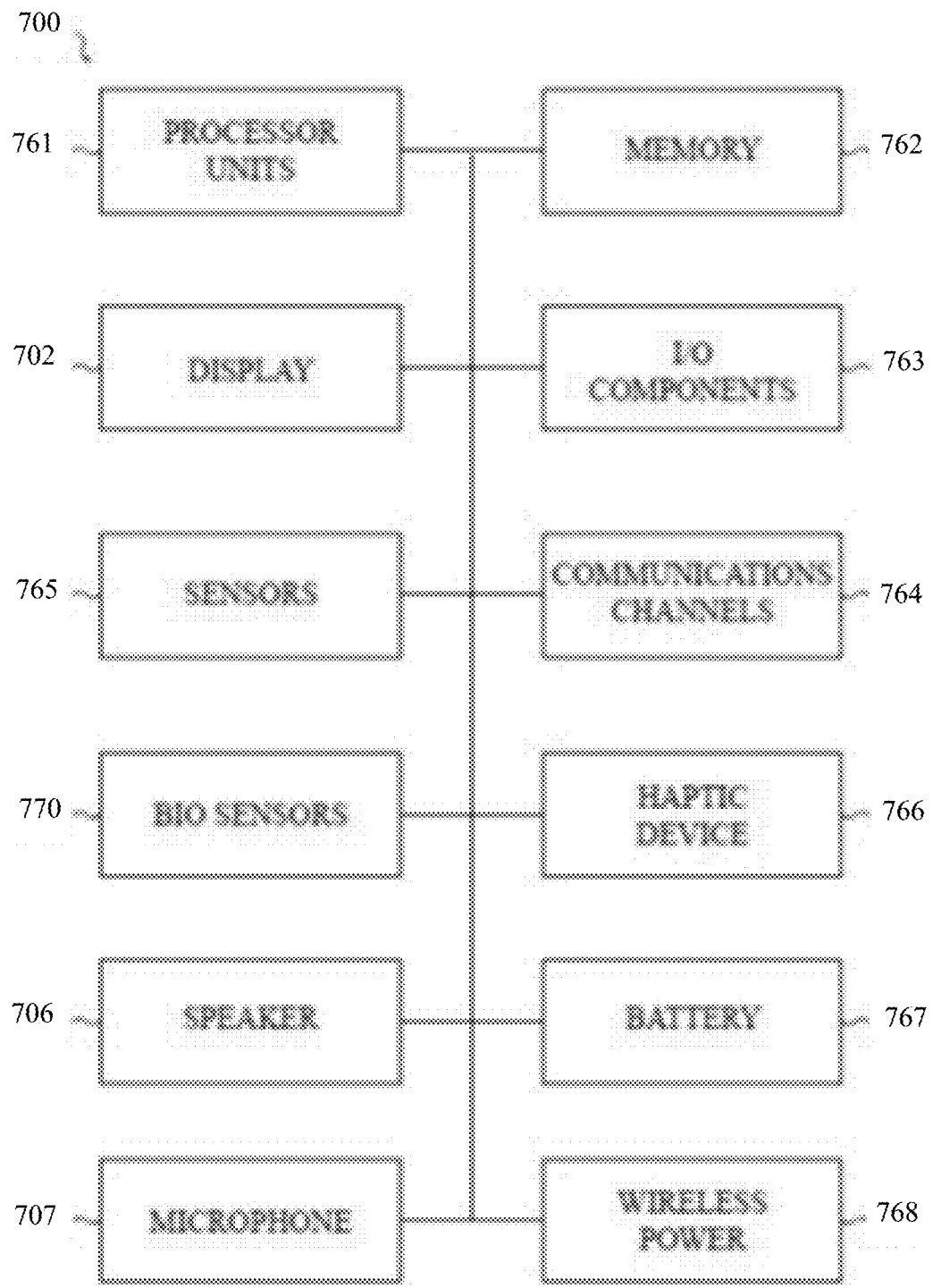
FIG. 8 depicts an example schematic diagram of a wearable electronic device according to an embodiment of the present invention.

FIG. 8 depicts an example schematic diagram of a wearable electronic device. As shown in FIG. 8, the device 700 includes one or more processing units 761 that are configured to access a memory 762 having instructions stored thereon. The instructions or computer programs may be configured to perform one or more of the operations or functions described with respect to the device 700. For example, the instructions may be configured to control or coordinate the operation of the various components of the device. Such components include, but are not limited to, display 702, one or more input/output components 763, one or more communication channels 764, one or more sensors 765, a speaker 706, microphone 707, and/or one or more haptic feedback devices 766. In some embodiments the speaker and microphone may be combined into a single unit and/or may share a common port through a housing of the device.

The processing units 716 of FIG. 8 may be implemented as any electronic device capable of processing, receiving, or transmitting data or instructions. For example, the processing units 716 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

The device also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, the device may include a force sensor to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

The electronic device may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Figure 9:
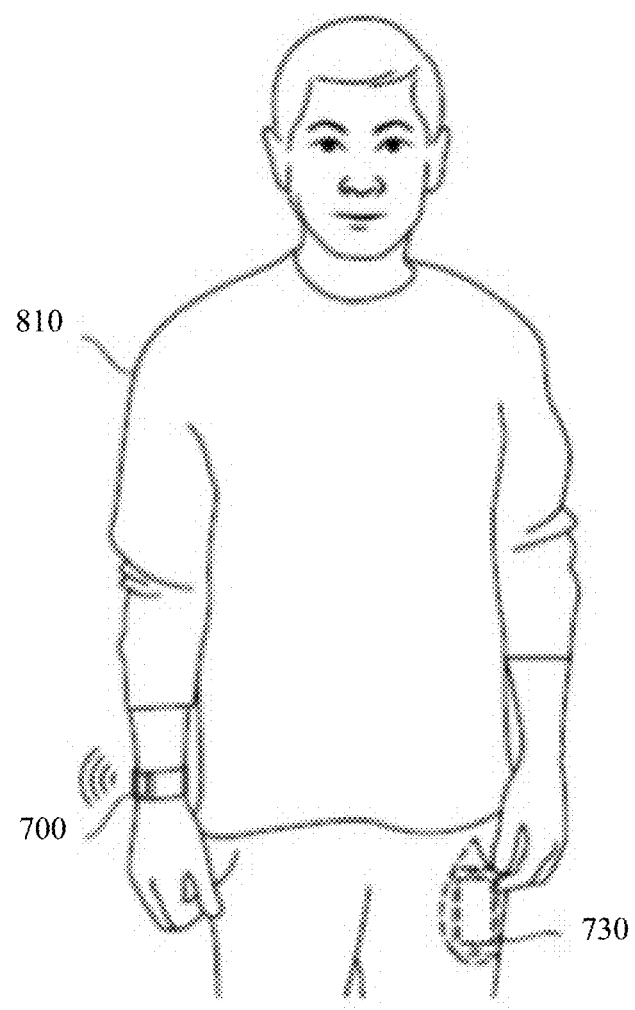
FIG. 9 depicts a user wearing a sample electronic device with a second electronic device in his pocket.

The example electronic device may communicate with other electronic devices either through a wired connection or wirelessly. Data may be passed between devices, permitting one device to relay information to another; control another, employ another's sensors, outputs, and/or inputs; and so on. FIG. 9 depicts a user 810 wearing a sample electronic device 700 with a second electronic device 730 in his pocket. Data may be wirelessly transmitted between the electronic devices 700, 730, thereby permitting the user 810 to receive, view, and interact with data from the second device 730 by means of the first electronic device 700. Thus, the user 810 may have access to part or all of the second device's functionality through the first electronic device 700 without actually needing to interact directly with the second device.

Further, the electronic devices 700, 730 may cooperate not only to share data but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access and the like between the two and ultimately to a user. As one non-limiting example, the electronic device 700 may be unable to place or receive telephone calls while the second device 730 may be able to do so. A user may nonetheless make and/or receive calls through the first device 700, which may employ the second device 730 to actually place or accept a call.

As another non-limiting example, an electronic device 700 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user.

Certain embodiments may be wirelessly charged. For example, an inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 8, the device 700 may also include one or more acoustic elements, including a speaker 706 and/or a microphone 707. The speaker 706 may include drive electronics or circuitry and may be configured to produce an audible sound or acoustic signal in response to a command or input. Similarly, the microphone 707 may also include drive electronics or circuitry and is configured to receive an audible sound or acoustic signal in response to a command or input. The speaker 706 and the microphone 707 may be acoustically coupled to port or opening in the case that allows acoustic energy to pass, but may prevent the ingress of liquid and other debris.

Certain embodiments may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of the electronic device will be apparent upon reading the specification in its entirety.

Figure 10:
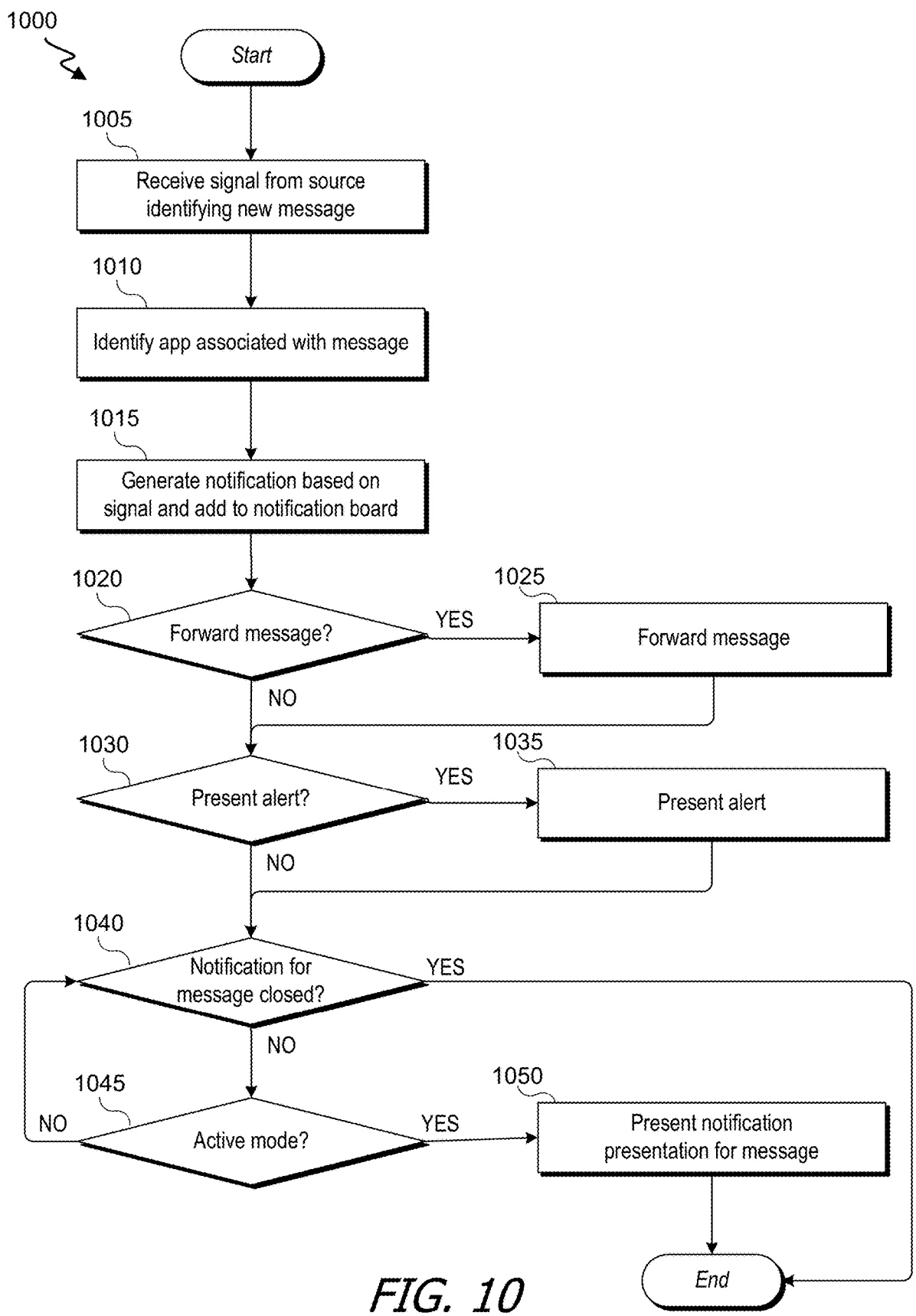
FIG. 10 is a flow diagram of a process for receiving a message and performing appropriate responsive actions in accordance with an embodiment of the invention.

FIG. 10 is a flow diagram of a process 1000 for receiving a message and performing appropriate responsive actions in accordance with an embodiment of the invention. Part or all of process 1000 can be implemented in a coordinating device and/or a mobile device.

Process 1000 can begin at block 1005 where a signal can be received from a source. The source can be, e.g., a server, a coordinating device, a mobile device, etc. In some instances, the source is a component of a device performing part or all of process 1000. The signal can identify a new message. The message can include, for example, a message from a person (e.g., a text message or message from a social network), a message identifying an event (e.g., a news story, a price change, a task completion, or a weather forecast), a message identifying an upcoming or current appointment or task, and so on. The message can be associated with an app (e.g., such that execution of the app had requested the message or connected a device executing part or all of process 1000 with another device or server). The signal can, for example, include the message, identify an associated app, identify a party (e.g., user) associated with the message, and/or identify a time of the message.

At block 1010, an app associated with the new message can be identified. The app can be identified based on, for example, an identifier of an app in the message, an identifier of a source in the message and/or a source of the message.

At block 1015, a notification can be generated based on the signal, and the notification can be added to a notification board. The notification can include any electronic representation of the message, and the notification board can include any structure to organize, package or manage one or more such notifications. The notification can include, for example, part or all of the message, a time (e.g., that the message was received or notification was generated), an identifier of a source of the message, an identifier of app corresponding to the message, a priority of the message, an expiration time for the message and/or notification and/or allowable actions. Adding the notification to the notification board can include ranking the notification relative to other notifications in the board.

A determination can be made at block 1020 as to whether to forward the message (or processed version thereof) to one or more other devices. The one or more other devices can include, for example, paired devices, other devices associated with a same user account (e.g., for an operating system, a service, an app, an email account, or a social networking account) as is associated with a device performing all or part of process 1000, and/or one or more devices identified in a locally or remotely stored list (e.g., which can also identify the device that is performing all or part of process 1000).

This determination can depend on the app identified at block 1010. In one instance, a default is to forward the message to the one or more other devices unless a condition is met. The condition can include, for example, the app being on a forwarding blacklist and/or the app being associated with a distribution-handling subscriber.

If it is determined that the message is to be forwarded, process 1000 can continue to block 1025 where the message (or processed version thereof) can be forwarded to the one or more other devices. Forwarding the message can include, for example, transmitting the received signal to the one or more other devices or transmitting a processed version of the signal to the one or more other devices. The processed version can include part or all of the message and/or the generated notification. The processed version can include additional and/or different data as compared to the received message, and/or the processed version can be a reduced version where some of the data present in the received signal is not in the processed version. The message can be forwarded over a network (e.g., a wireless network), such as over the Internet or over a short-range (e.g., Bluetooth) connection. In some instances, different networks can be used to forward the message to different devices, and/or different processed versions of the message can be forwarded to different devices (e.g., the different versions corresponding to different features of the devices).

At block 1030, it can be determined as to whether to present an alert corresponding to the message. This determination can be based on whether a device performing part or all of process 1000 is in a do-not-disturb mode. Such a mode can be on with a result of, for example: blocking of all audio and/or haptic alerts, blocking of all audio and/or haptic alerts corresponding to phone calls and text messages, blocking of all audio and/or haptic alerts when the device is locked, blocking of all audio and/or haptic alerts corresponding to phone calls and text messages when the device is locked, blocking of select audio and/or haptic alerts, blocking of select audio and/or haptic alerts corresponding to phone calls and text messages, blocking of select audio and/or haptic alerts when the device is locked, and/or blocking of select audio and/or haptic alerts corresponding to phone calls and text messages when the device is locked. In some instances, when the device is in do-not-disturb mode, the determination at block 1030 can be that an alert corresponding to the message is not to be presented.

The determination can also or alternatively be based on, for example, whether a proximate condition is satisfied for one or more other devices. The one or more other devices can include, for example, a device paired to a device performing all or part of process 1000, a device associated with a same user account (e.g., for an operating system, a service, an app, an email account, or a social networking account) as is a device performing all or part of process 1000, and/or a device identified in a locally or remotely stored list (e.g., which can also identify the device that is performing all or part of process 1000). The proximate condition can include, for example, determining whether a device performing all or part of process 1000 is: within a threshold distance from one or more of the other devices, paired with one or more of the other devices, and/or sharing a network (e.g., an Internet account) with one or more of the other devices).

When evaluation of the proximate condition indicates that no other devices are near the device performing part or all of process 1000 ("near" as defined by the condition), a determination can be made to present the alert on the device. When it is determined that the proximate condition is satisfied, a set of devices can be defined to include the device performing all or part of process 1000 and the one or more other devices determined to be proximate to the device. Within this set, a portion of the devices (e.g., a single device) can be selected to present the alert. The selection can be based on, for example, a mode of each of one or more devices in the set (e.g., to bias the selection towards devices in an active mode) and/or a device priority (e.g., to bias the selection towards coordinating devices over mobile devices).

The determination can also or alternatively be based on whether another device (e.g., a device or higher priority or a mobile device) is detected to be in a particular mode (e.g., an active mode or worn mode). Such detection can occur as a result of receiving a message from the other device or an intermediate device (e.g., a server) identifying the other device's mode or an indication as to whether it is in the particular mode. For example, a device performing all or part of process 1000 can determine that an alert is not to be presented when a message is received indicating that it is inferred (e.g., based on sensor readings) that an associated mobile device is being worn.

In some instances, the determination at block 1030 can depend on other factors, such as whether a recent device movement variable (e.g., to bias selection towards a device that has recently moved and/or to inhibit alert presentation amongst a device that has not moved for at least a threshold period of time).

If it is determined that the alert is to be presented, process 1000 can continue to block 1035 where the alert can be presented. The alert can include a stimulus to quickly notify a user of the message. In some instances, the alert is non-visual, such as an audio signal (e.g., tone or ringtone) or a haptic stimulus (e.g., a vibration). In some instances, the alert is visual, such as a flash on a screen, turning a screen from off to on, increasing a screen's brightness or presenting an icon. In some instances, a message content and/or associated app is not identifiable based on the alert. When it is determined that an alert is to be presented, the alert can be presented irrespective of whether any user input corresponding to a request for information was received. Thus, the alert can be presented even if a user does not have a particular app open, did not affirmative answer or open a message, and/or—in some instances—unlock and/or interact with a screen of the device.

At blocks 1040-1045, it can be determined whether to present a notification presentation for the message, such as a visual notification presentation. This determination can be based on, e.g., whether a notification is pending or has already been closed and/or whether the device performing part or all of process 1000 is in an active mode. Specifically, at block 1040, it can be determined whether a notification corresponding to the new message is or is to be closed (or, conversely, whether it remains pending). A notification can be closed, e.g., upon determining that an expiration time for a message or corresponding notification or notification has passed or upon receiving information from another device indicating that the notification is to be closed. For example, the information can be received upon another device having presented a same or similar notification presentation for the message or upon detecting particular user input (e.g., dismissing the notification, viewing the message or postponing the notification). In response to an affirmative determination at block 1040, process 1000 can conclude until another signal identifying another message is received.

In response to a determination that a notification corresponding to the new message is not closed (and instead remains pending), process 1000 can continue to decision block 1045 where it can be determined whether a device performing part or all of process 1000 is in an active mode. This determination can include, for example, determining whether a screen of the device is on, whether user input has been received via an interface of the device within a threshold time period, whether the device is unlocked, whether it is detected that the device is being worn and/or whether one or more apps are being run on the device. It will be appreciated that a definition of "active mode" can vary, e.g., across device types.

When it is determined that the device is in an active mode, a notification presentation for the message can be presented. Presenting the notification presentation can include visually presenting the presentation on part or all of a device screen. The notification presentation can include part or all of a message (e.g., a subject), a source, an identifier of another user associated with the message (e.g., a name, user name, email address or phone number), an associated app, a time, a priority ranking, and/or one or more potential actions (e.g., to open the associated app, to view the full message, to respond to the message, to dismiss the notification and/or to postpone the notification).

When it is determined that the device is not in active mode (e.g., that a screen of the device is on), process 1000 can return to block 1040. Blocks 1040-1045 can be repeated until it is determined that the notification is closed or the device is in an active mode.

It will be appreciated that process 1000 need not performed in entirety and a particular implementation of process 1000 can depend on, e.g., a type of device, user preferences, message type, device mode, etc. For example, blocks 1020-1025 can be removed from process 1000 for particular device types (e.g., wearable devices). As another example, in one instance, a notification need not be generated at block 1015 (e.g., if the signal received at block 1005 includes the notification). It will also be appreciated that blocks in process 1000 need not be performed in the depicted order. For example, in one instance, blocks 1020-1025 can be performed after blocks 1030-1050.

It will further be appreciated that, in some instances, different portions of process 1000 (or any other process disclosed herein) can be handled by different software, device components or devices. For example, in some instances, a daemon performs some or all of blocks 1015-1050, and in some embodiments a plugin performs some or all of blocks 1015-1050. Appropriate handling can, in some instances, depend on the app identified as being associated with the message. For example, a daemon may determine that a processed version of a first message of a first app is to be forwarded and may process the first message and forward the processed first message; meanwhile, a plugin may determine that a processed version of a second message of a second app is to be forwarded and may process the second message and forward the processed second message.

As illustrated in FIG. 10 and the corresponding description, multiple determinations relating to a message can depend on a mode of each of one or more devices. For example, each of the determination at block 1030 as to whether to present a (e.g., non-visual) alert for a message and a determination as to whether to present a notification presentation for a message can depend on a mode of a device performing process 1000. When multiple mode assessments are performed (e.g., to determine whether to present an alert and also to determine whether to present a notification presentation, the assessments may, or may not, be of a same time. For example, in one instance, it can be determined that a device is both to present an audio alert and a visual notification for a message if the screen of the device is on (e.g., but not otherwise). As another example, an alert-presentation rule can indicate that a device is only to present an alert for a message if it's screen is on and if an invitation is received from another device to present the alert, whereas a notification-presentation rule can indicate that the device is to present a notification presentation for the message if the screen is on. As yet another example, it can be determined that a device is to present a visual notification for a message when the screen is on, but that it is to present an audio or haptic alert for the message when the screen is on and the device is not in a do-not-disturb mode.

Process 1000 can exemplify how a single device can perform a variety of actions and/or action combinations depending on circumstances. For example, a single device can forward a first message associated with an app but neither present an alert for the message nor present a notification presentation for the message. The same device can later forward a second message associated with a same or different app and also present an alert for the message.

Figure 11:
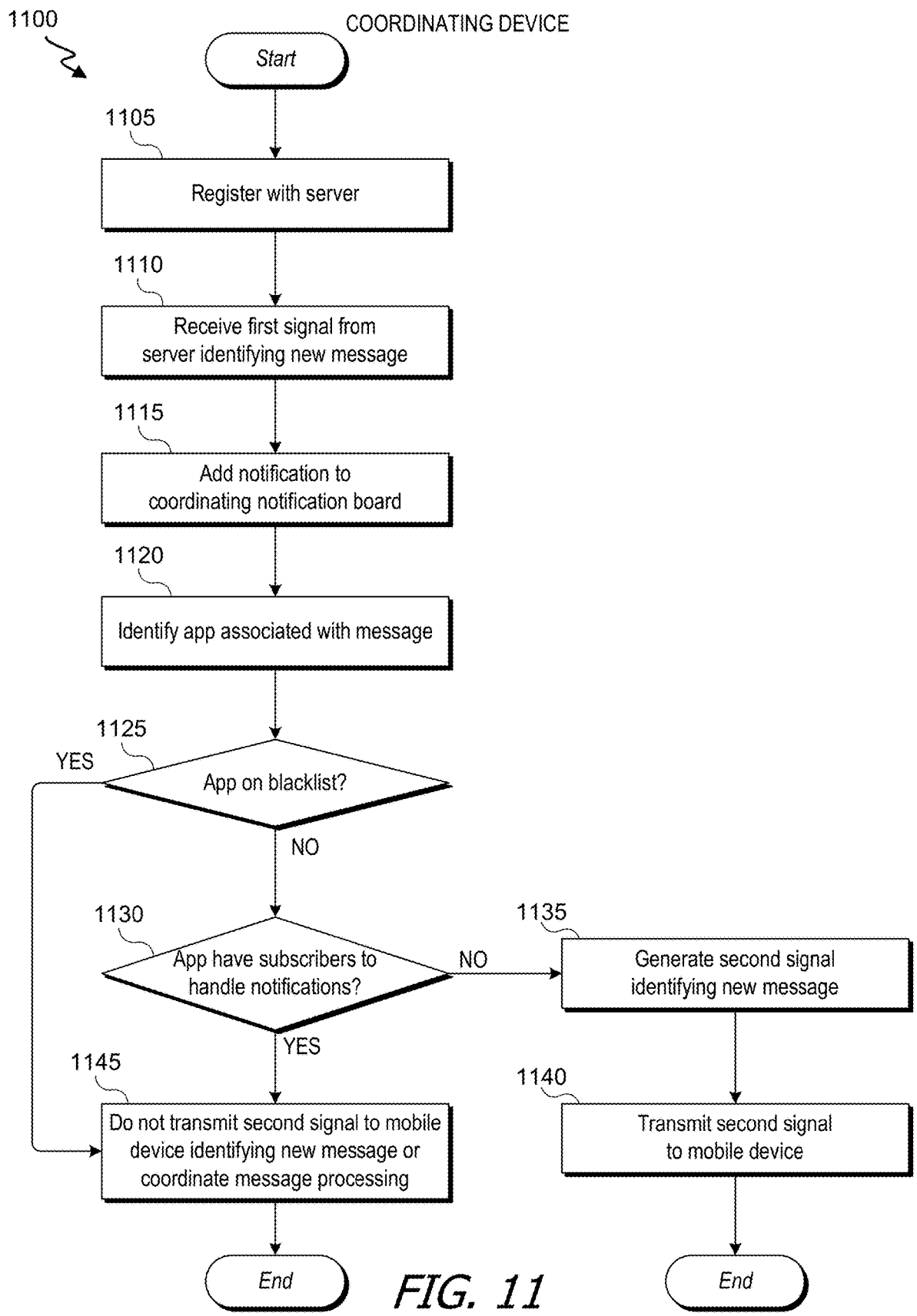
FIG. 11 is a flow diagram of a process for determining whether to forward a message to another device in accordance with an embodiment of the invention.

FIG. 11 is a flow diagram of a process 1100 for determining whether to forward a message to another device in accordance with an embodiment of the invention. Part or all of process 1100 can be implemented in a coordinating device. Process 1100 can begin at block 1105 where a coordinating device can register with a server or other device. The server can include one hosting a server application corresponding to an app on the coordinating device and/or one hosting an operating system, one managing cross-device accounts.

At block 1110, a first signal can be received from the server or other device. The first signal can identify a new message. For example, the new message can include one associated with an app hosted by the server. The new message can include one generated based on, for example, events (e.g., news, financial markets, a current grade, weather, software update availability or promotions) and/or a communication (e.g., identifying a message, an SMS message, an email, a phone call, a photo, a video, a link and/or an audio clip) from a device associated with a different user from one associated with the coordinating device.

A notification corresponding to the new message can be added to a notification board of the coordinating device at block 1115. Block 1115 can parallel block 1015 in process 1000. An app associated with the message can be identified at block 1120. Block 1120 can parallel block 1010 in process 1000.

At block 1125, it can be determined whether the app is identified on a blacklist. When the app is not identified on the blacklist, process 1100 can continue to block 1130 where it can be determined whether the app has one or more subscribers for handling forwarding of messages.

The blacklist and/or any subscriber identifications can be stored locally on the coordinating device or remotely stored (e.g., such that the coordinating device can then communicate with a remote device to request the blacklist or subscriber identification or information as to whether a particular app is on the blacklist or has a distribution-handling subscriber). In some instances, the blacklist and/or subscriber identifications can be constructive in that the information can be built based on a combination of stored data. For example, data associated with individual app files can separately indicate whether each app is blacklisted.

Which apps are on the blacklist and/or apps' subscribers can be fixed or dynamic (e.g., such that apps can dynamically be added to or removed from the blacklist, and/or such that whether an app has a subscriber can change and/or subscriber identities can change). The blacklist and/or a subscriber list for one or more apps can be defined, in part or in whole, by a developer of an operating system on the coordinating device, a developer of each of one or more apps and/or a user of the coordinating device. Whether an app is present on a blacklist or has a distribution-handling subscriber can depend on a person's decision (e.g., a user input) and/or one or more factors pertaining to the app. One example of a factor is whether a limit is to be imposed as to which devices (or device types) are to receive messages for the app and/or how devices are to receive the messages. Such limits can be based on, for example, device capabilities (e.g., a processing power or whether the app is downloaded on the device), privacy restrictions associated with the app) and/or cross-device applicability of messages associated with the app. Another example of a factor is a target latency for delivering messages. Rather than relying on message forwarding, diverging message transmission from the server to multiple devices can have the potential to hasten a speed at which each device receives the message.

When the app neither is on the blacklist nor has one or more subscribers for handling message distribution, process 1100 can continue to block 1135 where a second signal identifying the new message is generated. The second signal can be the same as and/or can include part or all of the data of the first signal. The second signal can include part or all of the new message and/or the generated notification. The second signal can include an identifier of the coordinating device. The second signal can include an indication as to how the message is being sent (e.g., over a short-range network or not). The second signal can include an identification of the app associated with the message.

In some instances, second signal can be at least partly reduced relative to the first signal in that some of the data in the first signal can be excluded from the second signal. This reduction can be performed based on, for example, information known about a receiving device (e.g., to exclude signal data include for a device with another characteristic). The reduction can be performed by using a compression technique. In some instances, part or all of a message is excluded from the second signal. The reduced signal can still indicate that a new message was received and can allow a receiving device to alert a user of the message. If a user then requests to view the message, the receiving device can then retrieve it.

At block 1140, the second signal can be forwarded to one or more devices. The one or more devices can include one or more mobile devices, which can include (for example) one(s) paired to the coordinating device and/or associated with a same user account as associated with the coordinating the device. The transmission can occur over one or more networks, such as the Internet or a short-range connection (e.g., Bluetooth or BTLE).

When it is determined that the app either is on the blacklist or has a subscriber for handling message forwarding, process 1100 can continue to block 1145 where a second signal identifying the new message is not transmitted to the mobile device. Thus, in some instances, the mobile device may not receive the message or can receive it from another source.

While process 1100 includes an evaluation of two conditions to determine whether to forward a message, it will be appreciated that other embodiments can include a different number of conditions and/or different conditions. For example, a condition can depend on a proximity of the coordinating device to another device. In one instance, block 1130 can be removed from process 1100.

In some instances, a subscriber app is one to handle distribution of a message to one or more other devices. In such cases, a notification distribution module need not perform its routine distribution functions. In some instances, a subscriber app is one to process a message prior to a transmission to another device. For example, the subscriber app may generate a summary or compressed version of the message.

Figure 12:
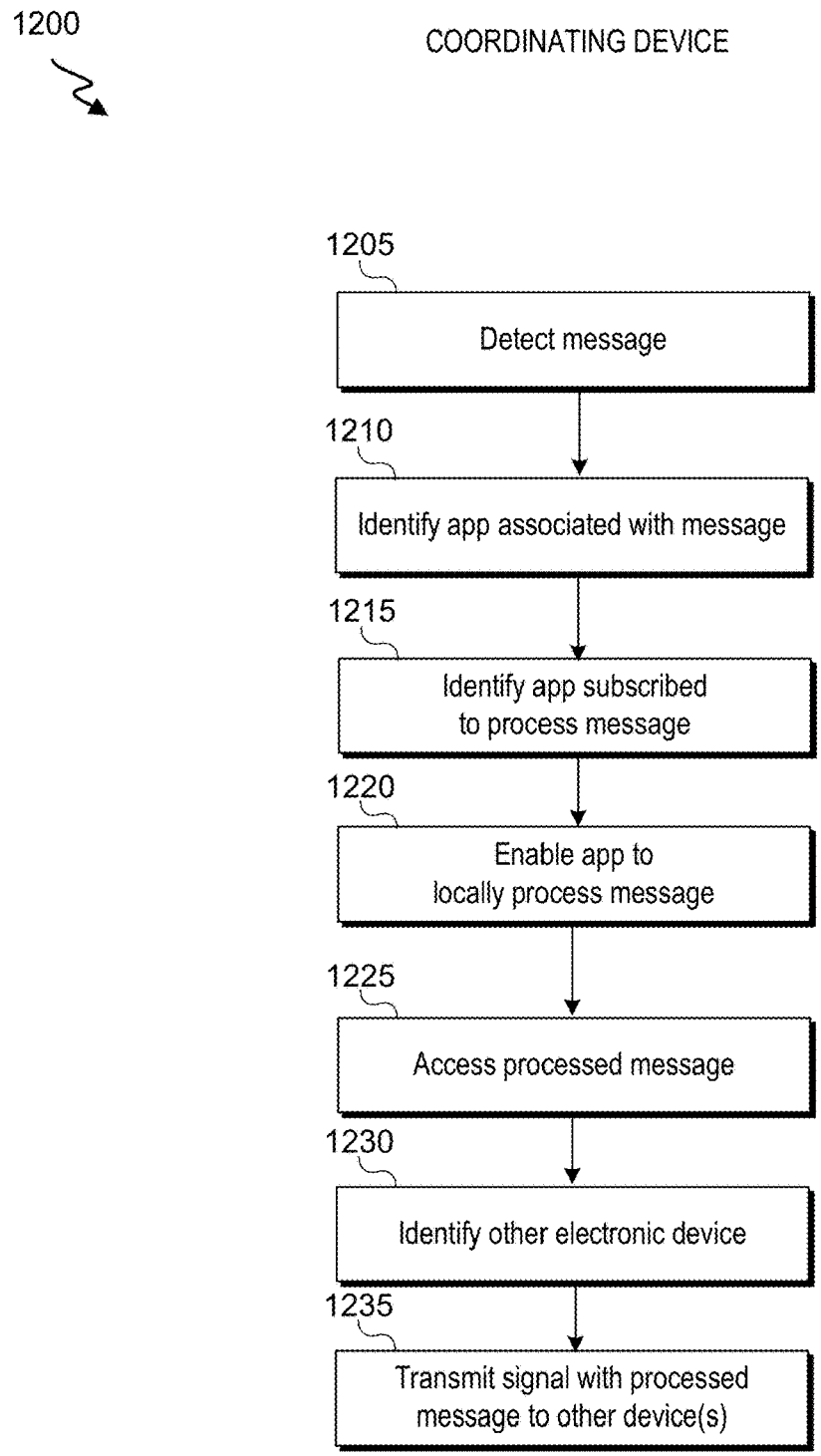
FIG. 12 is a flow diagram of a process for enabling a subscribing app to process a message prior to forwarding the message to another device in accordance with an embodiment of the invention.

FIG. 12 is a flow diagram of a process 1200 for enabling a subscribing app to process a message prior to forwarding the message to another device in accordance with an embodiment of the invention. Part or all of process 1200 can be implemented in a coordinating device.

At block 1205, a message can be detected. Detecting the message can include detecting receipt of the message from, for example, a server or other device (e.g., associated with a shared user account or a paired device) or detecting a locally generated the message (e.g., the message having been generated using an app installed on or executing on a device performing part or all of process 1200). The message can include received content (e.g., originating from another user or source) and/or can represent an occurrence of an event.

At block 1210, an app (or plugin) associated with the message can be identified. The app can be one at least partly responsible for having generated the message or transmitted it to a device performing process 1200. The app can be identified, for example, based on a source of the message or content in the message (e.g., identifying the app).

At block 1215, an app (or plugin) subscribed to process the message can be identified. The subscriber app can be identified by, for example, querying a subscriber structure with an identifier of the app identified at block 1210, an identifier of a source of the message (e.g., an identifier of another device), with a characteristic of the message (e.g., a message type) or with an identifier of the message (or using the identifier of the app identified at block 1210, the characteristic of the message or the identifier of the message to look up the app subscribed to process the message). For example, a subscriber structure can associate a particular server with a particular app, such that all messages from that server are to be processed by the particular app. In some instances, the message can include an identifier of the subscriber app. In some instances, the app (or plugin) identified at block 1215 is the same as the app (or plugin) identified at block 1210. In some instances, they are different.

At block 1220, the app identified at block 1215 can be enabled to locally process the message. For example, the message can be availed for local (or, in some instances, remote) processing by the subscriber app by, e.g., sending the message to a processing module for the subscriber app and/or by initiating execution of the subscriber app. The processing can be performed according to a processing protocol, which can include a protocol for, for example, generating a summary for the message (e.g., removing content that is common across messages of a given type and/or removing data that is unnecessary for display on a particular device type). In some instances, which processing protocol is used and/or a characteristic of the processing protocol depends on a characteristic of the signal or the identified app. For example, different apps may remove different types of information from a message.

At block 1225, the processed message can be accessed (e.g., received from an app processor). At block 1230, one or more other electronic devices can be identified. The other electronic device(s) can include one, more or all devices associated with a same user account as associated with a device performing process 1200; one, more or all devices paired with the performing device; one, more or all devices for which a proximate condition is satisfied and/or one, more or all devices of a given type. In one instance, the other electronic device(s) are identified by the subscriber app and/or based on the processing.

At block 1235, a signal with the processed message can be transmitted to the other device(s). The signal can also include an identifier, for example, of a device performing process 1200, an identifier of the app associated with the message and/or an identifier of the subscriber app.

Figure 13:
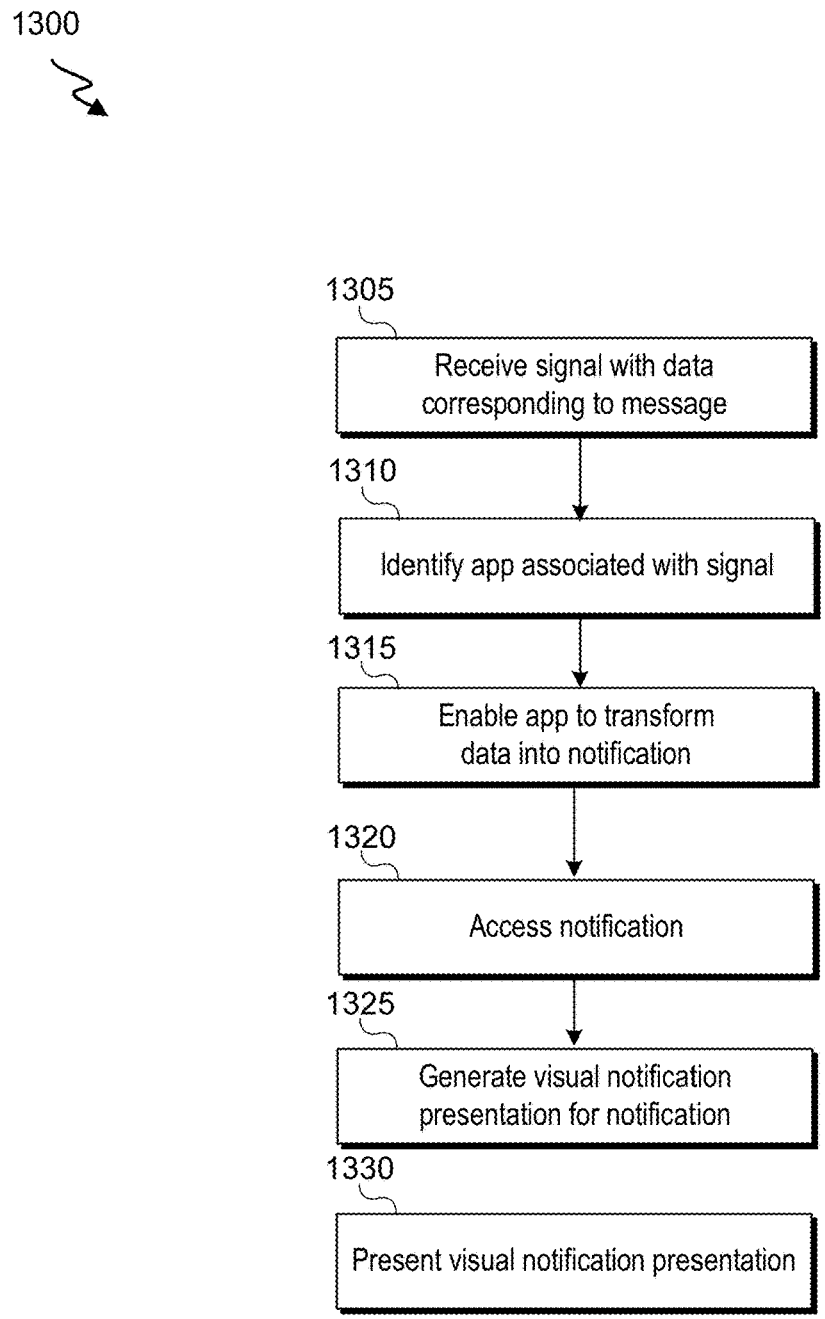
FIG. 13 is a flow diagram of a process for transforming a processed in accordance with an embodiment of the invention.

FIG. 13 is a flow diagram of a process 1300 for transforming a processed in accordance with an embodiment of the invention. Part or all of process 1300 can be implemented in a mobile device.

At block 1305, a signal with data corresponding to a message can be received. The signal can include, in some instances, a message processed at another device (e.g., at a coordinating device), a message summary, and/or an identifier of an app. In some instances, the signal received at block 1305 corresponds to a signal transmitted at block 1235 in process 1200.

At block 1310, an app associated with the signal can be identified. The app can include, for example, one that was used to generate a message summary included in the message, one subscribed to process an initial version of the message, one identified in the message, and/or one subscribed to transform a processed version of the message (e.g., included in the signal). In some instances, the app can be identified by analyzing the signal (e.g., to extract an identifier of the app). In some instances, the app can be identified by using a subscriber structure, which can (or need not) be a same subscriber structure that a coordinating device may have used to process an original message. The subscriber structure can associate a characteristic of the message, an app identifier (e.g., for an app at least partly responsible for initially generating or transmitting the message or for an app that processed the message), an identifier of the message, or another variable with one or more apps subscribed to transform a processed version of the message. Thus, block 1310 can include looking up an app identifier, message identifier or other variable in the subscriber structure to identify an associated app for the message. In some instances, part of the data in the signal can be used to identify the app (e.g., by looking up the content in a structure). For example, a signal can identify an original source of the message, and the source can be associated with (e.g., paired with) an app in a structure. In some instances, app subscriptions are configured such that a same app (though on different devices) generates a message summary and also transforms the summary (e.g., into a notification or complete message).

At block 1315, the identified app can be enabled to transform the message data into a notification. The enablement can include, for example, availing and/or sending the data to the app to (e.g., a local) processing module for the app and/or initiating execution of the app. The transformation can be performed according to a transformation protocol, which can include a protocol for, for example, expanding a summary for the message (e.g., by combining locally stored content or remote content associated with the message or app that is identified in the summary or common across messages of a given type), and/or reconstituting an original message corresponding to the data. In some instances, the transformation can include reversing some or all of processing of a message that had been performed on a device having sent the signal. In some instances, which transformation protocol is used and/or a characteristic of the transformation protocol can depend on a characteristic of the signal or the identified app. For example, different apps may supplement processed messages with different types of additional information.

To illustrate a transformation, a received signal may include an identifier of a stock alert defined by the user. Upon receiving the signal, a financial app on a mobile device may retrieve the identified stock alert, which can include a particular stock symbol and a stock-price threshold. The financial app can then transform the signal into a more complete notification that includes the stock symbol and threshold. The financial app can even further retrieve a current price of the stock from a remote source and include the current price in the notification.

At block 1320, the notification can be accessed (e.g., received from the app after the transformation). At block 1325, a visual notification presentation can be generated for the notification. The visual notification can include all or part of the message and/or notification. In some instances, the visual notification includes one or more options that, upon user selection of an option, causes additional information to be presented and/or allows a user to take an action (e.g., dismiss a reminder, return a call, generate and send a text message, etc.). At block 1330, the visual notification presentation can be presented.

Figure 14:
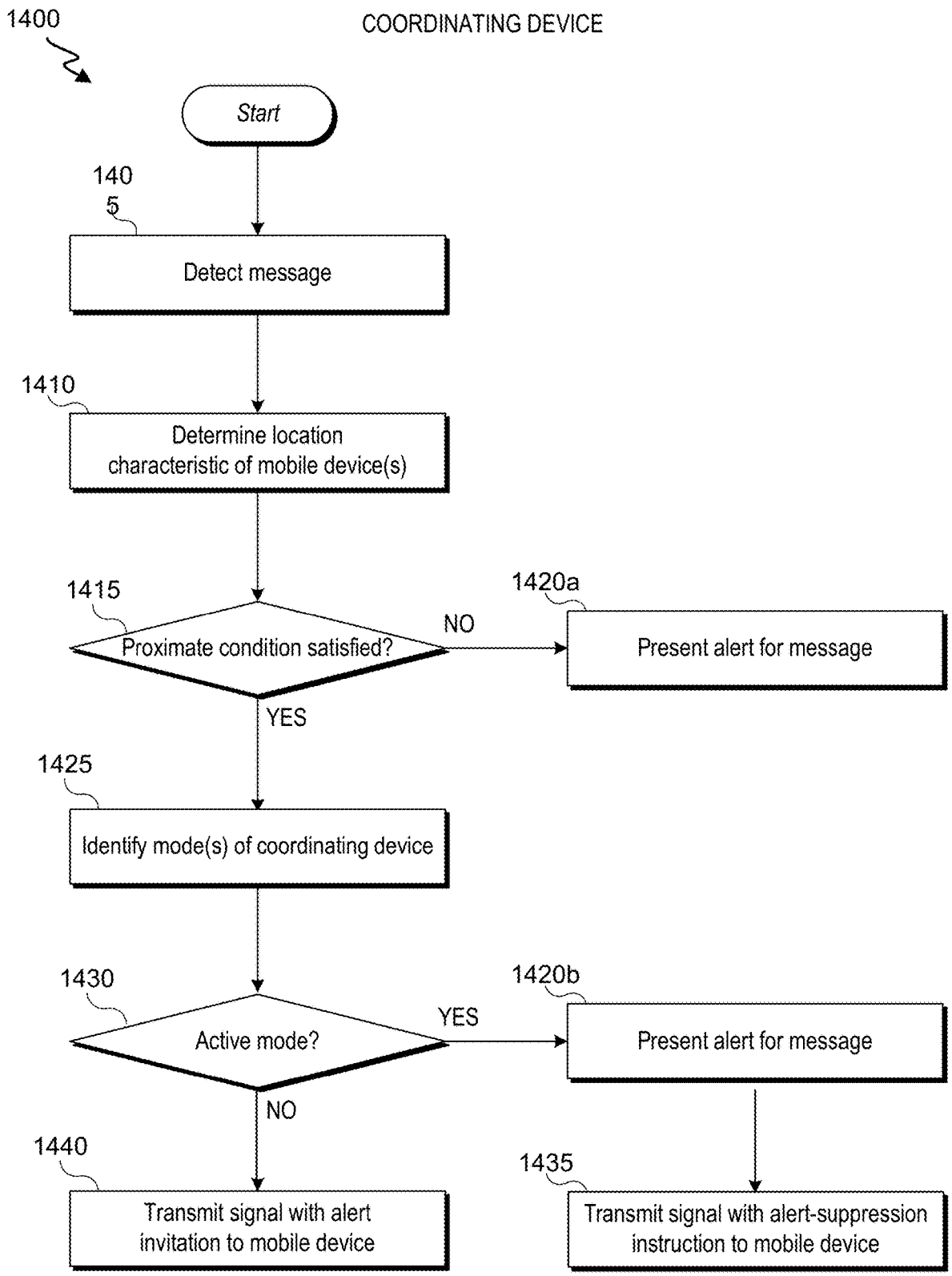
FIG. 14 is a flow diagram of a process for determining whether to present an alert in accordance with an embodiment of the invention.

FIG. 14 is a flow diagram of a process 1400 for determining whether to present an alert in accordance with an embodiment of the invention. Part or all of process 1400 can be implemented in a coordinating device.

Process 1400 can begin at block 1405 where a message is detected. Detecting the message can include detecting receipt of the message from, for example, a server or other device (e.g., associated with a shared user account or a paired device) or detecting a locally generated the message (e.g., the message having been generated using an app installed on or executing on a device performing part or all of process 1200). The message can include received content (e.g., originating from another user or source) and/or can represent an occurrence of an event.

At block 1410, a location characteristic of each of one or more mobile devices can be determined. Determining the location characteristic can include, for example, determining whether any mobile devices (e.g., of a particular type and/or associated with a particular account) is can communicate with the coordinating device via a particular type of communication channel (e.g., a short-range network, a Bluetooth channel or a BTLE channel) and/or is within a defined distance from the coordinating device.

At block 1415, it can be determined, using the location characteristic(s), whether a proximate condition is satisfied. The proximate condition can be one defined to determine whether any (and/or which) mobile devices associated with a particular user account are near the coordinating device and/or one defined to suppress redundant alerts for a same message. Thus, the proximate condition can include a functional or absolute threshold for when a mobile device is determined to be sufficiently near a coordinating device to suppress an alert on at least one of the devices. The proximate condition can include, for example, an inter-device communication condition (e.g., the devices must be able to communicate over a particular type of communication channel and/or such channel must have an above-threshold signal strength) or a distance condition (e.g., the devices must be separated by less than a defined distance, as determined by GPS coordinates of each device or another localization of each device). The proximate condition can be fixed, dependent on a characteristic of a message, defined by an app and/or defined by a user.

When it is determined that the proximate condition is not satisfied, at block 1420a, the coordinating device can present an alert (e.g., an audio and/or haptic alert) for the message. Block 1420a can parallel block 1035 in process 1000.

When it is determined that other proximate condition is satisfied, at block 1425, one or more modes of the coordinating device can be identified. Block 1425 can include, for example, determining whether the coordinating device is in an active mode (e.g., based on whether a screen is on, whether a device is unlocked, whether sensor data indicates that it is being worn, an orientation of the device, an elevation of the device or a time of last input) that is indicative of current or recent usage of the device. In some instances, block 1425 can also or alternatively include determining whether the coordinating device is in another mode, such as a do-not-disturb mode or a sleep mode.

At block 1430, it is determined whether the coordinating device is identified as being in the active mode. When the coordinating device is in the active mode, process 1400 can continue to block 1420b, where the coordinating device can present an alert (e.g., an audio and/or haptic alert) for the message. Block 1420b can parallel block 1035 in process 1000. Additionally, a signal can be transmitted to each of one or more mobile devices (for which the proximate condition was satisfied) that includes an instruction to suppress presentation of an alert for the message. This signal can cause the mobile device to, for example, not present any audio and/or any haptic stimulus in response to the message, not present a particular (e.g., default) audio and/or haptic stimulus for the message, or reduce an amplitude of any presented audio and/or haptic signal for the message. The signal can include an identifier of the message and/or an identifier of a corresponding notification.

When it is determined that the coordinating device is not in an active mode, process 1400 can continue to block 1440, where the coordinating device can transmit a signal to a mobile device (e.g., for which the proximate condition was satisfied) with an invitation to present an alert for the message at block 1240. The signal can include an identifier of the message and/or an identifier of a corresponding notification. In some instances, the signal can include part or all of a message or notification itself (e.g., such that signal alert invitation can also serve to forward the part or all of the message or notification). The invitation can include an expiration time by which a response is requested.

Figure 15:
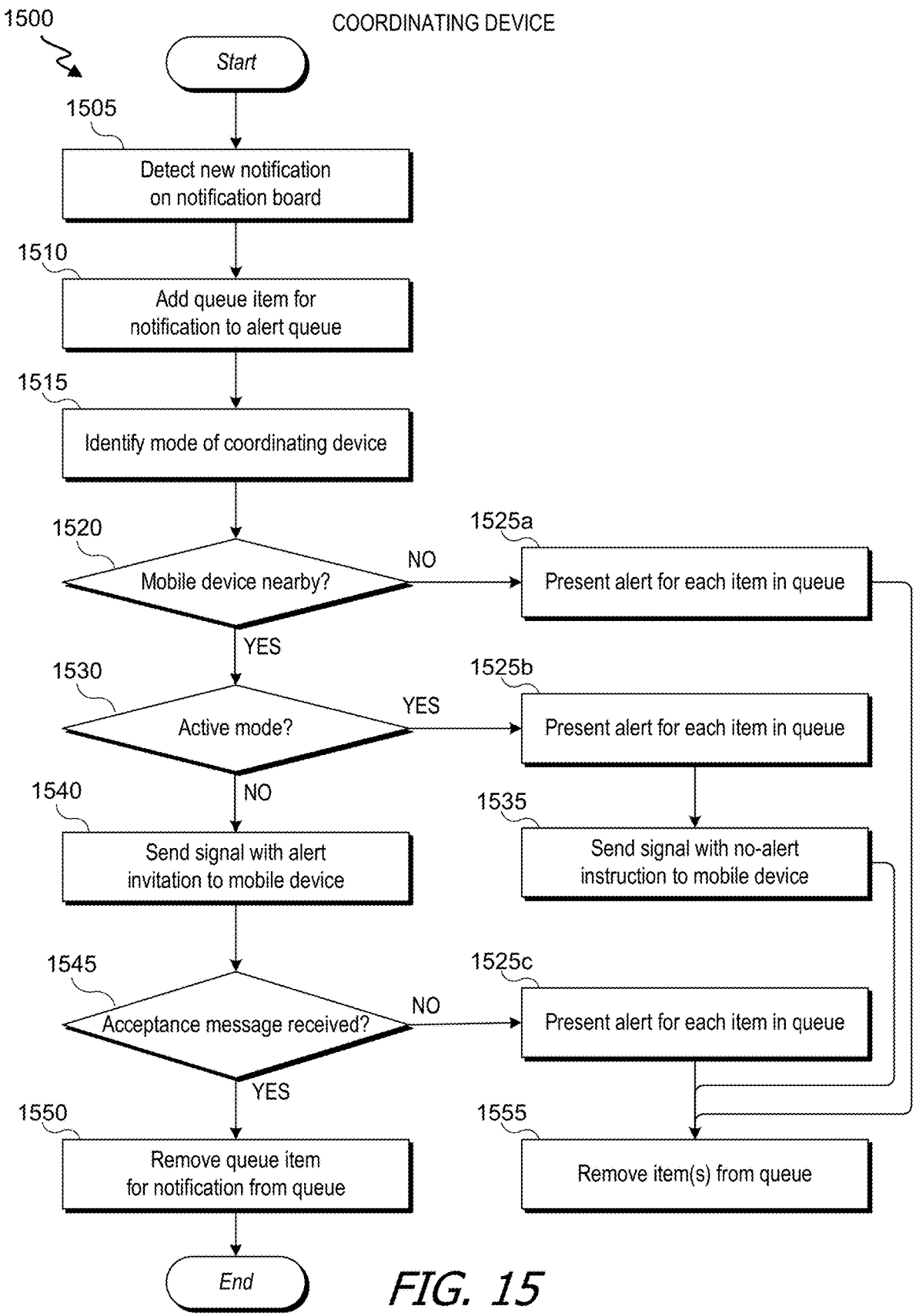
FIG. 15 is a flow diagram of a process for determining whether to present an alert in accordance with an embodiment of the invention.

FIG. 15 is a flow diagram of a process 1500 for determining whether to present an alert in accordance with another embodiment of the invention. Part or all of process 1500 can be implemented in a coordinating device.

Process 1500 can begin at block 1505 where a new notification on a notification board can be detected. At block 1510, a queue item corresponding to the notification can be added to an alert queue. The queue item can include an identifier of the notification and/or an associated message, a time (e.g., associated with the notification or a time at which the queue item was generated) and/or an app identifier.

At block 1515, one or more modes of the coordinating device can be identified. The identification can include determining whether the coordinating device is in an active mode based on, e.g., whether a screen of the coordinating device is on, whether the coordinating device is unlocked, whether input has been received via an interface of the coordinating device within a defined time period and/or whether a movement variable (e.g., cumulative motion over a time period or a time of a most recent motion detection) for the coordinating device exceeds a threshold.

It can be determined, at block 1520, whether any mobile devices (e.g., corresponding to a particular user account and/or any paired mobile devices) are nearby. This determination can include evaluation of a proximate condition, identifying whether the coordinating device is paired to any device, identifying a location of the coordinating device and/or identifying a location of one or more other devices. For example, block 1520 can include determining whether the coordinating device is paired to any other devices.

When it is determined that no mobile devices are nearby (e.g., no mobile devices corresponding to a particular user account are nearby or no paired mobile devices are nearby), process 1500 can continue to block 1525a, where an alert can be presented for each item in the queue. Presentation of each alert can parallel that described at block 1035 in process 1000. In some instances, the alert queue can include one or more other queue items in addition to the one added at block 1510. In some embodiments, an alert can be presented for each of two or more (or all) queue items. The alerts can be presented sequentially. In some instances, an alert characteristic differs across multiple queue items. For example, which audio signal is presented can depend on which app a queue item corresponds to. In some instances, alerts are the same across queue items.

When it is determined that one or more mobile devices are nearby, it can be determined at block 1530 whether the mode of the coordinating device is an active mode. Block 1530 can parallel block 1045 of process 1000.

When the coordinating device is in an active mode, an alert can be presented for each item in the queue at block 1525b. Block 1525b can parallel block 1525a. In some instances, a signal with a no-alert instruction can be sent to a mobile device at block 1535. The signal can identify one or more messages and/or notifications (e.g., a message corresponding to the detected new notification and/or a message corresponding to each queue item for which an alert was presented). The signal can indicate that one or more alerts were handled by the coordinating device and/or can include an instruction not to present an alert for one or more alerts.

At least partly based on a determination of a coordinating device not being in an active mode, the coordinating device can determinate that an alert-coordinating criterion is satisfied. In such instances, a signal can be sent to the mobile device with an invitation to present an alert for the message at block 1540. The invitation can include an identifier of the message and/or an identifier of a corresponding notification. In some instances, no message or notification is identified. The invitation can include part or all of a message or notification itself (e.g., such that an alert invitation can also serve to forward the part or all of the message or notification). The invitation can include an expiration time by which a response is requested. In some instances, the invitation can be implied based on other signal characteristics.

At block 1545, it can be determined whether an acceptance message responsive to the invitation has been received from the mobile device. This determination can include determining whether an acceptance message is received during a period of time (e.g., beginning at a time when the invitation signal is sent). An acceptance message can indicate, for example, that the mobile device has or will present the alert and/or that the mobile device is in an active mode (e.g., indicating that it will handle the alert presentation). In some instances, the acceptance message can include one or more alert characteristics, such as a time that the alert was presented. In some instances, the acceptance message can be merely a response message without explicit alert-handling or acceptance content, though such acceptance can be inferred by the presence of the message. If an acceptance message is received, process 1500 can continue to block 1550, where the queue item added at block 1510 can be removed from the queue.

If an acceptance message is not received, process 1500 can continue to block 1525c, where an alert can be presented for each item in the queue. Block 1525c can parallel block 1525a. At block 1555, following presentation of an alert, one or more queue items can be removed from the queue. The one or more queue items can include all queue items for which an alert was presented.

While in process 1500, alerts can be presented for each queue item in the queue, it will be appreciated that in other embodiments, alerts can be presented for only a portion of the queue items in the queue (which can include a single queue item or a plurality of queue items. For example, an alert can be presented only for the queue item added at block 1510.

It will be appreciated that alert handling can depend on various factors, such as an app associated with a message, a device type, and/or user preferences. In one instance, alert handling is different for messages associated with apps on a blacklist and/or having a distribution-handling subscriber (and/or messages forwarded across devices) and messages associated with other apps. For example, all devices may present alerts for the former messages. In one instance, alert handling can be independent of whether an app is on a blacklist and/or has a subscriber.

In process 1500, alert presentation can be conditioned upon a proximate condition (e.g., at block 1520). It will be appreciated that alert presentation in other embodiments need not involve evaluation of a proximate condition. For example, if it is detected that a device is in a particular mode, all other devices (or devices of a particular type) that are associated with a same user account can have an alert suppressed.

Using an alert queue can be useful in situations where one or more devices change modes between message receipts. For example, a coordinating device may not be in an active mode when a first message is received. Thus, it can invite a nearby mobile device to present an alert for the first message. While the coordinating device waits to determine whether the mobile device will present the alert, its mode can change to an active mode. Further, while waiting for a response, a second message can be received. At this point, the coordinating device can present alerts for both messages quickly, such that a single device notifies a user of both (potentially related) messages.

Figure 16:
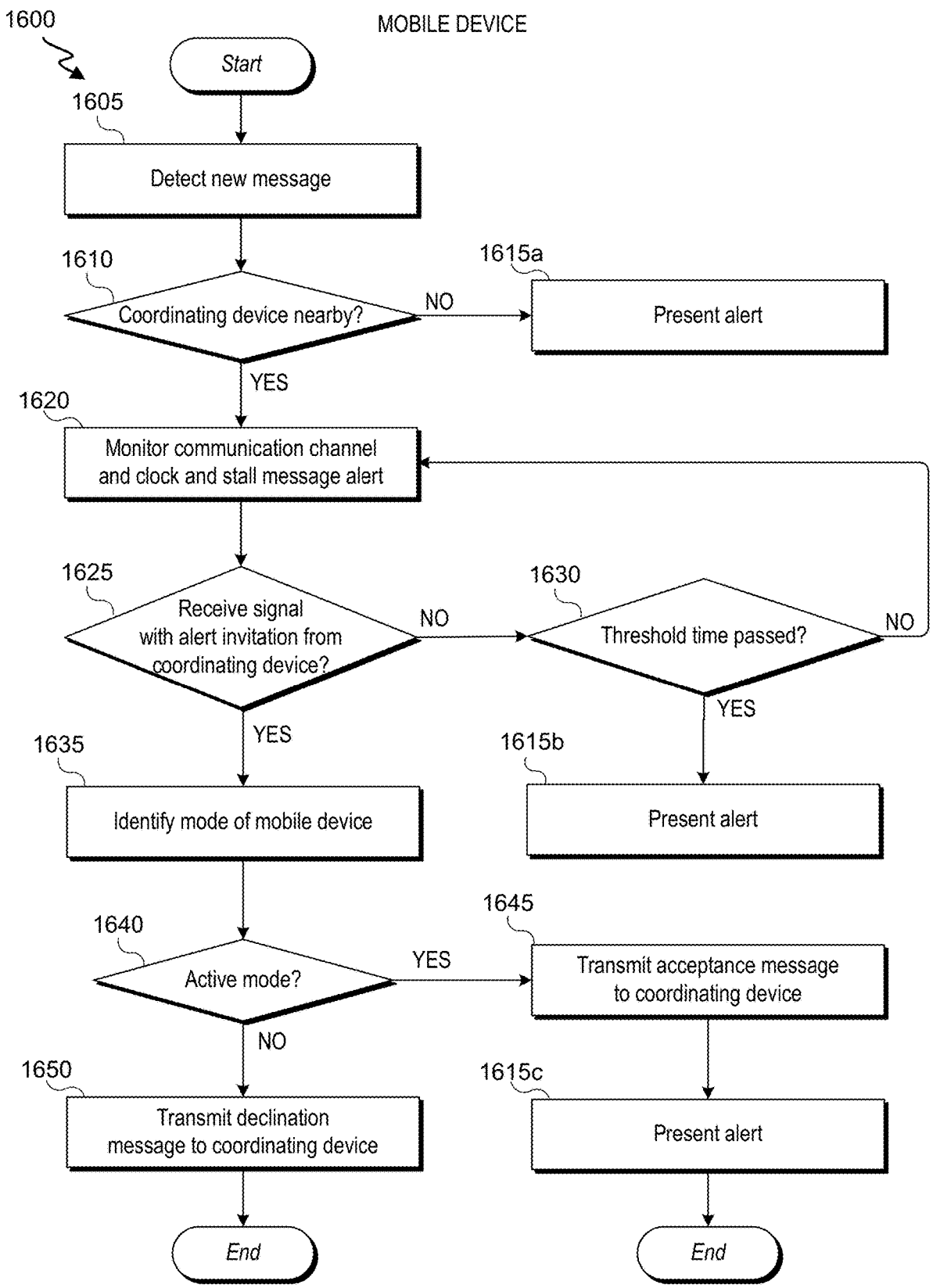
FIG. 16 is a flow diagram of a process for determining whether to present an alert in accordance with an embodiment of the invention.

FIG. 16 is a flow diagram of a process 1600 for determining whether to present an alert in accordance with an embodiment of the invention. Part or all of process 1600 can be implemented in a mobile device. Process 1600 can begin at block 1605 where a new message can be detected. For example, the message can be one received from a source, such as a coordinating device or server or the message can be locally generated.

At block 1610, it can be determined whether a coordinating device is nearby the mobile device. Block 1610 can mirror block 1520 of process 1500. When it is determined that a coordinating device is not nearby, an alert corresponding to the message can be presented at block 1615a. Block 1615a can parallel block 1035 of process 1000.

When it is determined that a coordinating device is nearby, process 1600 can continue to block 1620 where a communication channel and clock can be monitored and an alert for the message can be stalled. Monitoring the communication channel can include determining whether a signal with an alert invitation is received (e.g., via a particular communication channel or any communication channel) from the coordinating device. Monitoring the clock can include, for example, starting a timer and/or determining whether a current time passes a threshold time (e.g., defined as a time period plus a time at which the message was detected). Stalling the alert for the message can include at least temporarily refraining from presenting any (or a particular type of) alert for the message. For example, in one instance, no audio or haptic stimulus is presented responsive to the message detection during the refraining of the alert.

At block 1625, it can be determined whether a signal with an alert invitation has been received from a coordinating device. If such a signal was not received, process 1600 can continue to block 1630 where it can be determined whether the threshold time has passed (which can include determining whether a timer has expired). If it is determined that the threshold time has not passed, process 1600 can return to block 1620 such that the mobile device can continue to wait for an invitation to present an alert.

If it is determined that the threshold time has passed, process 1600 can continue to block 1615*b* where an alert corresponding to the message can be presented. Block 1615*b* can parallel block 1615*a* and block 1035 of process 1000.

If a signal with an invitation is received before the threshold time, process 1600 can continue to block 1635 where one or more modes of the mobile device can be identified. The identification can include determining whether the mobile device is in an active mode based on, e.g., whether the mobile device is unlocked, whether a sensor reading indicates that the mobile device is being worn, whether a screen of the mobile device is on, whether input has been received via an interface of the mobile device within a defined time period and/or whether a movement variable (e.g., cumulative motion over a time period or a time of a most recent motion detection) for the mobile device exceeds a threshold.

A determination can be made at block 1640 as to whether the mobile device is in an active mode (e.g., whether one of the identified modes includes or is an active mode). Block 1640 can parallel block 1530 of process 1500 and/or block 1045 of process 1000.

If it is determined that the mobile device is in an active mode, a message accepting the alert invitation can be sent to the coordinating device at block 1645. An acceptance message can include characteristics as disclosed with respect to block 1545 of process 1500.

At block 1615*c*, an alert corresponding to the message can be presented. Block 1615*c* can parallel block 1615*a*.

When it is determined that the mobile device is not in an active mode, a declination message can be transmitted to the coordinating device at block 1650. The declination message can indicate that the mobile device is not going to or has not presented an alert for the new message and/or identify a mode of the device. In some instances, the declination message includes an invitation for the coordinating device to present the alert.

It will be appreciated that, as with all processes disclosed herein, process 1600 can include more or fewer or different blocks than those shown in FIG. 16. For example, in some instances, block 1650 can be omitted from process 1600. A lack of an acceptance message can be interpreted to be a declination of an invitation.

Figure 17:
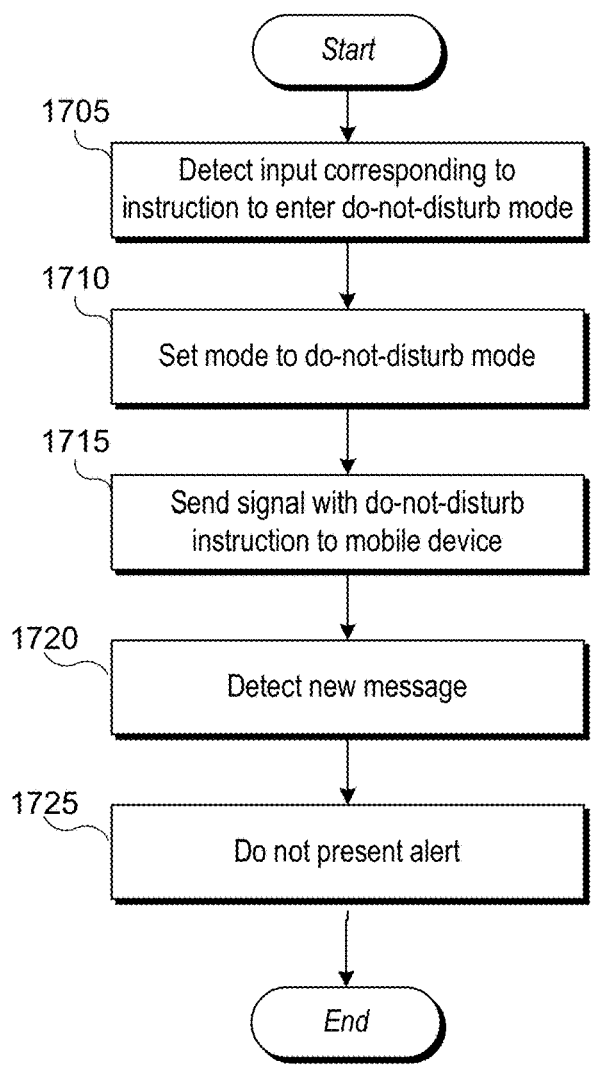
FIG. 17 is a flow diagram of a process for responding to messages while in a do-not-disturb mode in accordance with an embodiment of the invention.

FIG. 17 is a flow diagram of a process 1700 for responding to messages while in a do-not-disturb mode in accordance with an embodiment of the invention. Part or all of process 1700 can be implemented in a coordinating device.

Process 1700 can begin at block 1705 where input corresponding to an instruction to enter a do-not-disturb mode can be detected. The input can include, for example, a mechanical input (e.g., switching a switch or pressing a button), a touchscreen input, a voice command, or a cursor selection. In some instances, the do-not-disturb mode can include one that corresponds to a silencing or inhibition of all audio and/or haptic alerts. In some instances, the input indicates that the mode is to apply to (for example) one or more particular apps, accounts, time periods, contacts and/or threads. In some instances, the input indicates that the mode is to apply to apps, time periods, contacts and/or threads having a particular characteristic.

At block 1710, a mode can be set to a do-not-disturb mode (e.g., according to the applicability of the input). In some instances, a device can be in multiple modes, such that setting a device mode to the do-not-disturb mode does not prevent the mode from being in one or more other modes, such as an activity mode (e.g., active, inactive, and/or asleep). Setting the mode to the do-not-disturb mode can inhibit select stimuli from being presented on the device. For example, the mode can inhibit or prevent audio and/or haptic stimuli from being presented on the device (in general or in response to some or all messages).

In some instances, a signal with a do-no-disturb instruction can be sent to a mobile device at block 1715. The instruction can, in some instances, identify applicability of the mode (e.g., identifying one or more particular apps, contacts, time periods, accounts, and/or threads and/or a characteristic of an app, contact, time period or thread for which the mode is to apply and/or identifying a characteristic indicating when the mode is to apply). The mobile device can include one paired to the coordinating device, one that is near the coordinating device (as determined based on evaluation of a proximate condition) and/or one that is associated with a same user account as is associated with the mobile device.

A new message can be detected at block 1720. The new message can be detected, e.g., based on a signal received from a server or other device. In some instances, detecting the new message includes detecting a new notification corresponding to the message. In some instances, the message can have an association (e.g., to an app, contact, time period, thread or account) or characteristic corresponding to the do-not-disturb mode.

At block 1725, the coordinating device can suppress presentation of an alert for the message. The suppression can include not presenting an audio and/or haptic stimulus in correspondence with the message. In some instances, one or more visual stimuli (e.g., a screen turning on) can also be suppressed or not performed. Depending on the embodiment, a do-not-disturb mode may, or may not, influence whether a notification presentation is presented for the message (e.g., such that a notification presentation for a message is not presented if the message was received while in the do-not-disturb mode).

In addition to not presenting the alert, suppressing an alert presentation can include not transmitting an alert-presentation invitation to another device. This lack of transmission can occur even if the coordinating device is not in an active mode, which could have otherwise prompted the coordinating device to send a signal with an alert invitation to a nearby device (as described herein, particularly in reference to process 1500). This invitation suppression can occur instead of or in addition to the signal sent in block 1715 to instruct the mobile device to enter do-not-disturb mode. In some instances, the invitation suppression can itself serve to cause the mobile device to effectively partly or fully enter a do-not-disturb mode.

It will thus be appreciated that, in process 400, in some embodiments, an alert-coordination criterion can require not only that the coordinating device not be in an active mode, but also that the coordinating device not be in a do-not-disturb mode. In these instances, an alert invitation can be selectively sent only in instances where the coordinating device is in neither the active mode nor the do-not-disturb mode. In other embodiments, the alert-coordination criterion only requires that the coordinating device not be in one of these modes (active mode or do-not-disturb mode). In some embodiments, the alert-coordination criterion includes other mode-related requirements (e.g., requiring the device not be in a vibrate mode) or other requirements not relates to the device mode.

For a new message detected while in a do-not-disturb mode, in some instances, a new queue item corresponding to the message may not be added to a queue. In some instances, a new queue item can be added, but it can be removed even though no alert is presented for the message.

Process 1700 provides a technique by which a user can initiate a do-not-disturb mode on one device and cause other devices to similarly enter the mode. In some instances, multiple do-not-disturb modes can be available, such that a user can indicate whether only one device or multiple devices are to be in the mode.

In some instances, the mobile device can remain in the do-not-disturb mode until the mode is changed (e.g., at the mobile device or coordinating device). If the mode is changed at the coordinating device, a second signal with a mode-changing instruction can be sent to the mobile device. In some instances, the mobile device can remain in the do-not-disturb mode until the mobile devices are no longer near each other (as defined based on a proximate condition).

Figure 18:
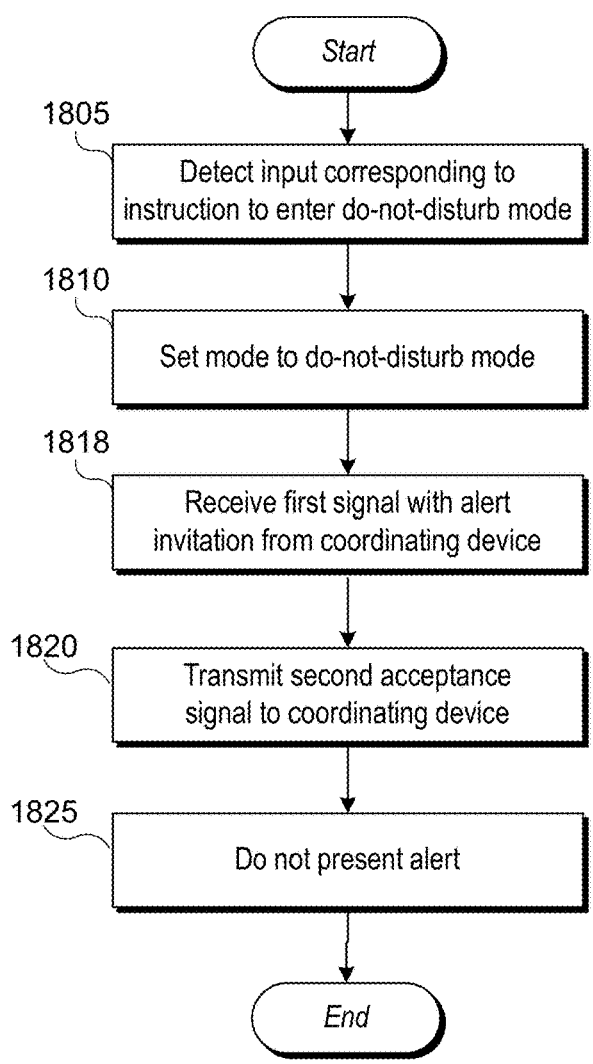
FIG. 18 is a flow diagram of a process for responding to messages while in a do-not-disturb mode in accordance with an embodiment of the invention.

FIG. 18 is a flow diagram of a process 1800 for responding to messages while in a do-not-disturb mode in accordance with an embodiment of the invention. Part or all of process 1800 can be implemented in a mobile device.

Process 1800 can begin at block 1805 where input corresponding to an instruction to enter a do-not-disturb mode is detected. At block 1810, a mode can be set to a do-not-disturb mode. Blocks 1805 and 1810 can respectively parallel blocks 1705 and 1710 from process 1700. At block 1815, a first signal can be received from a coordinating device with an alert invitation.

At block 1820, a second signal with an acceptance to the invitation can be transmitted to the coordinating device. Block 1820 can parallel block 1645 in process 1600. The second signal can be sent, e.g., when the mobile device is also in an active mode or irrespective of whether the mobile device is in an active mode.

At block 1825, the mobile device can suppress presentation of an alert for the message. Block 1825 can parallel block 1725 in process 1700.

Thus, the mobile device can indicate to a coordinating device that it is handling an alert for a message even though the alert is not (in some instances) presented due to the device being in the do-not-disturb mode. The handling indication can prevent a nearby coordinating device from presenting an alert for the message. Thus, the mobile device can extend a reach of a do-not-disturb input.

It will be appreciated that inter-device interactions disclosed herein can be extended to a variety of arrangements. For example, some embodiments include a coordinating device that can forward a message to a mobile device and further can be of higher priority over a mobile device with regard to alert presentation. In other embodiments, however, a device that forwards a message can be of lower priority relative to the mobile device. In some embodiments, a first set of devices can interact during a message-forwarding process and a second set of devices (which can include a device not in the first set and/or an incomplete subset of the first set) can interact during an alert-coordination process such an incomplete subset of the second set presents an alert for the message.

Further, while some disclosures relate to an interaction between two devices, it will be appreciated that embodiments can be extended to more devices. For example, for selection of a device in a set of devices to present an alert, devices of sequentially lower priority can iteratively receive alert presentations until one is in an active mode or until it is determined that none are in an active mode.

Embodiments disclosed herein provide a variety of useful inter-device coordination capabilities and advantages. For example, a first device can conditionally forward a message to a second device. This forwarding can be selective in terms of which apps' messages are handled by inter-device forwarding, and the selection can be based on stored app-pertinent data (e.g., a blacklist and/or app subscriber lists). Thus, for apps for which message distribution can be appropriately handled using an alternative technique, messages need not be unnecessarily forwarded.

A result of the forwarding or another occurrence (e.g., a server distribution of a message) can cause multiple user devices to have access to information pertaining to a single message, such that a user can view the message from any of the multiple devices. In some instances, each device of the multiple devices or each device in an active mode can present a notification presentation of the message. Therefore, regardless of which device the user is near, the user can be notified of the message. Meanwhile, particular devices can be selected (e.g., based on a priority list of the device and/or device modes) to present audio and/or haptic alerts of a message. Consequentially, if a user is near several devices, redundant alerts can be avoided.

While the invention has been described with respect to specific embodiments, one skilled in the art will recognize that numerous modifications are possible. For example, different sensors or combinations of sensors can be substituted for those described herein. A variety of different mobile devices and mobile devices can be used.

Some described embodiments pertain to establishing or using a pairing or other connection that enables devices to recognize each other as being authorized for interoperation. This can reduce the likelihood that a device not suited to participate in a message distribution and/or alert coordination technique will be automatically be included in performance of the technique. Security, such as Bluetooth security, can be utilized to provide secure communication sessions.

It will be appreciated that part or all of various processes and/or techniques described herein can be performed by a daemon or plugin executing on a performing electronic device. In some instances, whether and/or which of a daemon or plugin performs part or all of a process depends on an app associated with a message.

For example, a daemon may detect a new message and identify a corresponding app. For some apps, the daemon may determine that the app is on a blacklist and can refrain from some or all further handling (e.g., processing, forwarding, or presenting the message), and the app can instead handle. For example, the app can coordinate forwarding the message or a processed version thereof using a cloud server or near-field communication channel. For some apps, the daemon may handle determining whether the message is to be processed and/or forwarded to another device, whether a notification of the message is to be presented and/or whether an alert (e.g., a non-visual alert) is to be presented. The daemon can further handle processing, forwarding, notification presentation and/or alert presentation. For some apps, the daemon can determine that a plugin is to handle determining whether the message is to be processed and/or forwarded to another device, whether a notification of the message is to be presented and/or whether an alert (e.g., a non-visual alert) is to be presented. The plugin can handle one or more of such determinations and can further handle processing, forwarding, notification presentation and/or alert presentation.

Some disclosures herein refer to an app. It will be appreciated that such disclosures can be extended to additionally or alternatively relate to any other type of software, such as a plugin or extension.

The foregoing description may make reference to specific examples of a mobile device and/or a coordinating device. It is to be understood that these examples are illustrative and not limiting; other devices can be substituted and can implement similar functional blocks and/or algorithms to perform operations described herein and/or other operations. Further, some or all of the devices can be non-mobile and/or non-mobile.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   at a coordinating device:
   detecting, at the coordinating device, a message received from a remote source;
   identifying a plurality of other devices, wherein each of the coordinating device and the plurality of other devices is associated with a same account and is available to present an alert corresponding to the message;
   in accordance with a determination that a proximate condition is not satisfied for the plurality of other devices, presenting, at the coordinating device, the alert corresponding to the message; and
   in accordance with a determination that at least one device of the plurality of devices satisfies the proximate condition:
      in accordance with a determination that the coordinating device is in an active mode:
         presenting, by the coordinating device, the alert;
         suppressing, at a first device of the plurality of devices, presentation of the alert corresponding to the message, wherein suppressing the alert includes causing the first device to forgo the presentation of any audio, visual, and haptic alerts in correspondence with the message; and
      in accordance with a determination that the coordinating device is not in the active mode:
         transmitting, by the coordinating device, a signal to the first device that corresponds to an invitation to present the alert at the first device; and
         in accordance with a determination that an acceptance message responsive to the invitation is not received from the first device, presenting, by the coordinating device, the alert.

2. The method of claim 1, wherein the message is indicative of a location of the coordinating device.

3. The method of claim 1, further comprising:
   detecting, at the coordinating device, an other message;
   determining that no app is subscribed to handle distribution of the message; and
   in response to determining that no app is subscribed to handle distribution of the message, transmitting a signal that includes the other message to at least one electronic device of the plurality of other devices.

4. The method of claim 1, further comprising:
   detecting, at the coordinating device, an other message;
   identifying an other app that is subscribed to handle distribution of the other message; and
   in response to identifying the other app that is subscribed to handle distribution of the other message, not transmitting a signal corresponding to at least one electronic device of the plurality of other devices.

5. The method of claim 1, wherein the message corresponds to a calendar event or reminder, a text message, an email, or a phone call.

6. The method of claim 1, further comprising:
   detecting, at the coordinating device, an other message;
   identifying an other app associated with the other message;
   determining that the other app is identified on a blacklist; and
   not transmitting a signal corresponding to the other message to at least one electronic device of the plurality of other devices.

7. A coordinating device, comprising:
   a connection component configured to transmit communications over one or more communication channels to other devices;
   one or more processors coupled to the connection component; and
   a computer-readable storage medium containing instructions, that, when executed by the one or more processors, cause the one or more processors to perform actions including:
      detecting a message received, via a communication channel of the one or more communication channels, at the coordinating device from a remote source;
      identifying a plurality of other devices, wherein each of the coordinating device and the plurality of other devices is associated with a same account and is available to present an alert corresponding to the message;

in accordance with a determination that a proximate condition is not satisfied for the plurality of other devices, presenting, at the coordinating device, the alert corresponding to the message; and in accordance with a determination that at least one device of the plurality of devices satisfies the proximate condition:

in accordance with a determination that the coordinating device is in an active mode:

presenting, by the coordinating device, the alert;

suppressing, at a first device of the plurality of devices, presentation of the alert corresponding to the message, wherein suppressing the alert includes causing the first device to forgo the presentation of any audio, visual, and haptic alerts in correspondence with the message; and in accordance with a determination that the coordinating device is not in the active mode:

transmitting, by the coordinating device, a signal to the first device that corresponds to an invitation to present the alert at the first device; and in accordance with a determination that an acceptance message responsive to the invitation is not received from the first device, presenting, by the coordinating device, the alert.

8. The coordinating device of claim 7, wherein the actions further include transmitting a signal that includes the message, wherein the signal includes an identifier of an app of the coordinating device.

9. The coordinating device of claim 7, wherein the actions further include processing, by an app of the coordinating device, the message, wherein processing the message includes extracting an incomplete subset of data in the message, and wherein the processed message includes the incomplete subset of data.

10. The coordinating device of claim 7, detecting the message includes detecting receipt of the message.

11. The coordinating device of claim 7, wherein the message is indicative of a location of the coordinating device.

12. The coordinating device of claim 7, wherein the actions further include:

detecting an other message;

determining that no app is subscribed to handle distribution of the other message; and in response to determining that no app is subscribed to handle distribution of the other message, transmitting a signal that includes the other message to at least one electronic device of the plurality of other devices.

13. The coordinating device of claim 7, wherein the message corresponds to a calendar event or reminder, a text message, an email, or a phone call.

14. The coordinating device of claim 7, wherein the actions further include identifying an app of the coordinating device as being subscribed to process the message, and wherein determining that the app is subscribed to process the message includes looking up information corresponding to the message in a subscriber structure stored at the coordinating device.

15. The method of claim 1, wherein identifying the plurality of other devices includes:

detecting the plurality of other devices, that are associated with a same account, over a short-range network.

16. The method of claim 1, further comprising identifying an app of the coordinating device as being subscribed to process the message, and wherein identifying the app that is subscribed to process the message includes identifying the app based on content in the message or based on a source of the message.

17. The method of claim 1, further comprising:

identifying an app of the coordinating device as being subscribed to process the message; and identifying a characteristic or type of the message, wherein identifying the app that is subscribed to process the message includes identifying the app that is subscribed to process messages corresponding to the characteristic or type.

18. The method of claim 1, wherein at least one other device of the plurality of other devices includes a wearable electronic device.

19. The method of claim 1, wherein at least one other device of the plurality of other devices includes a watch.

20. The method of claim 1, wherein the coordinating device includes a phone.

21. A system, comprising:

one or more data processors; and a non-transitory computer readable storage medium containing instructions which when executed on the one or more data processors, cause the one or more data processors to perform actions including:

detecting a message received at the system from a remote source;

identifying a plurality of other devices, wherein each of the system and the plurality of other devices is associated with a same account and is available to present an alert corresponding to the message; and in accordance with a determination that a proximate condition is not satisfied for the plurality of other devices presenting the alert corresponding to the message; and in accordance with a determination that at least one device of the plurality of devices satisfies the proximate condition:

in accordance with a determination that the coordinating device is in an active mode:

presenting, by the coordinating device, the alert;

suppressing, at a first device of the plurality of devices, presentation of the alert corresponding to the message, wherein suppressing the alert includes causing the first device to forgo the presentation of any audio, visual, and haptic alerts in correspondence with the message; and in accordance with a determination that the coordinating device is not in the active mode:

transmitting, by the coordinating device, a signal to the first device that corresponds to an invitation to present the alert at the first device; and in accordance with a determination that an acceptance message responsive to the invitation is not received from the first device, presenting, by the coordinating device, the alert.

22. A non-transitory machine-readable storage medium comprising a tangible computer program product, including instructions configured to cause one or more data processors to perform actions including:

detecting a message, at a coordinating device received, at the coordinating device performing the actions, from a remote source;

identifying a plurality of other devices, wherein each of the coordinating device performing the actions and the plurality of other devices is associated with a same account and is available to present an alert corresponding to the message; and in accordance with a determination that a proximate condition is not satisfied for the plurality of other devices, presenting, at the coordinating device, the alert corresponding to the message; and in accordance with a determination that at least one device of the plurality of devices satisfies the proximate condition:

in accordance with a determination that the coordinating device is in an active mode:

presenting, by the coordinating device, the alert;

suppressing, at a first device of the plurality of devices, presentation of the alert corresponding to the message, wherein suppressing the alert includes causing the first device to forgo the presentation of any audio, visual, and haptic alerts in correspondence with the message; and in accordance with a determination that the coordinating device is not in the active mode:

transmitting, by the coordinating device, a signal to the first device that corresponds to an invitation to present the alert at the first device; and in accordance with a determination that an acceptance message responsive to the invitation is not received from the first device, presenting, by the coordinating device, the alert.

23. The method of claim 2, wherein a signal that includes the message is transmitted to at least one of the selected subset of the plurality of other devices based at least in part on the location of the coordinating device.

24. The method of claim 23, wherein the signal comprises an instruction regarding whether or not to present an alert at the at least one of the selected subset of the plurality of other devices.

25. The non-transitory machine-readable storage medium of claim 22, wherein the message is indicative of a location of the coordinating device.

26. The non-transitory machine-readable storage medium of claim 22, wherein the tangible computer program product further includes instructions configured to cause the one or more data processors to perform actions including:

detecting, at the coordinating device, an other message;

determining that no app is subscribed to handle distribution of the message; and in response to determining that no app is subscribed to handle distribution of the message, transmitting a signal that includes the other message to at least one electronic device of the plurality of other devices.

27. The non-transitory machine-readable storage medium of claim 22, wherein the tangible computer program product further includes instructions configured to cause the one or more data processors to perform actions including:

detecting, at the coordinating device, an other message;

identifying an other app that is subscribed to handle distribution of the other message; and in response to identifying the other app that is subscribed to handle distribution of the other message, not transmitting a signal corresponding to at least one electronic device of the plurality of other devices.

28. The non-transitory machine-readable storage medium of claim 22, wherein the message corresponds to a calendar event or reminder, a text message, an email, or a phone call.

29. The non-transitory machine-readable storage medium of claim 22, wherein the tangible computer program product further includes instructions configured to cause the one or more data processors to perform actions including:

detecting, at the coordinating device, an other message;

identifying an other app associated with the other message;

determining that the other app is identified on a blacklist; and not transmitting a signal corresponding to the other message to at least one electronic device of the plurality of other devices.

30. The non-transitory machine-readable storage medium of claim 22, wherein identifying the plurality of other devices includes:

detecting the plurality of other devices, that are associated with a same account, over a short-range network.

31. The non-transitory machine-readable storage medium of claim 22, wherein the tangible computer program product further includes instructions configured to cause the one or more data processors to perform actions including:

identifying an app of the coordinating device as being subscribed to process the message, and wherein identifying the app that is subscribed to process the message includes identifying the app based on content in the message or based on a source of the message.

32. The non-transitory machine-readable storage medium of claim 22, wherein the tangible computer program product further includes instructions configured to cause the one or more data processors to perform actions including:

identifying an app of the coordinating device as being subscribed to process the message; and identifying a characteristic or type of the message, wherein identifying the app that is subscribed to process the message includes identifying the app that is subscribed to process messages corresponding to the characteristic or type.

33. The non-transitory machine-readable storage medium of claim 22, wherein at least one other device of the plurality of other devices includes a wearable electronic device.

34. The non-transitory machine-readable storage medium of claim 22, wherein at least one other device of the plurality of other devices includes a watch.

35. The non-transitory machine-readable storage medium of claim 22, wherein the coordinating device includes a phone.

36. The non-transitory machine-readable storage medium of claim 25, wherein a signal that includes the message is transmitted to at least one of the selected subset of the plurality of other devices based at least in part on the location of the coordinating device.

37. The non-transitory machine-readable storage medium of claim 36, wherein the signal comprises an instruction regarding whether or not to present an alert at the at least one of the selected subset of the plurality of other devices.

38. The system of claim 21, wherein the message is indicative of a location of the coordinating device.

39. The system of claim 21, wherein the non-transitory computer readable storage medium further includes instructions which when executed on the one or more data processors, cause the one or more data processors to perform actions including:

detecting, at the coordinating device, an other message;

determining that no app is subscribed to handle distribution of the message; and in response to determining that no app is subscribed to handle distribution of the message, transmitting a signal that includes the other message to at least one electronic device of the plurality of other devices.

40. The system of claim 21, wherein the non-transitory computer readable storage medium further includes instructions which when executed on the one or more data processors, cause the one or more data processors to perform actions including:
  detecting, at the coordinating device, an other message;
  identifying an other app that is subscribed to handle distribution of the other message; and
  in response to identifying the other app that is subscribed to handle distribution of the other message, not transmitting a signal corresponding to at least one electronic device of the plurality of other devices.

41. The system of claim 21, wherein the message corresponds to a calendar event or reminder, a text message, an email, or a phone call.

42. The system of claim 21, wherein the non-transitory computer readable storage medium further includes instructions which when executed on the one or more data processors, cause the one or more data processors to perform actions including:
  detecting, at the coordinating device, an other message;
  identifying an other app associated with the other message;
  determining that the other app is identified on a blacklist; and
  not transmitting a signal corresponding to the other message to at least one electronic device of the plurality of other devices.

43. The system of claim 21, wherein identifying the plurality of other devices includes:
  detecting the plurality of other devices, that are associated with a same account, over a short-range network.

44. The system of claim 21, wherein the non-transitory computer readable storage medium further includes instructions which when executed on the one or more data processors, cause the one or more data processors to perform actions including:
  identifying an app of the coordinating device as being subscribed to process the message, and wherein identifying the app that is subscribed to process the message includes identifying the app based on content in the message or based on a source of the message.

45. The system of claim 21, wherein the non-transitory computer readable storage medium further includes instructions which when executed on the one or more data processors, cause the one or more data processors to perform actions including:
  identifying an app of the coordinating device as being subscribed to process the message; and
  identifying a characteristic or type of the message, wherein identifying the app that is subscribed to process the message includes identifying the app that is subscribed to process messages corresponding to the characteristic or type.

46. The system of claim 21, wherein at least one other device of the plurality of other devices includes a wearable electronic device.

47. The system of claim 21, wherein at least one other device of the plurality of other devices includes a watch.

48. The system of claim 21, wherein the coordinating device includes a phone.

49. The system of claim 38, wherein a signal that includes the message is transmitted to at least one of the selected subset of the plurality of other devices based at least in part on the location of the coordinating device.

50. The system of claim 49, wherein the signal comprises an instruction regarding whether or not to present an alert at the at least one of the selected subset of the plurality of other devices.

* * * * *